US012703090B2

(12) United States Patent
Klingensmith et al.

(10) Patent No.: US 12,703,090 B2
(45) Date of Patent: Aug. 11, 2026

(54) ENVIRONMENTAL FEATURE-SPECIFIC ACTIONS FOR ROBOT NAVIGATION

(71) Applicant: Boston Dynamics, Inc., Waltham, MA (US)

(72) Inventors: Matthew Jacob Klingensmith, Somerville, MA (US); Adam Komoroski, Westwood, MA (US); Brian Masao Yamauchi, Boston, MA (US); Michael James McDonald, Cambridge, MA (US); Christopher Stathis, Bedford, MA (US)

(73) Assignee: Boston Dynamics, Inc., Waltham, MA (US)

( * ) Notice: Subject to any disclaimer, the term of this patent is extended or adjusted under 35 U.S.C. 154(b) by 115 days.

(21) Appl. No.: 18/542,082

(22) Filed: Dec. 15, 2023

(65) Prior Publication Data

US 2024/0316762 A1 Sep. 26, 2024

Related U.S. Application Data

(60) Provisional application No. 63/492,008, filed on Mar. 24, 2023.

(51) Int. Cl.

| | |
|---|---|
| ***B25J 9/16*** | (2006.01) |
| ***B25J 19/06*** | (2006.01) |
| *B62D 57/032* | (2006.01) |

(52) U.S. Cl.

CPC ............. *B25J 9/163* (2013.01); *B25J 9/1664* (2013.01); *B25J 9/1697* (2013.01); *B25J 19/061* (2013.01); *B62D 57/032* (2013.01)

(58) Field of Classification Search

CPC ........ B25J 9/163; B25J 9/1664; B25J 9/1697; B25J 19/061; B62D 57/032;

(Continued)

(56) References Cited

U.S. PATENT DOCUMENTS

| | | | |
|---|---|---|---|
| 9,534,899 | B2 | 1/2017 | Gutmann et al. |
| 10,625,593 | B2 | 4/2020 | Gillett |

(Continued)

FOREIGN PATENT DOCUMENTS

| | | | |
|---|---|---|---|
| EP | 4686379 | | 2/2026 |
| WO | WO 2024/205673 | A1 | 10/2024 |

OTHER PUBLICATIONS

Balasubramaniam, et al., "Object Detection in Autonomous Vehicles: Status and Open Challenges," arXiv, Jan. 19, 2022, 6 pages, https://arxiv.org/ftp/arxiv/papers/2201/2201.07706.pdf.

(Continued)

*Primary Examiner* — Nhi Q Bui

(74) *Attorney, Agent, or Firm* — Knobbe, Martens, Olson & Bear, LLP

(57) ABSTRACT

Systems and methods are described for reacting to a feature in an environment of a robot based on a classification of the feature. A system can detect the feature in the environment using a first sensor on the robot. For example, the system can detect the feature using a feature detection system based on sensor data from a camera. The system can detect a mover in the environment using a second sensor on the robot. For example, the system can detect the mover using a mover detection system based on sensor data from a lidar sensor. The system can fuse the data from detecting the feature and detecting the mover to produce fused data. The system can classify the feature based on the fused data and react to the feature based on classifying the feature.

30 Claims, 33 Drawing Sheets

(58) Field of Classification Search

CPC ...... G05B 2219/37325; G05D 2111/17; G05D 2111/54; G05D 2111/67; G05D 2111/10; G05D 1/242; G05D 1/243; G05D 1/245; G05D 1/2469; G05D 1/622; G05D 2109/12

See application file for complete search history.

(56) References Cited

U.S. PATENT DOCUMENTS

| | | | | |
|---|---|---|---|---|
| 2017/0017640 | A1* | 1/2017 | Bellamy | H04L 12/1822 |
| 2017/0106738 | A1* | 4/2017 | Gillett | B62K 11/007 |
| 2020/0148230 | A1 | 5/2020 | Ehrmann et al. | |
| 2020/0301013 | A1* | 9/2020 | Banerjee | G01S 17/931 |
| 2021/0094539 | A1* | 4/2021 | Beller | G08G 1/167 |
| 2021/0283783 | A1† | 9/2021 | Gillett | |
| 2021/0346557 | A1* | 11/2021 | Brooks | A61L 2/24 |
| 2022/0012613 | A1* | 1/2022 | Datta | G06N 20/20 |
| 2022/0095871 | A1 | 3/2022 | Jakhotia et al. | |
| 2022/0281117 | A1* | 9/2022 | Eskandari | B25J 19/023 |

OTHER PUBLICATIONS

Chiu, et al., “Probabilistic 3D Multi-Modal, Multi-Object Tracking for Autonomous Driving,” 2021 IEEE International Conference on Robotics and Automation (ICRA), Oct. 11, 2021, 7 pages, doi: 10.1109/ICRA48506.2021.9561754.

He, et al., “Mask R-CNN,” 2017 IEEE International Conference on Computer Vision (ICCV), Mar. 2017, 12 pages, https://doi.org/10.48550/arXiv.1703.06870.

Huang, et al., “Optical Flow Based Real-Time Moving Object Detection in Unconstrained Scenes,” arXiv, Jul. 2018, 7 pages, https://arxiv.org/pdf/1807.04890.pdf.

Meel, “YOLOv3: Real-Time Object Detection Algorithm(Guide),” visio.ai, downloaded Feb. 21, 2023, 18 pages, https://viso.ai/deep-learning/yolov3-overview/.

Rath, et al., “Real-Time Moving Object Detection and Removal From 3D Point Cloud Data for Humanoid Navigation in Dense GPS-Denied Environments,” Wiley, Oct. 2020, 21 pages, https://doi.org/10.1002/eng2.12275.

Simon, et al., “Complex-YOLO: An Euler-Region-Proposal for Real-time 3D Object Detection on Point Clouds,” Computer Vision—ECCV 2018 Workshops, Mar. 2018, 14 pages, https://ar5iv.labs.arxiv.org/html/1803.06199.

Takahashi, et al., “Expandable Yolo: 3D Object Detection from RGB-D Images,” 2020 21st International Conference on Research and Education in Mechatronics (REM), Dec. 2020, 5 pages, https://doi.org/10.48550/arXiv.2006.14837.

Wilson, et al., “Predictive Inequity in Object Detection,” arXiv, Feb. 21, 2019, 13 pages, https://arxiv.org/pdf/1902.11097.pdf?fbclid=IWAR0Xy1kVZ-dRJZ_II6Me5200IWjvFYyIQ1zlnyZrlpwXFP6Ns7S7JZ7jeOc.

“Person Tracking with the ANYmal Robot,” May 21, 2019, downloaded Mar. 8, 2024, 21 pages, video screen shots taken from https://www.youtube.com/watch?app=desktop&v=QphFTYQPUCY.

“Anybotics Introduces End-to-End Robotic Inspection Solution,” video screen shots taken from https://www.youtube.com/watch?v=g3odef0EAFA, Apr. 21, 2021, downloaded Apr. 3, 2025, 16 pages.

“ANYmal Robots Inspecting Petronas’ Offshore Platform (Webinar),” video screen shots taken from https://www.youtube.com/watch?v=aymdpFsdgbA, Jan. 22, 2021, downloaded Apr. 9, 2025, 19 pages.

“ANYmal X—Robotic Inspection in Ex-Rated Zones,” video screen shots taken from https://vimeo.com/744482989, Aug. 30, 2022, downloaded Apr. 9, 2025, 13 pages.

“ANYmal @ ERL Emergency Robotics 2017,” video screen shots taken from https://www.youtube.com/watch?v=qrJIMze_xhQ, Oct. 2, 2017, downloaded Apr. 9, 2025, 4 pages.

Anonymous, “Anybotics Introduces End-to-End Robotic Inspection Solution,” https://www.anybotics.com/news/anybotics-introduces-end-to-end-robotic-inspection-solution/, Apr. 21, 2021, printed Apr. 9, 2025, 11 pages.

Anonymous, “Guide to Industrial Inspection Robots: Identifying the Task you Want to Automate,” https://www.anybotics.com/news/how-to-hire-an-industrial-inspection-robot-part-1/, Mar. 21, 2023, printed Apr. 9, 2025, 15 pages.

Anonymous, “Anybotics, Cognite & Accenture Enable Real End-to-End Robotic Inspection Solutions,” https://www.anybotics.com/news/anybotics-cognite-accenture-enable-real-end-to-end-robotic-inspection-solutions/, May 30, 2022, printed Apr. 9, 2025, 13 pages.

International Search Report and Written Opinion received in PCT Application No. PCT/US2023/084418, mailed Jun. 3, 2024, 19 pages.

* cited by examiner
† cited by third party

1300A

1300B

1300C

1300D

1300E

1300F

ENVIRONMENTAL FEATURE-SPECIFIC ACTIONS FOR ROBOT NAVIGATION

CROSS REFERENCE TO RELATED APPLICATIONS

This application claims priority under 35 U.S.C. § 119(e) to U.S. Provisional Application No. 63/492,008, filed on Mar. 24, 2023. The disclosure of this prior application is considered part of the disclosure of this application and is hereby incorporated by reference in its entirety.

TECHNICAL FIELD

This disclosure relates generally to robotics, and more specifically, to systems, methods, and apparatuses, including computer programs, for implementing feature-specific actions based on features (e.g., representing entities, objects, obstacles, or structures within an environment of a robot).

BACKGROUND

Robotic devices can autonomously or semi-autonomously navigate environments to perform a variety of tasks or functions. The robotic devices can utilize sensor data to navigate the environments without contacting obstacles or becoming stuck or trapped. As robotic devices become more prevalent, there is a need to enable the robotic devices to implement feature-specific actions based on features representing entities, objects, obstacles, or structures in the environment of the robotic devices in a safe and reliable manner.

SUMMARY

An aspect of the present disclosure provides a method for operating a robot. The method may include detecting, using a first sensor on the robot, first data indicating a feature in an environment about the robot. Further, the method may include detecting, using a second sensor on the robot, second data indicating a mover in the environment about the robot. Further, the method may include fusing, by a computing system of the robot, the first data and the second data to produce fused data. The mover may be classified into a classification based on at least a portion of the fused data. Further, the method may include, based on the classification, reacting to the mover.

In various embodiments, reacting to the mover may include communicating with the mover.

In various embodiments, reacting to the mover may include communicating with one or more of the mover, a computing device, or another robot.

In various embodiments, communicating with the mover may include communicating an electronic communication to one or more of the mover or a computing system associated with the mover.

In various embodiments, communicating with the mover may include implementing one or more physical gestures by the robot towards the mover.

In various embodiments, communicating with the mover may include instructing display of a user interface oriented towards the mover.

In various embodiments, communicating with the mover may include communicating an alert to the mover.

In various embodiments, reacting to the mover may include communicating an electronic communication to one or more of the mover or a computing system associated with the mover.

In various embodiments, reacting to the mover may include implementing one or more physical gestures by the robot towards the mover.

In various embodiments, reacting to the mover may include instructing display of a user interface oriented towards the mover.

In various embodiments, reacting to the mover may include communicating an alert to the mover.

In various embodiments, the alert may include an audible alert, a visual alert, or a physical alert.

In various embodiments, reacting to the mover may include communicating with a computing device.

In various embodiments, reacting to the mover may include communicating with another robot.

In various embodiments, the method may further include identifying the classification, from a plurality of classifications, for the feature based on the first data. The plurality of classifications may include a human classification and one or more non-human classifications. Reacting to the mover may be based on the classification.

In various embodiments, the mover may include a mover located in a route of the robot, a mover located within a threshold distance of a route of the robot, or a mover projected to be located in a route of the robot within a threshold period of time.

In various embodiments, detecting the first data indicating the feature may include determining whether the feature is an animal using a vision-based animal detection system, and the second sensor comprises a lidar sensor.

In various embodiments, reacting to the mover may include determining a route of the robot in the environment.

In various embodiments, reacting to the mover may include adjusting a route of the robot in the environment.

In various embodiments, reacting to the mover may include adjusting a navigational behavior of the robot.

In various embodiments, adjusting the navigational behavior may include adjusting a speed of the robot based on one or more of a location, velocity, or direction of the mover or avoiding a space relative to the mover.

In various embodiments, the mover may be classified based on output of a machine learning model. The machine learning model may be trained to classify the mover into one or more classes.

In various embodiments, the method may further include obtaining training data and retraining the machine learning model using the training data.

In various embodiments, the method may further include implementing the machine learning model and obtaining the output of the machine learning model based on implementing the machine learning model.

In various embodiments, the method may further include causing display of a user interface via a user computing device. The user interface may include information based on the classification.

In various embodiments, the method may further include causing display of a user interface via a user computing device. The user interface may indicate the classification.

In various embodiments, the first data and the second data may have different data types.

According to various embodiments of the present disclosure, a legged robot may include a plurality of legs, memory storing computer-executable instructions, and a processor in communication with the memory. The processor may be configured to execute the computer-executable instructions. Execution of the computer-executable instructions may cause the processor to detect, using a first sensor on the legged robot, first data indicating a feature in an environment about the legged robot. Execution of the computer-executable instructions may further cause the processor to detect, using a second sensor on the legged robot, second data indicating a mover in the environment about the legged robot. Execution of the computer-executable instructions may further cause the processor to fuse the first data and the second data to produce fused data. The mover may be classified into a classification based on at least a portion of the fused data. Execution of the computer-executable instructions may further cause the processor to, based on the classification, react to the mover.

In various embodiments, the processor and computer-executable instructions may be configured to react to the mover by communicating with the mover.

In various embodiments, the processor and computer-executable instructions may be configured to react to the mover by performing an action.

In various embodiments, the processor and computer-executable instructions may be configured to determine the action based on the classification.

In various embodiments, the classification may be a human classification.

In various embodiments, the mover may be classified into the classification from a plurality of classifications.

In various embodiments, the processor and computer-executable instructions may be configured to communicate with the mover by communicating an electronic communication to one or more of the mover or a computing system associated with the mover.

In various embodiments, the processor and computer-executable instructions may be configured to communicate with the mover by implementing one or more physical gestures by the legged robot towards the mover.

In various embodiments, the processor and computer-executable instructions may be configured to communicate with the mover by instructing display of a user interface oriented towards the mover.

In various embodiments, the processor and computer-executable instructions may be configured to communicate with the mover by communicating an alert to the mover.

In various embodiments, the alert may include an audible alert, a visual alert, or a physical alert.

In various embodiments, the processor and computer-executable instructions may be configured to react to the mover by communicating with a computing device.

In various embodiments, the processor and computer-executable instructions may be configured to react to the mover by communicating with another robot.

In various embodiments, the execution of the computer-executable instructions may cause the processor to identify the classification, from a plurality of classifications, for the feature based on the first data. The plurality of classifications may include a human classification and one or more non-human classifications. The processor and computer-executable instructions may be configured to react to the mover based on the classification.

In various embodiments, the mover may include a mover located in a route of the legged robot, a mover located within a threshold distance of a route of the legged robot, or a mover projected to be located in a route of the legged robot within a threshold period of time.

In various embodiments, the processor and computer-executable instructions may be configured to detect the first data indicating the feature by determining whether the feature is an animal using a vision-based animal detection system. The second sensor may include a lidar sensor.

In various embodiments, the processor and computer-executable instructions may be configured to react to the mover by determining a route of the legged robot in the environment.

In various embodiments, the processor and computer-executable instructions may be configured to react to the mover by adjusting a route of the robot in the environment.

According to various embodiments of the present disclosure, a computing system may include data processing hardware and memory hardware in communication with the data processing hardware. The memory hardware may store instructions. Execution of the instructions by the data processing hardware may cause the data processing hardware to detect, using a first sensor on a legged robot, first data indicating a feature in an environment about the legged robot, detect, using a second sensor on the legged robot, second data indicating a mover in the environment about the legged robot, fuse the first data and the second data to produce fused data, the mover may be classified into a classification based on at least a portion of the fused data, and based on the classification, react to the mover.

In various embodiments, the classification may identify the feature as a human. The data processing hardware and the instructions may be configured to react to the mover by physically interacting with the human based on the classification identifying the feature as the human.

In various embodiments, the classification may identify the feature as a human. The data processing hardware and the instructions may be configured to react to the mover by instructing the legged robot to navigate away from the human based on the classification identifying the feature as the human.

In various embodiments, the mover may be classified into the classification from a plurality of classifications. The plurality of classifications may be associated with a plurality of navigational behaviors.

In various embodiments, a first classification of the plurality of classifications may be associated with a first navigational behavior. A second classification of the plurality of classifications may be associated with a second navigational behavior. The second navigational behavior may be qualitatively different from the first navigational behavior.

According to various embodiments of the present disclosure, a method may include receiving sensor data, by data processing hardware, from a sensor. The method may further include identifying a mover, by the data processing hardware, based on the sensor data. The method may further include classifying the mover by the data processing hardware. The method may further include determining, by the data processing hardware, an action of a legged robot based on classifying the mover. The action may include one or more of adjusting a navigational behavior of the legged robot, instructing display of a user interface, interacting with the mover, or communicating an alert to the mover. The method may further include instructing, by the data processing hardware, performance of the action by the legged robot.

In various embodiments, identifying the mover based on the sensor data may include identifying the mover based on a portion of the sensor data obtained from a lidar sensor.

In various embodiments, classifying the mover may be based on output of a machine learning model. The machine learning model may be trained to classify the mover into one or more classes.

In various embodiments, the method may further include obtaining training data. The method may further include retraining the machine learning model using the training data.

In various embodiments, instructing performance of the action may include instructing a processor of the legged robot to analyze image data for one or more gestures of the mover.

In various embodiments, the method may further include causing display of a user interface via a user computing device. The user interface may include information based on classifying the mover.

In various embodiments, the action may include adjusting the navigational behavior. Adjusting the navigational behavior may include adjusting a speed of the legged robot based on one or more of a location, velocity, or direction of the mover or avoiding a space relative to the mover.

In various embodiments, the sensor data may include first sensor data from an image sensor of the legged robot and second sensor data from a lidar sensor of the legged robot.

In various embodiments, receiving the sensor data may include detecting, using image data, first data indicating at least one feature in an environment about the legged robot. Further, receiving the sensor data may include detecting, using lidar data, second data indicating the mover in the environment about the legged robot. Further, receiving the sensor data may include fusing the first data and the second data to produce the sensor data.

In various embodiments, the method may further include instructing association of a location of the legged robot with the action by the legged robot. The association of the location with the action may cause the legged robot to perform the action based on a particular location of the legged robot matching the location.

According to various embodiments of the present disclosure, a legged robot may include two or more legs, one or more sensors, and a control system. The control system may include data processing hardware and memory hardware in communication with the data processing hardware. The memory hardware may store instructions. Execution of the instructions by the data processing hardware may cause the data processing hardware to receive, from the one or more sensors, sensor data. Execution of the instructions by the data processing hardware may further cause the data processing hardware to identify a mover based on the sensor data. Execution of the instructions by the data processing hardware may further cause the data processing hardware to classify the mover. Execution of the instructions by the data processing hardware may further cause the data processing hardware to determine an action of the legged robot based on classifying the mover. The action may include additional instructions to adjust a navigational behavior of the legged robot, instruct display of a user interface, interact with the mover, or communicate an alert to the mover. Execution of the instructions by the data processing hardware may further cause the data processing hardware to instruct performance of the action by the legged robot.

In various embodiments, the control system and the instructions may be configured to identify the mover based on the sensor data by identifying the mover based on a portion of the sensor data obtained from a lidar sensor.

In various embodiments, the control system and the instructions may be configured to classify the mover by classifying the mover based on output of a machine learning model. The machine learning model may be trained to classify the mover into one or more classes.

In various embodiments, execution of the instructions by the data processing hardware may cause the data processing hardware to obtain training data. Execution of the instructions by the data processing hardware may further cause the data processing hardware to retrain the machine learning model using the training data.

In various embodiments, the control system and the instructions may be configured to instruct performance of the action by instructing a processor of the legged robot to analyze image data for one or more gestures of the mover.

In various embodiments, execution of the instructions by the data processing hardware may cause the data processing hardware to cause display of a user interface via a user computing device. The user interface may include information based on classifying the mover.

In various embodiments, the action may include adjusting the navigational behavior. The control system and the instructions may be configured to adjust the navigational behavior by adjusting a speed of the legged robot based on one or more of a location, velocity, or direction of the mover or avoiding a space relative to the mover.

In various embodiments, the sensor data may include first sensor data from an image sensor of the legged robot and second sensor data from a lidar sensor of the legged robot.

In various embodiments, the control system and the instructions may be configured to receive the sensor data by detecting, using image data, first data indicating at least one feature in an environment about the legged robot. Further, the control system and the instructions may be configured to receive the sensor data by detecting, using lidar data, second indicating at least one mover in the environment about the legged robot. Further, the control system and the instructions may be configured to receive the sensor data by fusing the first data and the second data to produce the sensor data.

In various embodiments, execution of the instructions by the data processing hardware may cause the data processing hardware to instruct association of a location of the legged robot with the action by the legged robot. The association of the location with the action may cause the legged robot to perform the action based on a particular location of the legged robot matching the location.

According to various embodiments of the present disclosure, a method may include receiving, by data processing hardware, from a sensor, sensor data. The method may further include identifying, by the data processing hardware, an entity based on the sensor data. The method may further include determining, by the data processing hardware, from a plurality of classifications, a first classification of the entity. The method may further include determining, by the data processing hardware, a first action of a legged robot associated with the first classification of the entity. The first classification and a second classification of the plurality of classifications may be associated with different actions of the legged robot. The method may further include instructing, by the data processing hardware, performance of the first action by the legged robot.

In various embodiments, the first classification may identify the entity as a second legged robot. The first action may include transmitting an electronic communication to the second legged robot based on the first classification identifying the entity as the second legged robot.

In various embodiments, the first classification may identify the entity as a human. The first action may include physically interacting with the human based on the first classification identifying the entity as the human.

In various embodiments, the second classification may be associated with a second action of the legged robot. The first action may include a first navigational behavior and the second action may include a second navigational behavior qualitatively different from the first navigational behavior.

In various embodiments, the second classification may be associated with a second action of the legged robot. The first classification may identify the entity as a second legged robot. The second classification may identify a second entity as a human. The first action may include maintaining a first threshold distance from the entity and the second action may include maintaining a second threshold distance from the second entity different from the first threshold distance.

In various embodiments, receiving the sensor data may include detecting, using a first sensor of the legged robot, first data indicating the entity in an environment about the legged robot. Further, receiving the sensor data may include detecting, using a second sensor of the legged robot qualitatively different from the first sensor, second data indicating a mover in the environment about the legged robot. Further, receiving the sensor data may include fusing the first data and the second data to produce the sensor data.

In various embodiments, the first action may include monitoring for one or more interactions by the entity.

In various embodiments, the first classification may indicate that the entity is a human located on or within a particular proximity of a stair. The first action may include delaying execution of a traversal of the stair by the legged robot.

In various embodiments, the method may further include associating a location of the legged robot with the first action.

In various embodiments, the first action may include determining whether the entity is within a particular proximity of at least a portion of a road. Further, the first action may include crossing the road based on determining whether the entity is within a particular proximity of the at least a portion of the road.

According to various embodiments of the present disclosure, a computing system may include data processing hardware and memory hardware in communication with the data processing hardware. The memory hardware may store instructions. Execution of the instructions by the data processing hardware may cause the data processing hardware to receive, from a sensor, sensor data. Execution of the instructions by the data processing hardware may further cause the data processing hardware to identify an entity based on the sensor data. Execution of the instructions by the data processing hardware may further cause the data processing hardware to determine, from a plurality of classifications, a first classification of the entity. Execution of the instructions by the data processing hardware may further cause the data processing hardware to determine a first action of a robot associated with the first classification of the entity. The first classification and a second classification of the plurality of classifications may be associated with different actions of the robot. Execution of the instructions by the data processing hardware may further cause the data processing hardware to instruct performance of the first action by the robot.

In various embodiments, the first classification may identify the entity as a second robot. The first action may include transmitting an electronic communication to the second robot based on the first classification identifying the entity as the second robot.

In various embodiments, the first classification may identify the entity as a human. The first action may include physically interacting with the human based on the first classification identifying the entity as the human.

In various embodiments, the entity may include a mover.

In various embodiments, the first classification may identify the entity as a human, a second robot, or a non-robotic machine.

In various embodiments, the second classification may be associated with a second action of the robot. The first action may include a first navigational behavior and the second action may include a second navigational behavior qualitatively different from the first navigational behavior.

In various embodiments, the second classification may be associated with a second action of the robot. The first action may include a first route planning behavior and the second action may include a second route planning behavior qualitatively different from the first route planning behavior.

In various embodiments, the second classification may be associated with a second action of the robot. The first action may include a maintaining a speed of the robot at or below a first speed. The second action may include maintaining the speed of the robot at or below a second speed.

In various embodiments, the second classification may be associated with a second action of the robot. The first action may indicate a speed limit for the robot. The second action may indicate a lack of a speed limit for the robot.

In various embodiments, the second classification may be associated with a second action of the robot. The first classification may identify the entity as a second robot. The second classification may identify a second entity as a human. The first action may include maintaining a first threshold distance from the entity and the second action may include maintaining a second threshold distance from the second entity different from the first threshold distance.

In various embodiments, the data processing hardware and the instructions may be configured to receive the sensor data by detecting, using a first sensor of the robot, first data indicating the entity in an environment about the robot. Further, the data processing hardware and the instructions may be configured to receive the sensor data by detecting, using a second sensor of the robot qualitatively different from the first sensor, second data indicating a mover in the environment about the robot. Further, the data processing hardware and the instructions may be configured to receive the sensor data by fusing the first data and the second data to produce the sensor data.

In various embodiments, the first action may include monitoring for one or more interactions by the entity.

In various embodiments, the first classification may indicate that the entity is a human located on or within a particular proximity of a stair. The first action may include delaying execution of a traversal of the stair by the robot.

In various embodiments, execution of the instructions by the data processing hardware may cause the data processing hardware to associate a location of the robot with the first action.

In various embodiments, the first action may include determining whether the entity is within a particular proximity of at least a portion of a road. Further, the first action may include crossing the road based on determining whether the entity is within a particular proximity of the at least a portion of the road.

In various embodiments, the computing system may be a computing system of the robot.

In various embodiments, the computing system may be distinct from and located remotely from the robot.

In various embodiments, the data processing hardware and the instructions may be configured to receive the sensor data by receiving the sensor data from a plurality of sensors of the robot.

In various embodiments, execution of the instructions by the data processing hardware may cause the data processing hardware to determine a route of the entity. The data processing hardware and the instructions may be configured to determine the first action based on the route of the entity.

In various embodiments, execution of the instructions by the data processing hardware may cause the data processing hardware to determine one or more of a route of the entity, a speed of the entity, a shape of the entity, a location of the entity, or a future location of the entity.

In various embodiments, the data processing hardware and the instructions may be configured to identify the entity by identifying one or more features associated with the entity.

In various embodiments, the entity may be associated with a plurality of features.

In various embodiments, the data processing hardware and the instructions may be configured to classify the mover by classifying one or more features associated with the entity.

The details of the one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
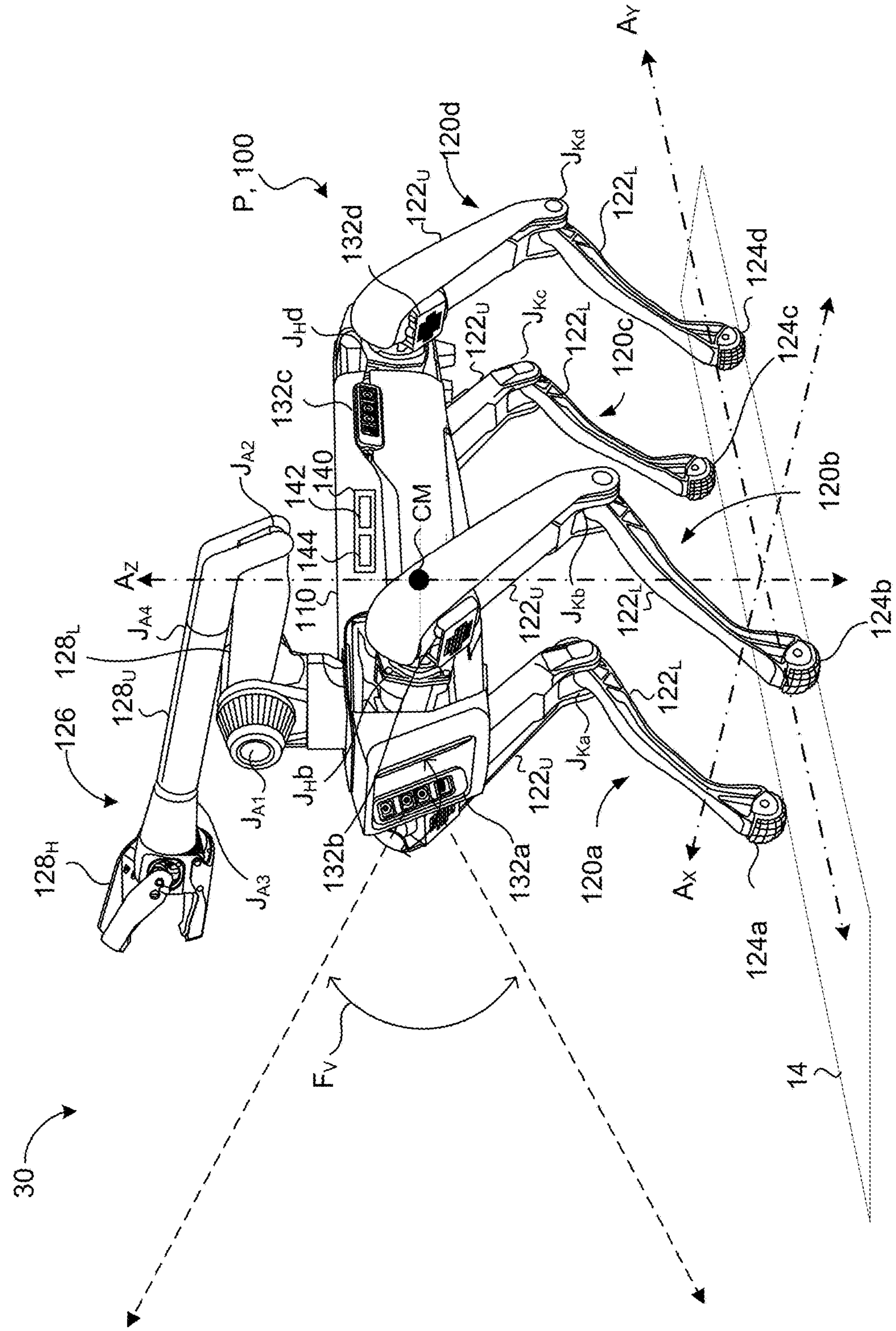
FIG. 1A is a schematic view of an example robot for navigating an environment.

Generally described, autonomous and semi-autonomous robots can utilize mapping, localization, and navigation systems to map an environment utilizing sensor data obtained by the robots. Further, the robots can utilize the systems to perform navigation and/or localization in the environment and build navigation graphs that identify route data (e.g., robot route data, feature route data, etc.). During the navigation and/or localization in the environment, the robots may identify features representing entities, objects, obstacles, or structures within the environment.

The present disclosure relates to the identification of features (e.g., elements) representing entities, objects, obstacles, or structures within an environment and determining an action associated with all or a portion of the features (e.g., a particular feature, a particular subset of features, all of the features, etc.). The features may be associated with (e.g., may correspond to, may indicate the presence of, may represent, may include, may identify) one or more obstacles, objects, entities, and/or structures (e.g., real world obstacles, real world objects, real world entities, and/or real world structures). For example, the features may represent or may indicate the presence of one or more obstacles, objects, entities, and/or structures in the real world (e.g., walls, stairs, humans, robots, vehicles, toys, animals, pallets, rocks, etc.) that may affect the movement of the robot as the robot traverses the environment. In some cases, the features may represent obstacles, objects, entities, and/or structures. In other cases, the features may represent a portion of the obstacles, objects, entities, and/or structures. For example, a first feature may represent a first edge of an obstacle, a second feature may represent a second edge of the obstacle, a third feature may represent a corner of the obstacle, a fourth feature may represent a plane of the obstacle, etc.

The features may be associated with static obstacles, objects, entities, and/or structures (e.g., obstacles, objects, entities, and/or structures that are not capable of self-movement) and/or dynamic obstacles, objects, entities, and/or structures (e.g., obstacles, objects, entities, and/or structures that are capable of self-movement). In one example, the obstacles, objects, and structures may be static and the entities may be dynamic. For example, the obstacles may not be integrated into the environment, may be bigger than a particular (e.g., arbitrarily selected) size (e.g., a box, a pallet, etc.), and may be static. The objects may not be integrated into the environment, may not be bigger than a particular (e.g., arbitrarily selected) size (e.g., a ball on the floor or on a stair), and may be static. The structures may be integrated into the environment (e.g., the walls, stairs, the ceiling, etc.) and may be static. The entities may be dynamic (e.g., capable of self-movement). For example, the entities may be adult humans, children humans, other robots (e.g., other legged robots), animals, non-robotic machines (e.g., fork-lifts), etc. within the environment of a robot. In some cases, a static obstacle, object, structure, etc. may be capable of movement based on an outside force (e.g., a force applied by an entity to the static obstacle, object, structure, etc.).

One or more collections (e.g., sets, subsets, groupings, etc.) of the features may be associated with (e.g., may correspond to, may indicate the presence of, may represent, may include, may identify) an obstacle, object, entity, structure, etc. For example, a first grouping of the features may be associated with a first obstacle in an environment, a second grouping of the features may be associated with a second obstacle in the environment, a third grouping of the features may be associated with an entity in the environment, etc. In some cases, a system of a robot can group (e.g., combine) particular features and identify one or more obstacles, objects, entities, and/or structures based on the grouped features. Further, the system can group and track particular features over a particular time period to track a corresponding obstacle, object, entity, and/or structure. In some cases, a single feature may correspond to an obstacle, object, entity, structure, etc. It will be understood that while a single feature may be referenced, a feature may include a plurality of features.

In one example, the present disclosure relates to the identification of particular features and determining particular actions for the particular features (e.g., communication actions). For example, a system can identify the particular features, classify the particular features as particular entities, and determine the particular actions for the particular entities. Further, based on identifying and classifying the particular features as particular entities, a system of the robot can communicate with the entities. For example, certain types of communication are suitable for interactions with a human (gestures, alarms, aural communications, etc.) and may not be suitable for non-human entities.

The system of the robot can utilize sensor data to identify the features. The system can identify sensor data (e.g., point cloud data, etc.) associated with the environment (e.g., sensor data associated with traversal of the environment by the robot). For example, the system can communicate with one or more sensors of the robot and obtain the sensor data, associated with the environment of the robot, from the one or more sensors of the robot. The sensor data may identify and/or include the features.

In some cases, the system can receive the sensor data from multiple sensors. For example, the system can receive a first portion of the sensor data from a first sensor or group of sensors and a second portion of the sensor data from a second sensor or group of sensors. The system can utilize the sensor data from the multiple sensors to identify and classify the features (e.g., using a detection system).

The system may identify and classify the features using a detection system that includes one or more of a feature detection system and/or a mover detection system. In one example, the first sensor or group of sensors (e.g., an image sensor) may include or be in communication with a feature detection system and the second sensor or group of sensors (e.g., a lidar sensor) may include or be in communication with a mover detection system. For example, the feature detection system may be an entity detection system (e.g., an adult human detection system, a child human detection system, a robot detection system, an animal detection system, a non-robotic machine detection system, etc.) that identifies and classifies a feature (e.g., as a particular obstacle, object, entity, structure, etc.). In another example, the mover detection system may obtain three-dimensional point cloud data generated by the lidar sensor. The three-dimensional point cloud data may indicate the presence of a mover (e.g., a moving feature) in the environment and the mover detection system may use the three-dimensional point cloud data to identify and classify the feature as a mover or a non-mover. The mover detection system may classify the feature as a mover if the mover detection system determines that the feature is self-moving or capable of self-movement through the environment or the feature is being moved through the environment by another feature. For example, the mover may include a human that is walking through the environment, a car, an animal, another robot, and/or a pallet that is being pushed through the environment.

The feature detection system and/or the mover detection system may receive sensor data from one or more sensors (e.g., one or more image sensors) of the robot. The feature detection system and/or the mover detection system may include a machine learning model and may provide the received sensor data to the machine learning model. The machine learning model may be trained, using training data, to generate an output indicating whether the sensor data is associated with (e.g., includes) a particular feature representing or corresponding to a particular obstacle, object, entity, structure, etc., a mover, etc. within the environment. For example, the particular obstacle, object, entity, structure, etc. may include an adult human, a child human, a robot, an animal, a non-robotic machine, etc.

The sensor data received from the detection system may identify different features of the environment and/or the same feature of the environment in different manners. For example, the sensor data received from the feature detection system may indicate the presence of a feature and/or absence of a feature in the sensor data based on the absence of sensor data and/or a grouping of sensor data while the sensor data received from the mover detection system may indicate the presence of a mover based on a three-dimensional point cloud.

The system may process the sensor data to identify route data (e.g., a series of route waypoints, a series of route edges, etc.) associated with a route of the robot. For example, the system may identify the route data based on traversal of the site by the robot. In some cases, the sensor data may include the route data.

The system may identify route data such that the route of the robot avoids the features within the environment. For example, the system may identify route data such that the route of the robot does not cause the robot to interact with (e.g., collide with, approach, etc.) the features within the environment. In some cases, the system may cause the robot to maintain a particular threshold distance from the features within the environment. For example, the system may cause the robot to maintain a threshold distance of one meter from the features within the environment. In some cases, the system may cause the robot to interact with particular features (e.g., cause the robot to climb a set of stairs).

In traditional systems (e.g., traditional static obstacle avoidance systems), while a robot may be programmed to identify features (e.g., the robot may identify features representing a corner, an obstacle, etc. within an environment) and avoid objects, entities, structures, and/or obstacles representing or corresponding to the features (e.g., to avoid obstacles corresponding to the features), the traditional systems may not cause the robot to implement particular actions based on the classification (e.g., type) of the feature. For example, the traditional systems may not cause the robot to communicate with an entity within the environment (e.g., an adult human). Instead, the traditional systems may cause the robot to avoid each feature representing entities, objects, obstacles, or structures within the environment regardless of the classification of the feature. Therefore, the traditional systems may not take an action that is customized for the particular feature and/or may not communicate with the particular entities, objects, obstacles, or structures associated with the feature.

In some cases, an environment may include multiple features. For example, the environment may include one or more features corresponding to another legged robot, an adult human, a child human, an animal, etc. In traditional systems, the systems may cause the robot to maintain a particular distance (e.g., one meter) from entities, objects, obstacles, or structures associated with each of the features. However, this may not be a necessary and/or effective practice for each of the features. For example, it may be more effective to maintain a closer distance to another legged robot (e.g., 0.5 meters) as the robot may be aware of the planned movement of the other legged robot and a further distance to a child human (e.g., 2 meters) to provide comfort to the child human and/or leave greater cushion to account for unpredictable or late movement of the child human. Instead, in traditional systems, the robot may maintain the same distance from entities, objects, obstacles, or structures associated with each of the multiple features.

As the traditional systems may implement a same action for each of the features, the robot may not communicate with entities, objects, obstacles, or structures associated with the features. For example, the robot may not communicate with entities, objects, obstacles, or structures associated with the features in a customized manner specific to the particular feature or may communicate with each of the entities, objects, obstacles, or structures associated with the features in the same manner. Such a lack of customization may cause issues and/or inefficiencies (e.g., computational inefficiencies) as commands for the robot may be generated to communicate with a particular entity, object, obstacle, or structure associated with a feature regardless of whether the particular entity, object, obstacle, or structure can interpret the particular command. For example, a child human may be unable to interpret a network signal sent by the robot that may be interpretable by another robot, an animal may be unable to interpret particular physical movements of the robot that may be interpretable by an adult human, etc. Moreover, as some systems do not distinguish between features that correspond to entities capable of interpretation and/or differentiation of physical movements of the robot and features that correspond to entities incapable of interpretation and/or differentiation of physical movements of the robot, such systems may not be configured for any communication and merely attempt to avoid contact with all features (e.g., all features identified as corresponding to or representing obstacles, objects, entities, structures, etc.).

As the traditional systems may not communicate with a particular mover corresponding to particular features, the traditional systems may not operate safely and predictably within an environment that includes movers, particularly movers capable of non-scheduled movement or reactions. Further, traditional systems may not operate safely and predictably within an environment that includes movers associated with different classifications.

In some cases, a user may attempt to manually provide actions for the robot to perform based on detected features. However, such a process may be inefficient and error prone as the user may be unable to identify a particular action for a particular feature (e.g., how to communicate with a particular obstacle, object, entity, or structure corresponding to a feature) within a particular time period while the robot is on a programmed or user-directed path of motion.

The methods and apparatus described herein enable a system to generate fused data from obtained sensor data and identify and classify a feature (e.g., as a mover) based on the fused data. The system can automatically communicate with an obstacle, object, entity, or structure corresponding to the mover based on the fused data.

As components (e.g., mobile robots) proliferate, the demand for more accurate and effective feature detection and tracking associated with the components has increased. Specifically, the demand for a robot to be able to effectively and accurately detect, track, and implement a particular action with regard to a particular feature within an environment of the robot has increased. For example, the sensor data associated with a robot may indicate that the environment of the robot includes a particular entity, object, obstacle, or structure corresponding to a feature. Further, a user may attempt to direct a robot to maneuver within the environment (e.g., traverse the environment according to route data) based on the sensor data. The present disclosure provides systems and methods that enable an increase in the accuracy of the detection, tracking, and implementation of a particular action with regard to a particular feature within the environment prior to, during, or subsequent to the robot maneuvering through the environment.

Further, the present disclosure provides systems and methods that enable a reduction in the time and user interactions, relative to traditional systems and methods, to detect, track, and implement a particular action with regard to a particular feature without significantly affecting the power consumption or speed of the robot. These advantages are provided by the embodiments discussed herein, and specifically by implementation of a process that includes the utilization of fused data to identify a feature and the classification of the identified feature.

As described herein, the process of detecting, tracking, and implementing a particular action with regard to a particular feature may include obtaining the sensor data. For example, the system may obtain sensor data from one or more sensors of the robots (e.g., based on traversal of the site by the robot). Further, the system may generate route data (e.g., based at least in part on the sensor data). In certain implementations, the route data is obtained from a separate system and merged with the sensor data.

As discussed above, the sensor data may include sensor data from multiple sensors. For example, the sensor data may include a first portion of sensor data from a feature detection system (e.g., including one or more image sensors) and a second portion of sensor data from a mover detection system (e.g., including one or more lidar sensors). The system can utilize the first portion of sensor data to detect a particular feature or a particular collection of features and detect (e.g., identify and classify) the particular feature or particular collection of features as corresponding to a particular object, a particular entity, a particular obstacle, a particular structure, etc. in the environment. The system can utilize the second portion of sensor data to detect a mover in the environment (e.g., identify classify a feature or a particular collection of features as corresponding to a mover or non-mover).

The system can fuse the data (e.g., the first portion of sensor data from the feature detection system and the second portion of sensor data from the mover detection system) from the multiple sensors to generate fused data. Therefore, the system can fuse different types of sensor data that is utilized for different detections (e.g., the first portion of sensor data is utilized for feature detection and the second portion of sensor data is utilized for mover detection). By fusing the different types of sensor data, the system can generate fused data and detect a feature as a particular obstacle, object, entity, or structure and/or as a mover or non-mover based on the fused data.

The system may fuse the data by integrating data from each of the multiple sensors and eliminating duplicative and/or inconsistent data. For example, the system may remove data that corresponds to a particular background feature (e.g., representing a wall). In some cases, the system may not fuse the data (e.g., the first portion of sensor data from the feature detection system and the second portion of sensor data from the mover detection system) from the multiple sensors. Instead, the system may utilize data from a single sensor or unfused data from multiple sensors.

Based on the fused data, the system can further classify the particular feature as an obstacle, object, entity, or structure and/or as a mover or non-mover. For example, based on the output of the feature detection system and/or the mover detection system, the system can classify the particular feature as an adult human, a child human, another robot, an animal, a non-robotic machine, etc. In some cases, the system can further classify the particular feature as corresponding to or representing a moving obstacle, a non-moving obstacle, a moving object, a non-moving object, a moving entity, a non-moving entity, a moving structure, or a non-moving structure.

The system may generate an association between a particular mover corresponding to a moving entity and the particular classification. Further, the system can store the association (e.g., in a cache of the system) such that, based on reidentification of the particular mover, the system can obtain the association and identify the particular classification without reclassifying the particular mover. As an example, relying solely on the feature detection system may erroneously identify a mannequin as a human, whereas relying solely on the mover detection system may erroneously identify a robot as a human. Fusion allows more certainty in identifying and classifying the mover.

The system may identify a particular action or reaction of the robot based on the particular classification. For example, the particular action may include determining or adjusting a navigational behavior of the robot (e.g., adjusting the route data of the robot), communicating with the mover, communicating with a user (e.g., an operator), communicating with a computing device (e.g., another robot that may not be the mover, a user computing device).

Communicating may include instructing display of a user interface, instructing a physical movement (e.g., instructing the robot to interact with the mover with one or more gestures), communicating electronic communications, communicating an alert (e.g., a visual, audible, tactile or otherwise physical, etc. alert), engaging specific systems for interacting with the mover or user (e.g., for recognizing human gestures or negotiating with the humans). The particular action may be interactive such that the particular action causes the robot to interact with the particular mover in a particular manner based on the particular classification of the mover.

The particular action (e.g., communicating) may also involve larger systems than the robot itself, such as calling for human assistance in robot management or communicating with other robots within a multi-robot system in response to recognition of particular types of movers from the fused data. For example, the robot may communicate to other robots to avoid or navigate to a particular location. In another example, the robot may communicate with another system (e.g., another robot, an operator computing device, etc.) to request assistance (e.g., based on determining that the robot may not navigate given the location of a particular feature).

In some cases, each classification of a mover may be associated with different actions. For example, a first classification of a mover (e.g., a moving adult human classification) may be associated with a first action (e.g., adjust a threshold distance to maintain a threshold distance of one meter from the mover) and a second classification of a mover (e.g., a child human classification) may be associated with a second action (e.g., adjust a threshold distance to maintain a threshold distance of two meters from the mover) that is different from the first action. Similarly, actions responsive to the classification may differ based on different sub-classifications (e.g., classification as a human and sub-classification as a human child, or classification as an animal and sub-classification as a human).

In some cases, the system may generate the particular action of the robot based on the particular classification. In other cases, the system may identify the particular action from a list of predetermined actions of the robot. For example, the system may identify an action from a list of predetermined actions of the robot that is within a threshold degree of similarity (e.g., 90% degree of similarity) of the particular action.

Based on identifying the particular action, the system may instruct the robot to perform the particular action. For example, the system may route data to the robot identifying the particular action. Further, the data may include an instruction (e.g., command) to perform the particular action. Based on receiving the instruction, the robot may perform the particular action. For example, the robot may implement an adjusted navigational behavior, implement a physical action (e.g., moving a leg, tilting a head, rolling over, etc. as a gesture to interact with the obstacle, object, entity, or structure), communicate an alert, and/or display a user interface.

In some cases, the system may identify and classify a feature as corresponding to a particular obstacle, object, entity, or structure and/or as a mover or non-mover using a first portion of sensor data. The first portion of sensor data may not be associated with (e.g., may not include data on) the entire obstacle, object, entity, or structure. For example, the first portion of sensor data may include sensor data associated with a bottom half of a human (e.g., the legs and feet of the human) but may not include sensor data associated with a top half of the human (e.g., the torso, head, and/or arms of the human). The system may not capture sensor data associated with the entire obstacle, object, entity, or structure based on a positioning of one or more sensors and/or a positioning of the obstacle, object, entity, or structure. For example, the one or more sensors may be oriented downwards and/or the obstacle, object, entity, or structure may be positioned within a particular proximity of the one or more sensors.

As discussed above, the system may identify and classify the feature as corresponding to a particular obstacle, object, entity, or structure and/or as a mover or non-mover using sensor data that is not associated with the entire obstacle, object, entity, or structure. For example, the system may obtain sensor data associated with the feet of a human and not the torso of a human. The system may use the sensor data that is associated with the feet of the human and not the torso of the human to identify and classify a feature as associated with a human. Therefore, the system can infer how to classify a feature using sensor data that may not be associated with an entire obstacle, object, entity, or structure.

Based on identifying and classifying the feature, the system can determine one or more portions of the obstacle, object, entity, or structure that the system does not identify in the sensor data but can infer are within the environment. For example, based on identifying and classifying the feature, and particularly a mover, as representing a human based on sensor data associated with the feet of the human, the system can determine that a head, torso, arms, etc. of the human, while not identified by the system within the sensor data, are within the environment. Further, the system can determine a location of the one or more portions of the obstacle, object, entity, or structure based on identifying and classifying the feature. For example, based on identifying and classifying the feature as corresponding to a human based on sensor data associated with the feet of the human, the system can determine that a head, torso, arms, etc. of the human are located above the feet of the human. Based on determining a location of the one or more portions of the obstacle, object, entity, or structure, the system can generate a synthetic feature corresponding to the one or more portions and add the synthetic feature to a map for navigation by a robot.

Further, based on identification and classification of a feature as a mover, the system can determine and predict actions of the obstacle, object, entity, or structure corresponding to the mover. For example, based on identifying and classifying a feature as a mover, the system can determine and predict that a portion of the moving entity corresponding to the feature may move (e.g., a head of a human may move over a time period).

The system can obtain sensor data over a time period, periodically identify features based on the obtained sensor data, and correlate features identified over the time period. For example, the system may correlate a first feature identified using sensor data obtained at a first time to a second feature identified using sensor data obtained at a second time. The system can determine a modification of the features over time (e.g., how a location of the features has changed). The system can utilize the predicted actions of a moving entity to determine whether the modification of the features is expected (e.g., if the feature is classified as a mover, the system may expect movement of the feature over time). The system may validate the sensor data and/or the features based on determining that the modification of the features is expected. The system may perform remediation actions based on determining that the modification of the features is not expected. For example, if the system determines that a feature moved that the system did not expect to move, the system may generate a synthetic feature at a former location of the feature, route the sensor data to a user for evaluation, or provide an alert. Therefore, by determining and predicting actions of the moving entity corresponding to the mover, the system can enable a robot to navigate an environment in a more accurate and safe manner as compared to traditional systems.

Additionally, based on identifying and classifying the features, the system can identify particular features to be used for localization by the robot. For example, the system can identify particular features to include in localization data used by the robot for localization and particular features not to include in the localization data. In some cases, the system may remove particular features from the localization data. Specifically, the system can identify and classify particular features as movers (e.g., representing adult humans, other legged robots, etc.) and may remove the particular features classified as movers from the localization data to avoid the robot becoming lost in a crowd of movers or while following a mover. Further, the system can identify and classify particular features as static obstacles, objects, entities, or structures (e.g., walls) and may include the particular features in the localization data for the robot. Therefore, the system can improve the localization process of the robot.

Figure 1B:
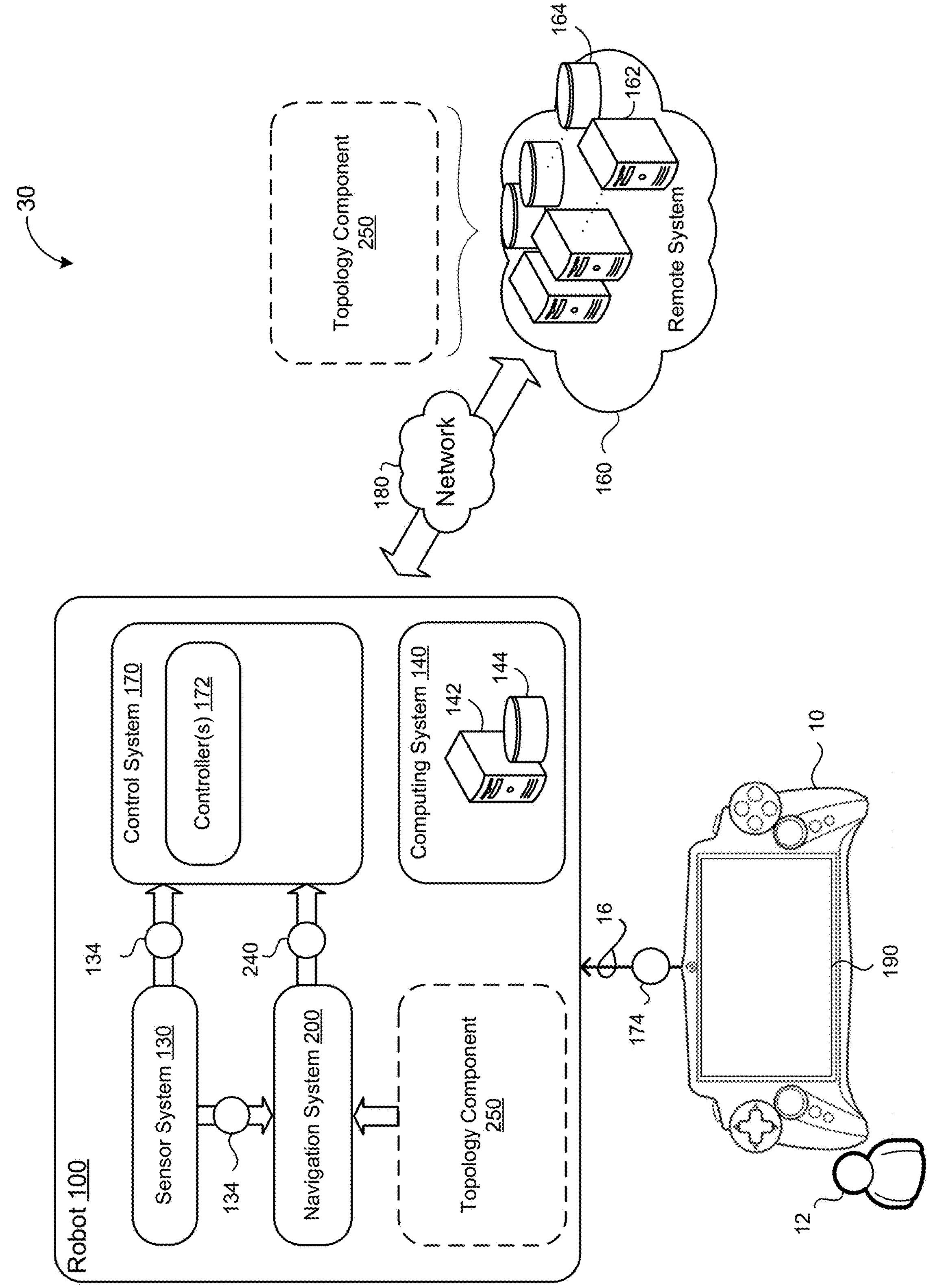
FIG. 1B is a schematic view of a navigation system for navigating the robot of FIG. 1A.

Referring to FIGS. 1A and 1B, in some implementations, a robot 100 includes a body 110 with one or more locomotion-based structures such as legs 120*a*, 120*b*, 120*c*, 120*d* coupled to the body 110 that enable the robot 100 to move within an environment 30 that surrounds the robot 100. In some examples, all or a portion of the legs 120*a*, 120*b*, 120*c*, 120*d* are an articulable structure such that one or more joints J permit members 122 of the leg 120 to move. For instance, in the illustrated embodiment, all or a portion of the legs 120*a*, 120*b*, 120*c*, 120*d* include a hip joint $J_H$ coupling an upper member $\mathbf{122}_U$ of the leg 120 to the body 110 and a knee joint $J_K$ coupling the upper member $\mathbf{122}_U$ of the leg 120 to a lower member $\mathbf{122}_L$ of the leg 120. Although FIG. 1A depicts a quadruped robot with four legs 120*a*, 120*b*, 120*c*, 120*d*, the robot 100 may include any number of legs or locomotive based structures (e.g., a biped or humanoid robot with two legs, or other arrangements of one or more legs) that provide a means to traverse the terrain within the environment 30.

In order to traverse the terrain, all or a portion of the legs 120*a*, 120*b*, 120*c*, 120*d* may have a distal end 124*a*, 124*b*, 124*c*, 124*d* that contacts a surface of the terrain (e.g., a traction surface). In other words, the distal end 124 of the leg 120 is the end of the leg 120 used by the robot 100 to pivot, plant, or generally provide traction during movement of the robot 100. For example, the distal end of a leg corresponds to a foot of the robot 100. In some examples, though not shown, the distal end of the leg includes an ankle joint such that the distal end is articulable with respect to the lower member $\mathbf{122}_L$ of the leg.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $\mathbf{128}_L$, an upper member $\mathbf{128}_U$, and a hand member $\mathbf{128}_H$ (also referred to as an end-effector). Here, the lower member $\mathbf{128}_L$, may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, such as FIG. 1A, the hand member $128_H$ is a mechanical gripper that includes a moveable jaw and a fixed jaw configured to perform different types of grasping of elements within the environment 30. In the example shown, the hand member $128_H$ includes a fixed first jaw and a moveable second jaw that grasps objects by clamping the object between the jaws. The moveable jaw is configured to move relative to the fixed jaw to move between an open position for the gripper and a closed position for the gripper (e.g., closed around an object). In some implementations, the arm 126 additionally includes a fourth joint $J_{A4}$. The fourth joint $J_{A4}$ may be located near the coupling of the lower member $128_L$ to the upper member $128_U$ and function to allow the upper member $128_U$ to twist or rotate relative to the lower member $128_L$. In other words, the fourth joint $J_{A4}$ may function as a twist joint similarly to the third joint $J_{A3}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 attaches or detaches from the robot 100 depending on whether the arm 126 is desired for particular operations.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (e.g., a point where the weighted relative position of the distributed mass of the robot 100 sums to zero). The robot 100 further has a pose P based on the CM relative to the vertical gravitational axis $A_Z$ (e.g., the fixed reference frame with respect to gravity) to define a particular attitude or stance assumed by the robot 100. The attitude of the robot 100 can be defined by an orientation or an angular position of the robot 100 in space. Movement by the legs 120*a*, 120*b*, 120*c*, 120*d* relative to the body 110 alters the pose P of the robot 100 (e.g., the combination of the position of the CM of the robot and the attitude or orientation of the robot 100). Here, a height generally refers to a distance along the z-direction (e.g., along a z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124*a*, 124*b*, 124*c*, 124*d* of the legs 120*a*, 120*b*, 120*c*, 120*d* of the robot 100 may generate traction to help the robot 100 move within the environment 30. Another anatomical plane of the robot 100 is the frontal plane that extends across the body 110 of the robot 100 (e.g., from a right side of the robot 100 with a first leg 120*a* to a left side of the robot 100 with a second leg 120*b*). The frontal plane spans the X-Z plane by extending in directions of the x-direction axis $A_X$ and the z-direction axis $A_Z$.

In order to maneuver within the environment 30 or to perform tasks using the arm 126, the robot 100 includes a sensor system with one or more sensors. For example, FIG. 1A illustrates a first sensor 132*a* mounted at a head of the robot 100 (near a front portion of the robot 100 adjacent the front legs 120*a* and 120*b*), a second sensor 132*b* mounted near the hip $J_H$b of the second leg 120*b* of the robot 100, a third sensor 132*c* mounted on a side of the body 110 of the robot 100, and a fourth sensor 132*d* mounted near the hip $J_H$d of the fourth leg 120*d* of the robot 100. In some cases, the sensor system may include a fifth sensor mounted at or near the hand member $128_H$ of the arm 126 of the robot 100. The sensors may include vision/image sensors, inertial sensors (e.g., an inertial measurement unit (IMU)), force sensors, and/or kinematic sensors. For example, the sensors may include one or more of a camera (e.g., a stereo camera), a time-of-flight (TOF) sensor, a scanning light-detection and ranging (lidar) sensor, or a scanning laser-detection and ranging (ladar) sensor. In some examples, the sensor has corresponding field(s) of view $F_V$ defining a sensing range or region corresponding to the sensor. For instance, FIG. 1A depicts a field of a view $F_V$ for the first sensor 132*a* of the robot 100. Each sensor may be pivotable and/or rotatable such that the sensor, for example, changes the field of view $F_V$ about one or more axes (e.g., an x-axis, a y-axis, or a z-axis in relation to a ground plane). In some examples, multiple sensors may be clustered together (e.g., similar to the first sensor 132*a*) to stitch a larger field of view $F_V$ than any single sensor. With multiple sensors placed about the robot 100, the sensor system may have a 360 degree view or a nearly 360 degree view of the surroundings of the robot 100 about vertical and/or horizontal axes.

When surveying a field of view $F_V$ with a sensor, the sensor system generates sensor data 134 (e.g., image data) corresponding to the field of view $F_V$ (see, e.g., FIG. 1B). The sensor system may generate the field of view $F_V$ with a sensor mounted on or near the body 110 of the robot 100 (e.g., sensor(s) 132*a*, 132*c*). The sensor system may additionally and/or alternatively generate the field of view $F_V$ with a sensor mounted at or near the hand member $128_H$ of the arm 126. The one or more sensors capture the sensor data 134 that defines the three-dimensional point cloud for the area within the environment 30 of the robot 100. In some examples, the sensor data 134 is image data that corresponds to a three-dimensional volumetric point cloud generated by a three-dimensional volumetric image sensor. Additionally or alternatively, when the robot 100 is maneuvering within the environment 30, the sensor system gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 of the robot 100. In other words, the sensor system may communicate the sensor data 134 from one or more sensors to any other system of the robot 100 in order to assist the functionality of that system.

In some implementations, the sensor system includes sensor(s) coupled to a joint J. Moreover, these sensors may couple to a motor M that operates a joint J of the robot 100 (e.g., sensors). Here, these sensors generate joint dynamics in the form of joint-based sensor data 134. Joint dynamics collected as joint-based sensor data 134 may include joint angles (e.g., an upper member $122_U$ relative to a lower member $122_L$ or hand member $126_H$ relative to another member 128 of the arm 126 or robot 100), joint speed, joint angular velocity, joint angular acceleration, and/or forces experienced at a joint J (also referred to as joint forces). Joint-based sensor data generated by one or more sensors may be raw sensor data, data that is further processed to form different types of joint dynamics, or some combination of both. For instance, a sensor measures joint position (or a position of member(s) coupled at a joint J) and systems of the robot 100 perform further processing to derive velocity and/or acceleration from the positional data. In other examples, a sensor is configured to measure velocity and/or acceleration directly.

With reference to FIG. 1B, as the sensor system 130 gathers sensor data 134, a computing system 140 stores, processes, and/or to communicates the sensor data 134 to various systems of the robot 100 (e.g., the control system 170, a navigation system 200, a topology component 250, and/or remote controller 10). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including a majority of centralized hardware and a minority of decentralized hardware). To illustrate some differences, a decentralized computing system 140 may allow processing to occur at an activity location (e.g., at motor that moves a joint of a leg) while a centralized computing system 140 may allow for a central processing hub that communicates to systems located at various positions on the robot 100 (e.g., communicate to the motor that moves the joint of the leg).

Additionally or alternatively, the computing system 140 includes computing resources that are located remote from the robot 100. For instance, the computing system 140 communicates via a network 180 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 reside on resources of the remote system 160. In some examples, the topology component 250 is executed on the data processing hardware 142 local to the robot, while in other examples, the topology component 250 is executed on the data processing hardware 162 that is remote from the robot 100.

In some implementations, as shown in FIG. 1B, the robot 100 includes a control system 170. The control system 170 may be configured to communicate with systems of the robot 100, such as the sensor system 130, the navigation system 200, and/or the topology component 250. The control system 170 may perform operations and other functions using hardware such as the computing system 140. The control system 170 includes at least one controller 172 that is configured to control the robot 100. For example, the controller 172 controls movement of the robot 100 to traverse the environment 30 based on input or feedback from the systems of the robot 100 (e.g., the sensor system 130 and/or the control system 170). In additional examples, the controller 172 controls movement between poses and/or behaviors of the robot 100. At least one the controller 172 may be responsible for controlling movement of the arm 126 of the robot 100 in order for the arm 126 to perform various tasks using the hand member $\mathbf{128}_H$. For instance, at least one controller 172 controls the hand member $\mathbf{128}_H$ (e.g., a gripper) to manipulate an object or element in the environment 30. For example, the controller 172 actuates the movable jaw in a direction towards the fixed jaw to close the gripper. In other examples, the controller 172 actuates the movable jaw in a direction away from the fixed jaw to close the gripper.

A given controller 172 of the control system 170 may control the robot 100 by controlling movement about one or more joints J of the robot 100. In some configurations, the given controller 172 is software or firmware with programming logic that controls at least one joint J or a motor M which operates, or is coupled to, a joint J. A software application (a software resource) may refer to computer software that causes a computing device to perform a task. In some examples, a software application may be referred to as an "application," an "app," or a "program." For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $\mathbf{128}_H$) of the robot 100. By controlling one or more joints J, actuators or motors M, the controller 172 may coordinate movement for all different parts of the robot 100 (e.g., the body 110, one or more legs, the arm 126). For example, to perform a behavior with some movements, a controller 172 may be configured to control movement of multiple parts of the robot 100 such as, for example, two legs 120*a*, 120*b*, four legs 120*a*, 120*b*, 120*c*, 120*d*, or two legs 120*a*, 120*b* combined with the arm 126. In some examples, a controller 172 is configured as an object-based controller that is set up to perform a particular behavior or set of behaviors for interacting with an interactable object.

With continued reference to FIG. 1B, an operator 12 (also referred to herein as a user or a client) may interact with the robot 100 via the remote controller 10 that communicates with the robot 100 to perform actions. For example, the operator 12 transmits commands 174 to the robot 100 (executed via the control system 170) via a wireless communication network 16. Additionally, the robot 100 may communicate with the remote controller 10 to display an image on a user interface 190 of the remote controller 10. For example, the user interface 190 is configured to display the image that corresponds to three-dimensional field of view $F_V$ of the one or more sensors. The image displayed on the user interface 190 of the remote controller 10 is a two-dimensional image that corresponds to the three-dimensional point cloud of sensor data 134 (e.g., field of view $F_V$) for the area within the environment 30 of the robot 100. That is, the image displayed on the user interface 190 may be a two-dimensional image representation that corresponds to the three-dimensional field of view $F_V$ of the one or more sensors.

Figure 2:
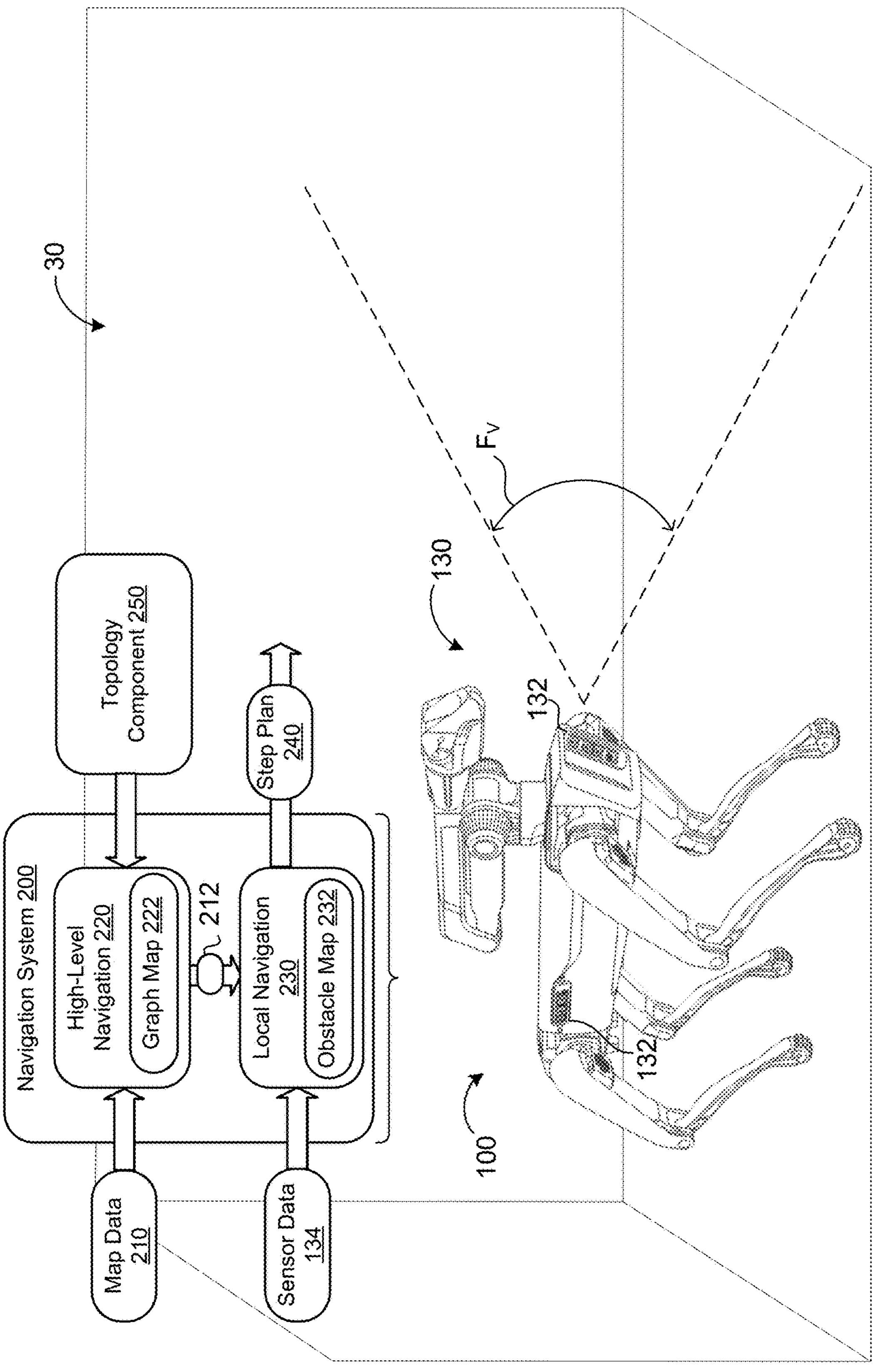
FIG. 2 is a schematic view of exemplary components of the navigation system.

Referring now to FIG. 2, the robot 100 (e.g., the data processing hardware 142) executes the navigation system 200 for enabling the robot 100 to navigate the environment 30. The sensor system 130 includes one or more sensors 132 (e.g., image sensors, lidar sensors, ladar sensors, etc.) that can each capture sensor data 134 of the environment 30 surrounding the robot 100 within the field of view $F_V$. For example, the one or more sensors 132 may be one or more cameras. The sensor system 130 may move the field of view $F_V$ by adjusting an angle of view or by panning and/or tilting (either independently or via the robot 100) one or more sensors 132 to move the field of view $F_V$ in any direction. In some implementations, the sensor system 130 includes multiple sensors 132 (e.g., multiple cameras) such that the sensor system 130 captures a generally 360-degree field of view around the robot 100.

Figure 3A:
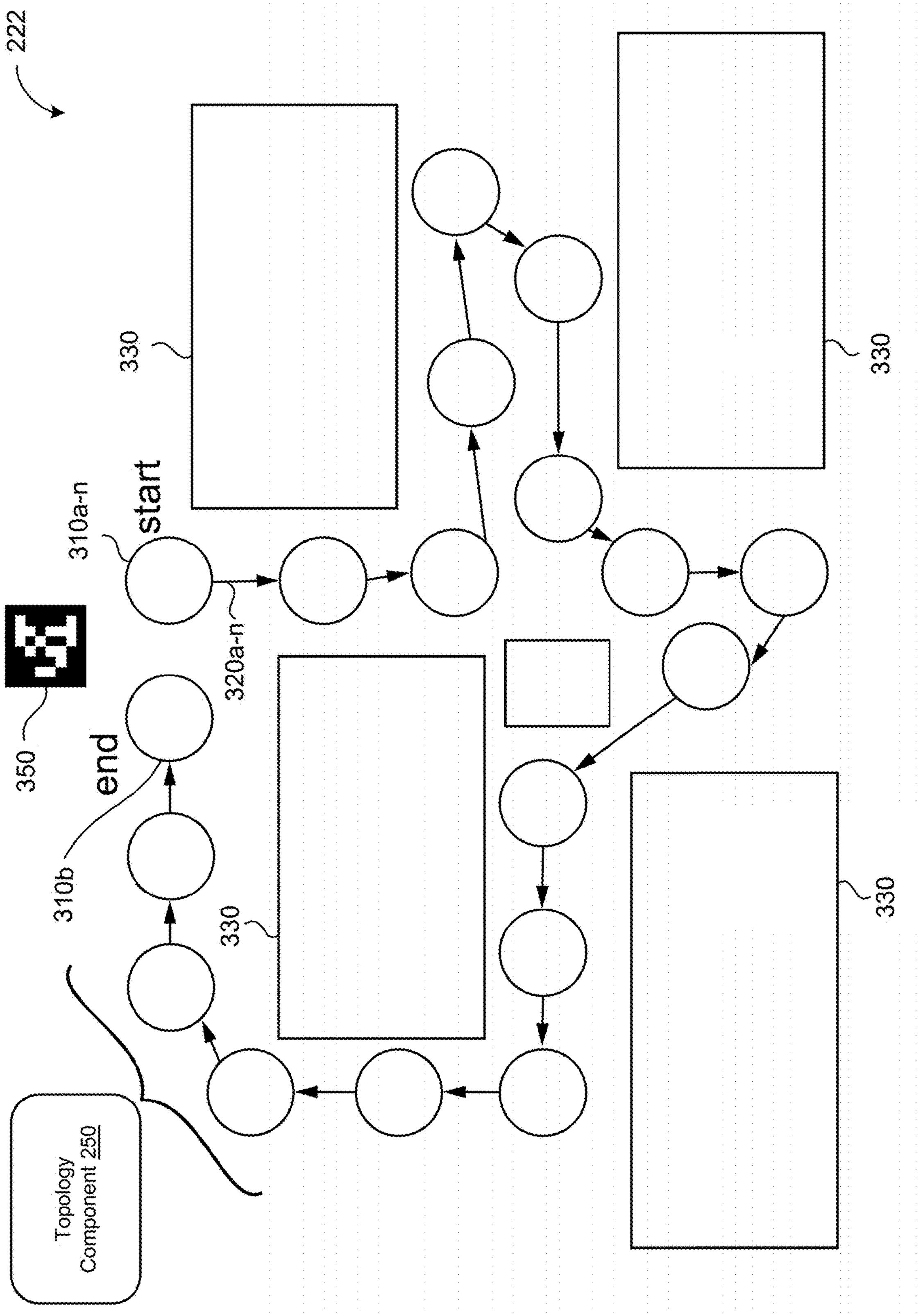
FIG. 3A is a schematic view of a topological map.
Figure 3B:
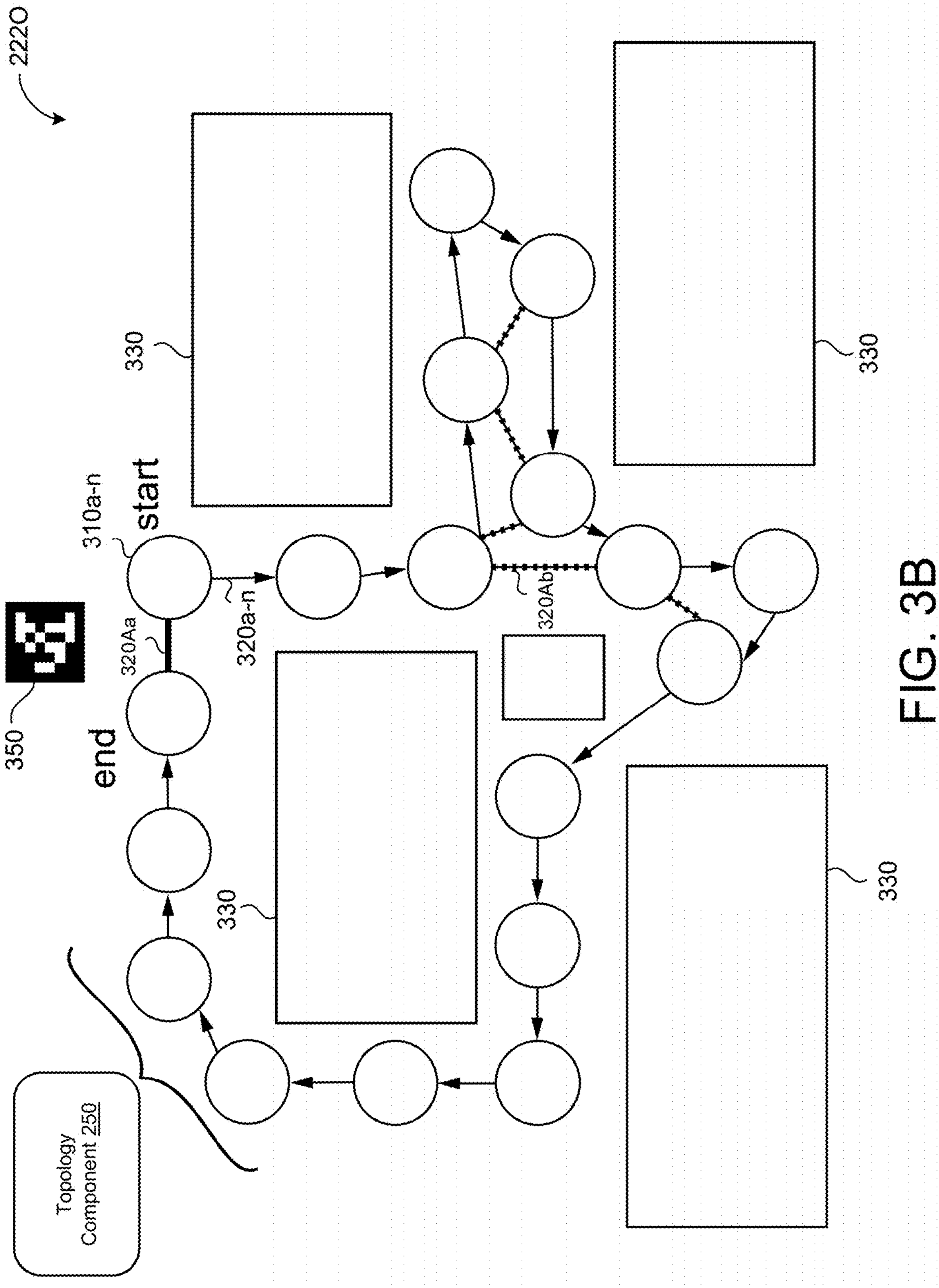
FIG. 3B is a schematic view of a topological map.

In the example of FIG. 2, the navigation system 200 includes a high-level navigation module 220 that receives map data 210 (e.g., high-level navigation data representative of locations of static obstacles in an area the robot 100 is to navigate). In some cases, the map data 210 includes a graph map 222. In other cases, the high-level navigation module 220 generates the graph map 222. The graph map 222 may include a topological map of a given area the robot 100 is to traverse. The high-level navigation module 220 can obtain (e.g., from the remote system 160 or the remote controller 10 or the topology component 250) and/or generate a series of route waypoints (as shown in FIGS. 3A and 3B) on the graph map 222 for a navigation route 212 that plots a path around large and/or static obstacles from a start location (e.g., the current location of the robot 100) to a destination. Route edges may connect corresponding pairs of adjacent route waypoints. In some examples, the route edges record geometric transforms between route waypoints based on odometry data (e.g., odometry data from motion sensors or image sensors to determine a change in the robot's position over time). The route waypoints 310 and the route edges 320 may be representative of the navigation route 212 for the robot 100 to follow from a start location to a destination location.

As discussed in more detail below, in some examples, the high-level navigation module 220 receives the map data 210, the graph map 222, and/or an optimized graph map 222 from the topology component 250. The topology component 250, in some examples, is part of the navigation system 200 and executed locally at or remote from the robot 100.

In some implementations, the high-level navigation module 220 produces the navigation route 212 over a greater than 10-meter scale (e.g., the navigation route 212 may include distances greater than 10 meters from the robot 100). The scale for the high-level navigation module 220 can be set based on the robot 100 design and/or the desired application, and is typically larger than the range of the sensor(s) 132. The navigation system 200 also includes a local navigation module 230 that can receive the navigation route 212 and the image or sensor data 134 from the sensor system 130. The local navigation module 230, using the sensor data 134, can generate an obstacle map 232. The obstacle map 232 may be a robot-centered map that maps obstacles (static and/or dynamic obstacles) in the vicinity (e.g., within a threshold distance) of the robot 100 based on the sensor data 134. For example, while the graph map 222 may include information relating to the locations of walls of a hallway, the obstacle map 232 (populated by the sensor data 134 as the robot 100 traverses the environment 30) may include information regarding a stack of boxes placed in the hallway that were not present during the original recording. The size of the obstacle map 232 may be dependent upon both the operational range of the sensors 132 and the available computational resources.

The local navigation module 230 can generate a step plan 240 (e.g., using an A* search algorithm) that plots all or a portion of the individual steps (or other movements) of the robot 100 to navigate from the current location of the robot 100 to the next route waypoint 310 along the navigation route 212. Using the step plan 240, the robot 100 can maneuver through the environment 30. The local navigation module 230 may obtain a path for the robot 100 to the next route waypoint 310 using an obstacle grid map based on the captured sensor data 134. In some examples, the local navigation module 230 operates on a range correlated with the operational range of the sensor(s) 132 (e.g., four meters) that is generally less than the scale of high-level navigation module 220.

Referring now to FIG. 3A, in some examples, the topology component 250 obtains the graph map 222 (e.g., a topological map) of an environment 30. For example, the topology component 250 receives the graph map 222 from the navigation system 200 (e.g., the high-level navigation module 220) or generates the graph map 222 from map data 210 and/or sensor data 134. The graph map 222 includes a series of route waypoints 310*a-n* and a series of route edges 320*a-n*. Each route edge in the series of route edges 320*a-n* topologically connects a corresponding pair of adjacent route waypoints in the series of route waypoints 310*a-n*. Each route edge represents a traversable route for the robot 100 through an environment of a robot. The map may also include information representing one or more obstacles 330 that mark boundaries where the robot may be unable to traverse (e.g., walls and static objects). In some cases, the graph map 222 may not include information regarding the spatial relationship between route waypoints. The robot may record the series of route waypoints 310*a-n* and the series of route edges 320*a-n* using odometry data captured by the robot as the robot navigates the environment. The robot may record sensor data at all or a portion of the route waypoints such that all or a portion of the route waypoints are associated with a respective set of sensor data captured by the robot (e.g., a point cloud). In some implementations, the graph map 222 includes information related to one or more fiducial markers 350. The one or more fiducial markers 350 may correspond to an object that is placed within the field of sensing of the robot that the robot may use as a fixed point of reference. The one or more fiducial markers 350 may be any object that the robot 100 is capable of readily recognizing, such as a fixed or stationary object of the environment or an object with a recognizable pattern. For example, a fiducial marker 350 may include a bar code, QR-code, or other pattern, symbol, and/or shape for the robot to recognize.

In some cases, the robot may navigate along valid route edges and may not navigate along between route waypoints that are not linked via a valid route edge. Therefore, some route waypoints may be located (e.g., metrically, geographically, physically, etc.) within a threshold distance (e.g., five meters, three meters, etc.) without the graph map 222 reflecting a route edge between the route waypoints. In the example of FIG. 3A, the route waypoint 310*a* and the route waypoint 310*b* are within a threshold distance (e.g., a threshold distance in physical space or reality), Euclidean space, Cartesian space, and/or metric space, but the robot, when navigating from the route waypoint 310*a* to the route waypoint 310*b*, may navigate the entire series of route edges 320*a-n* due to the lack of a route edge directly connecting the route waypoints 310*a*, 310*b*. Therefore, the robot may determine, based on the graph map 222, that there is no direct traversable path between the route waypoints 310*a*, 310*b*. The graph map 222 may represent the route waypoints 310 in global (e.g., absolute positions) and/or local positions where positions of the route waypoints are represented in relation to one or more other route waypoints. The route waypoints may be assigned Cartesian or metric coordinates, such as 3D coordinates (x, y, z translation) or 6D coordinates (x, y, z translation and rotation).

Referring now to FIG. 3B, in some implementations, the topology component 250 determines, using the graph map 222 and sensor data captured by the robot, one or more candidate alternate edges 320Aa, 320Ab. Each of the one or more candidate alternate edges 320Aa, 320Ab can connect a corresponding pair of the series of route waypoints 310*a-n* that may not be connected by one of the series of route edges 320*a-n*. As is discussed in more detail below, for all or a portion of the respective candidate alternate edges 320Aa, 320Ab, the topology component 250 can determine, using the sensor data captured by the robot, whether the robot can traverse the respective candidate alternate edge 320Aa, 320Ab without colliding with an obstacle 330. Based on the topology component 250 determining that the robot 100 can traverse the respective candidate alternate edge 320Aa, 320Ab without colliding with an obstacle 330, the topology component 250 can confirm the respective candidate edge 320Aa and/or 320Ab as a respective alternate edge. In some examples, after confirming and/or adding the alternate edges to the graph map 222, the topology component 250 updates, using nonlinear optimization (e.g., finding the minimum of a nonlinear cost function), the graph map 222 using information gleaned from the confirmed alternate edges. For example, the topology component 250 may add and refine the confirmed alternate edges to the graph map 222 and use the additional information provided by the alternate edges to optimize, as discussed in more detail below, the embedding of the map in space (e.g., Euclidean space and/or metric space). Embedding the map in space may include assigning coordinates (e.g., 6D coordinates) to one or more route waypoints. For example, embedding the map in space may include assigning coordinates (x1, y1, z1) in meters with rotations (r1, r2, r3) in radians. In some cases, all or a portion of the route waypoints may be assigned as set of coordinates. Optimizing the embedding may include finding the coordinates for one or more route waypoints so that the series of route waypoints 310*a-n* of the graph map 222 are globally consistent. In some examples, the topology component 250 optimizes the graph map 222 in real-time (e.g., as the robot collects the sensor data). In other examples, the topology component 250 optimizes the graph map 222 after the robot collects all or a portion of the sensor data.

In this example, the optimized graph map 2220 includes several alternate edges 320Aa, 320Ab. One or more of the alternate edges 320Aa, 320Ab, such as the alternate edge 320Aa may be the result of a "large" loop closure (e.g., by using one or more fiducial markers 350), while other alternate edges 320Aa, 320Ab, such as the alternate edge 320Ab may be the result of a "small" loop closure (e.g., by using odometry data). In some examples, the topology component 250 uses the sensor data to align visual features (e.g., a fiducial marker 350) captured in the data as a reference to determine candidate loop closures. It is understood that the topology component 250 may extract features from any sensor data (e.g., non-visual features) to align. For example, the sensor data may include radar data, acoustic data, etc. For example, the topology processor may use any sensor data that includes features (e.g., with a uniqueness value exceeding or matching a threshold uniqueness value).

Figure 4:
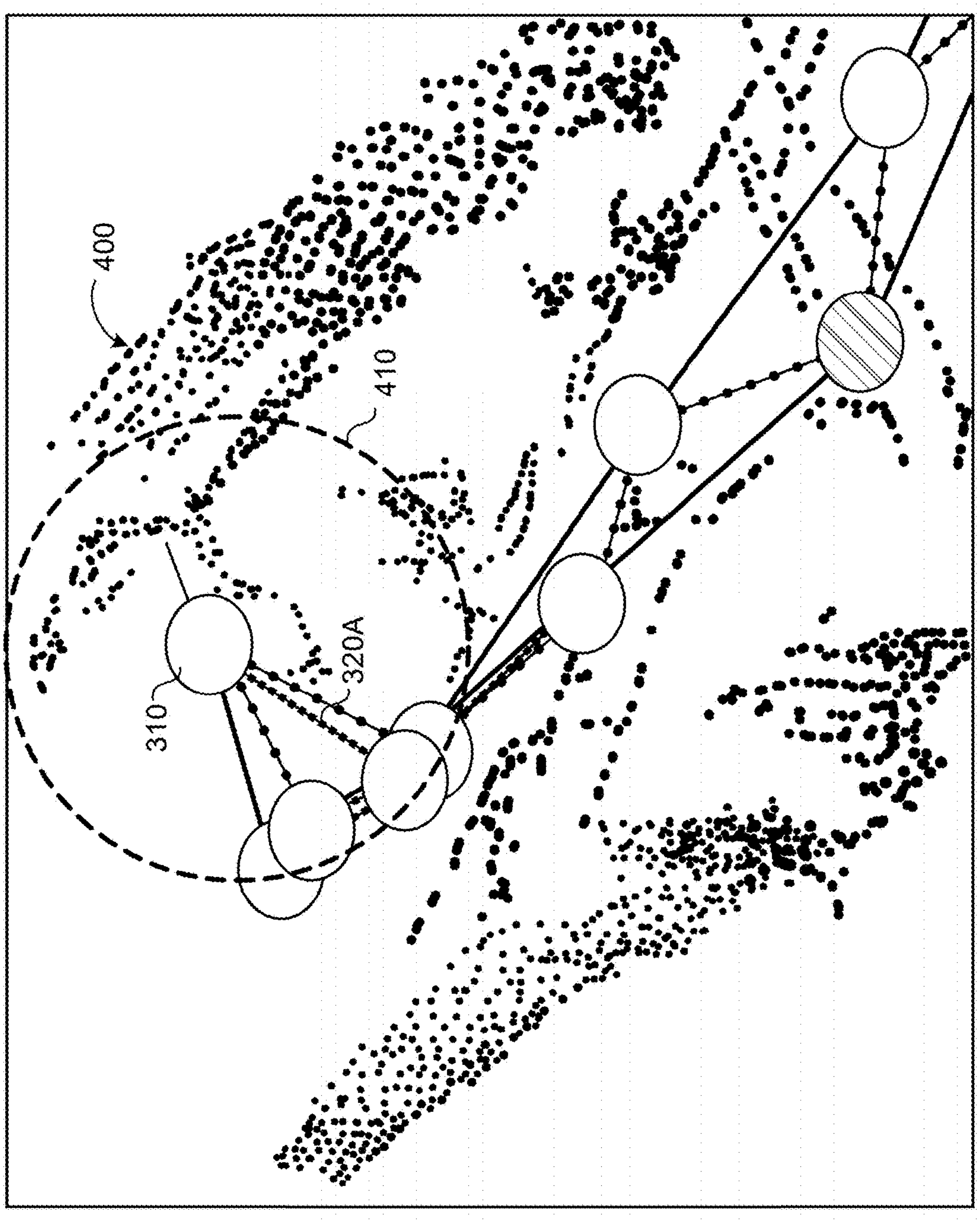
FIG. 4 is a schematic view of an exemplary topological map and candidate alternate edges.

Referring now to FIG. 4, in some implementations, for one or more route waypoints 310, a topology component determines, using a topological map, a local embedding 400 (e.g., an embedding of a waypoint relative to another waypoint). For example, the topology component may represent positions or coordinates of the one or more route waypoints 310 relative to one or more other route waypoints 310 rather than representing positions of the route waypoints 310 globally. The local embedding 400 may include a function that transforms the set of route waypoints 310 into one or more arbitrary locations in a metric space. The local embedding 400 may compensate for not knowing the "true" or global embedding (e.g., due to error in the route edges from odometry error). In some examples, the topology component determines the local embedding 400 using a fiducial marker. For at least one of the one or more route waypoints 310, the topology component can determine whether a total path length between the route waypoint and another route waypoint is less than a first threshold distance 410. In some examples, the topology component can determine whether a distance in the local embedding 400 is less than a second threshold distance, which may be the same or different than the first threshold distance 410. Based on the topology component determining that the total path length between the route waypoint and the other route waypoint is less than the first threshold distance 410 and/or the distance in the local embedding 400 is less than the second threshold distance, the topology component may generate a candidate alternate edge 320A between the route waypoint and the other route waypoint.

Figure 5A:
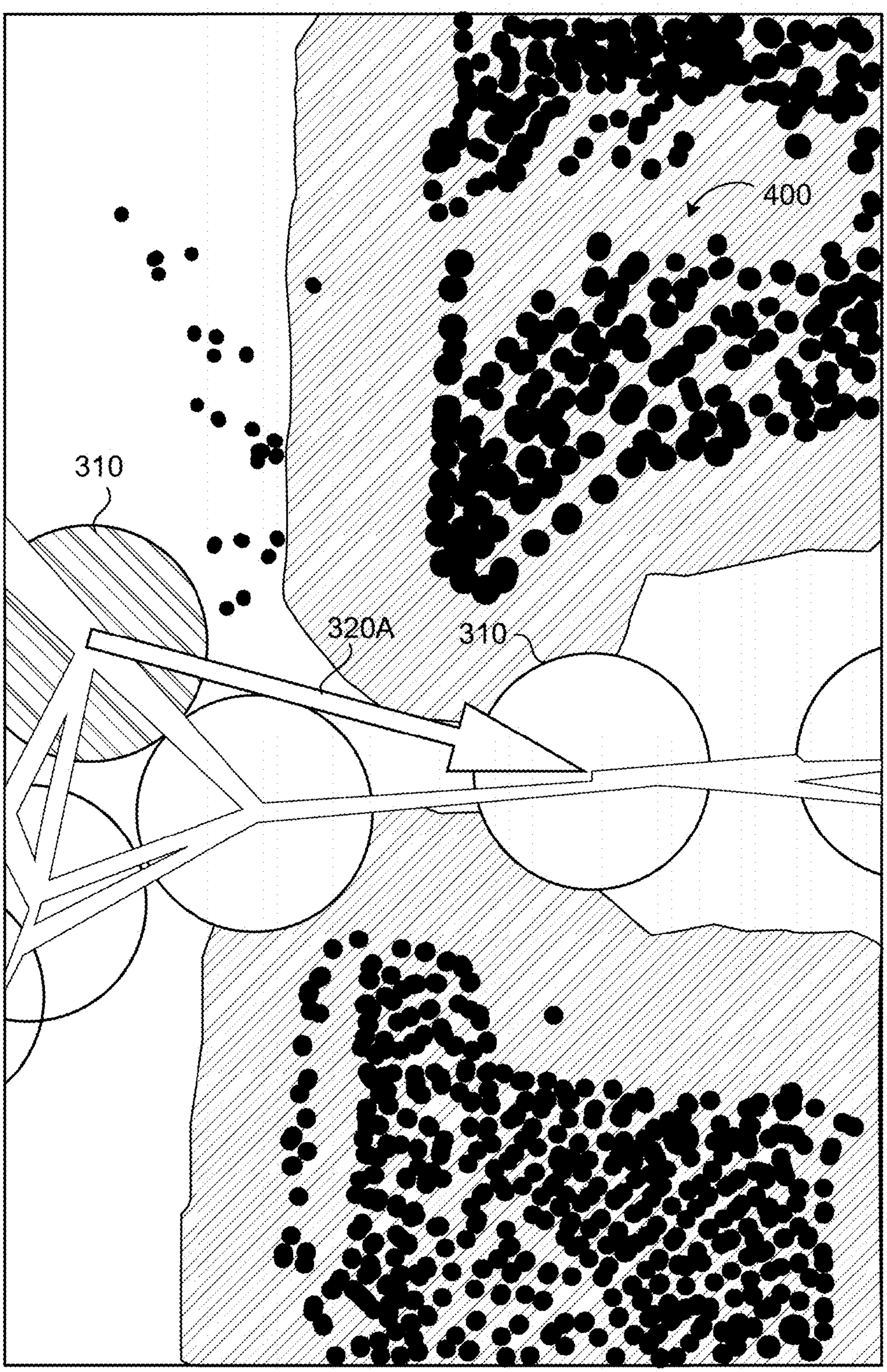
FIG. 5A is a schematic view of confirmation of candidate alternate edges.

Referring now to FIG. 5A, in some examples, the topology component uses and/or applies a path collision checking algorithm (e.g., path collision checking technique). For example, the topology component may use and/or apply the path collision checking algorithm by performing a circle sweep of the candidate alternate edge 320A in the local embedding 400 using a sweep line algorithm, to determine whether a robot can traverse the respective candidate alternate edge 320A without colliding with an obstacle. In some examples, the sensor data associated with all or a portion of the route waypoints 310 includes a signed distance field. The topology component, using the signed distance field, may use a circle sweep algorithm or any other path collision checking algorithm, along with the local embedding 400 and the candidate alternate edge 320A. If, based on the signed distance field and local embedding 400, the candidate alternate edge 320A experiences a collision (e.g., with an obstacle), the topology component may reject the candidate alternate edge 320A.

Figure 5B:
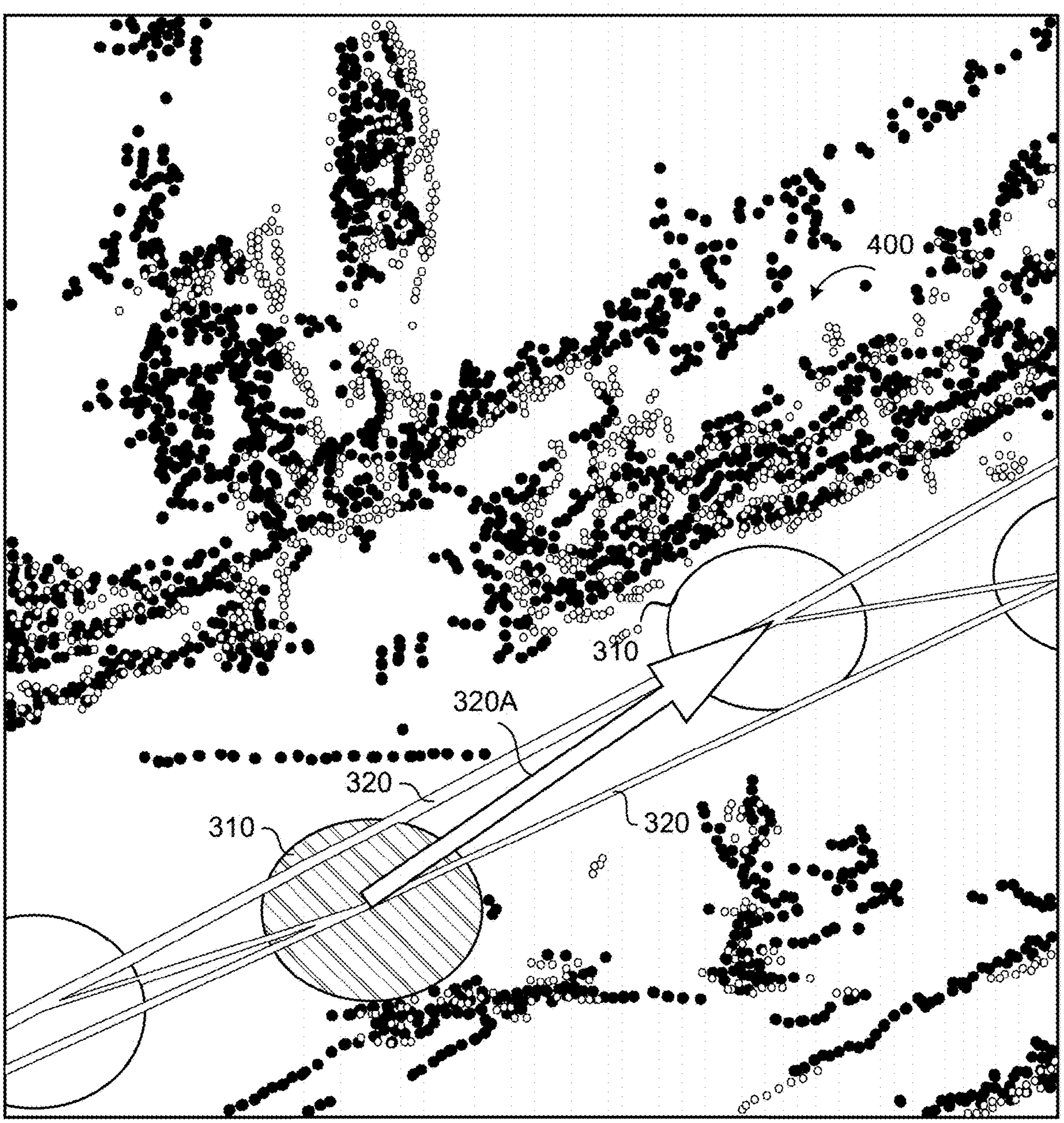
FIG. 5B is a schematic view of confirmation of candidate alternate edges.

Referring now to FIG. 5B, in some examples, the topology component uses/applies a sensor data alignment algorithm (e.g., an iterative closest point (ICP) algorithm, a feature-matching algorithm, a normal distribution transform algorithm, a dense image alignment algorithm, a primitive alignment algorithm, etc.) to determine whether the robot 100 can traverse the respective candidate alternate edge 320A without colliding with an obstacle. For example, the topology component may use the sensor data alignment algorithm with two respective sets of sensor data (e.g., point clouds) captured by the robot at the two respective route waypoints 310 using the local embedding 400 as the seed for the algorithm. The topology component may use the result of the sensor data alignment algorithm as a new edge transformation for the candidate alternate edge 320A. If the topology component determines the sensor data alignment algorithm fails, the topology component may reject the candidate alternate edge 320A (e.g., not confirm the candidate alternate edge 320A as an alternate edge).

Figure 6A:
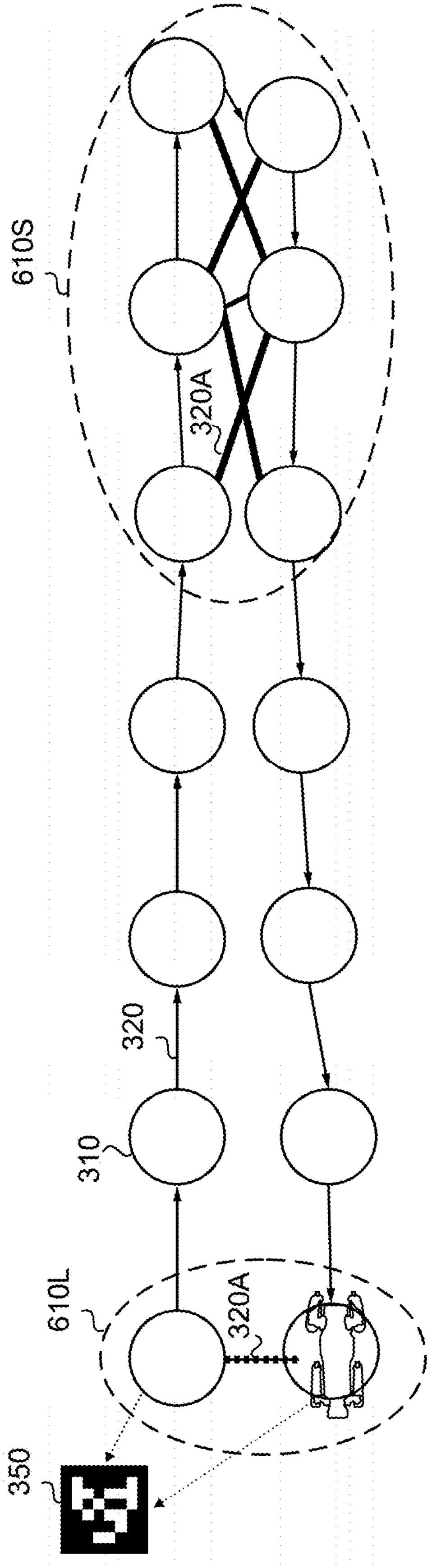
FIG. 6A is a schematic view of a large loop closure.
Figure 6B:
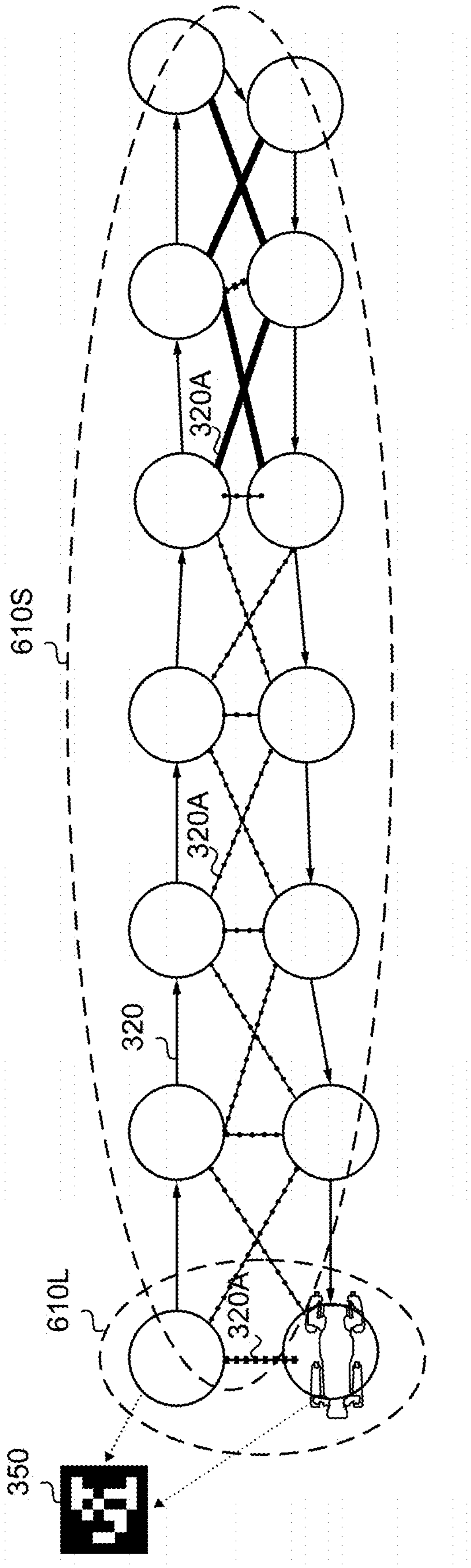
FIG. 6B is a schematic view of a small loop closure.

Referring now to FIG. 6A, in some implementations, the topology component determines one or more candidate alternate edges 320A using "large" loop closures 610L. For example, the topology component uses a fiducial marker 350 for an embedding to close large loops (e.g., loops that include a chain of multiple route waypoints 310 connected by corresponding route edges 320) by aligning or correlating the fiducial marker 350 from the sensor data of all or a portion of the respective route waypoints 310. To determine the remaining candidate alternate edges 320A, the topology component may use "small" loop closure 610S using odometry data to determine candidate alternate edges 320A for local portions of a topological map. As illustrated in FIG. 6B, in some examples, the topology component iteratively determines the candidate alternate edges 320A by performing multiple small loop closures 610S, as each loop closure may add additional information when a new confirmed alternate edge 320A is added.

Figure 7A:
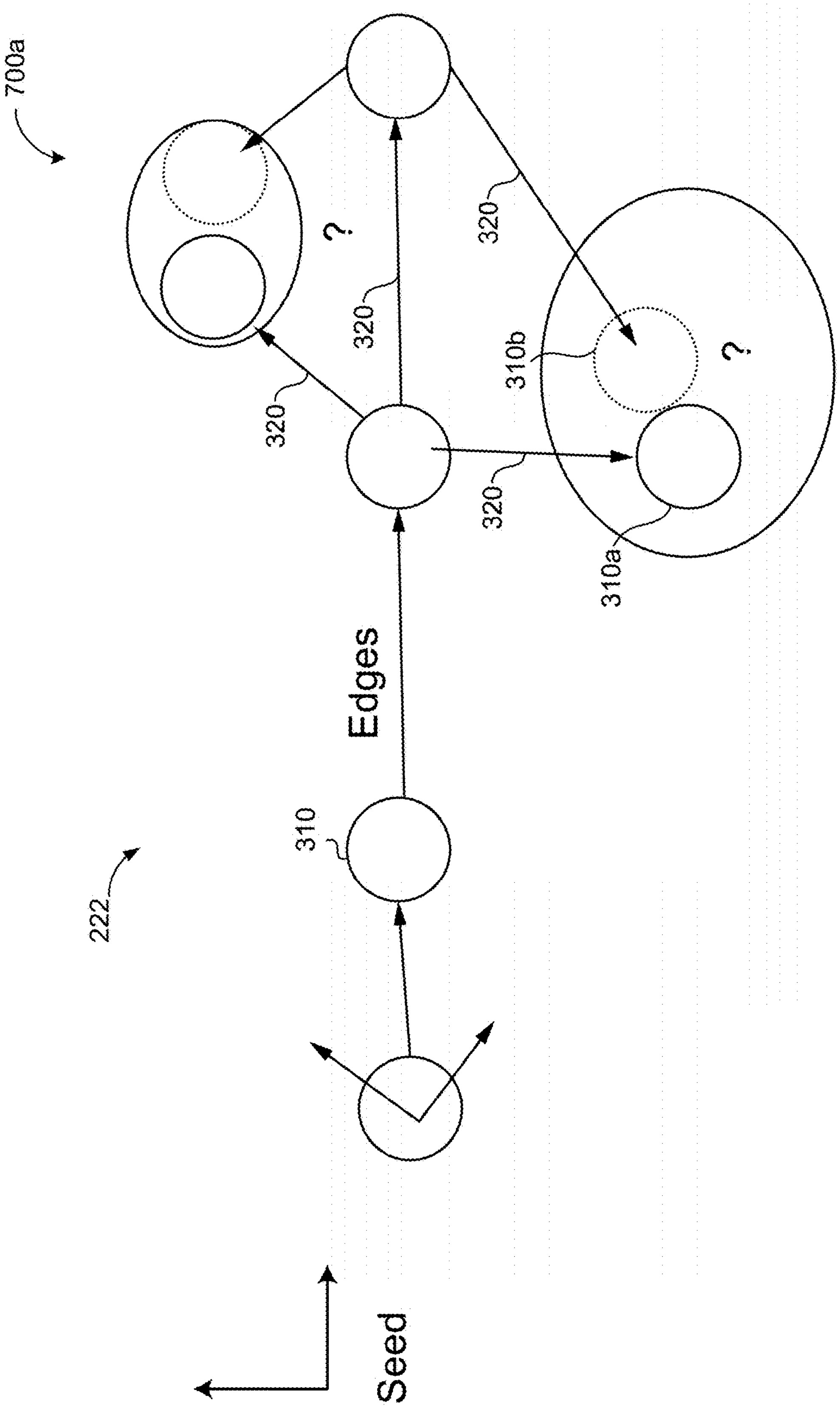
FIG. 7A is a schematic view of a metrically inconsistent topological map.
Figure 7B:
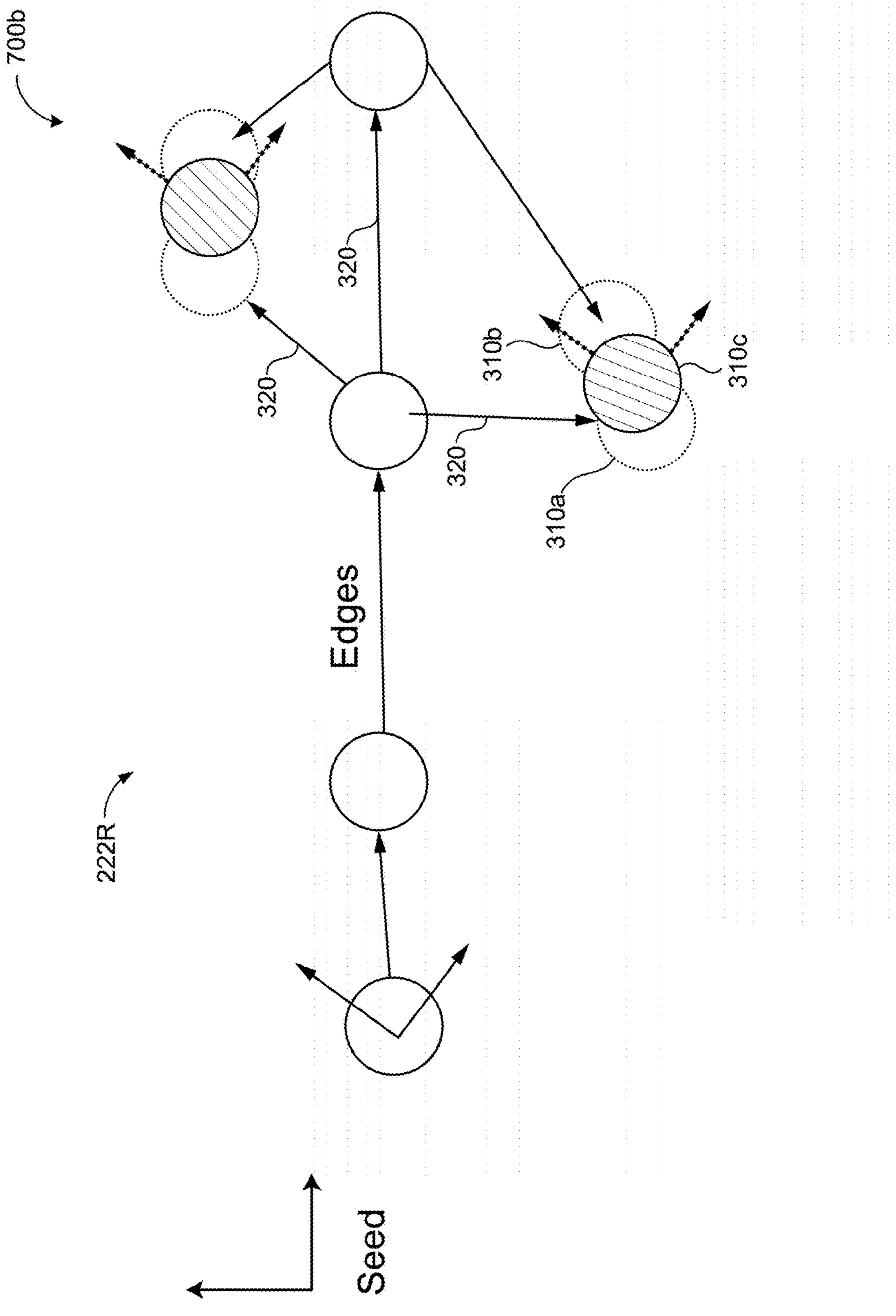
FIG. 7B is a schematic view of a metrically consistent topological map.

Referring now to FIGS. 7A and 7B, a graph map 222 (e.g., topological maps used by autonomous and semi-autonomous robots) may not be metrically consistent. A graph map 222 may be metrically consistent if, for any pair of route waypoints 310, a robot can follow a path of route edges 320 from the first route waypoint 310 of the pair to the second route waypoint 310 of the pair. For example, a graph map 222 may be metrically consistent if each route waypoint 310 of the graph map 222 is associated with a set of coordinates that is consistent with each path of routes edges 320 from another route waypoint 310 to the route waypoint 310. Additionally, for one or more paths in an embedding, the resulting position/orientation of the first route waypoint 310 with respect to the second route waypoint 310 (and vice versa) may be the same as the relative position/orientation of route waypoints of one or more other paths. When the graph map 222 is not metrically consistent, the embeddings may be misleading and/or inefficient to draw correctly. Metric consistency may be affected by processes that lead to odometry drift and localization error. For example, while individual route edges 320 may be accurate as compared to an accuracy threshold value, the accumulation of small errors over a large number of route edges 320 over time may not be accurate as compared to an accuracy threshold value.

A schematic view 700*a* of FIG. 7A illustrates an exemplary graph map 222 that is not metrically consistent because it includes inconsistent edges (e.g., due to odometry error) that results in multiple possible embeddings. While the route waypoints 310*a*, 310*b* may be metrically in the same location (or metrically within a particular threshold value of the same location), the graph map 222, due to odometry error from the different route edges 320, may include the route waypoints 310*a*, 310*b* at different locations which may cause the graph map 222 to be metrically inconsistent.

Figure 8A:
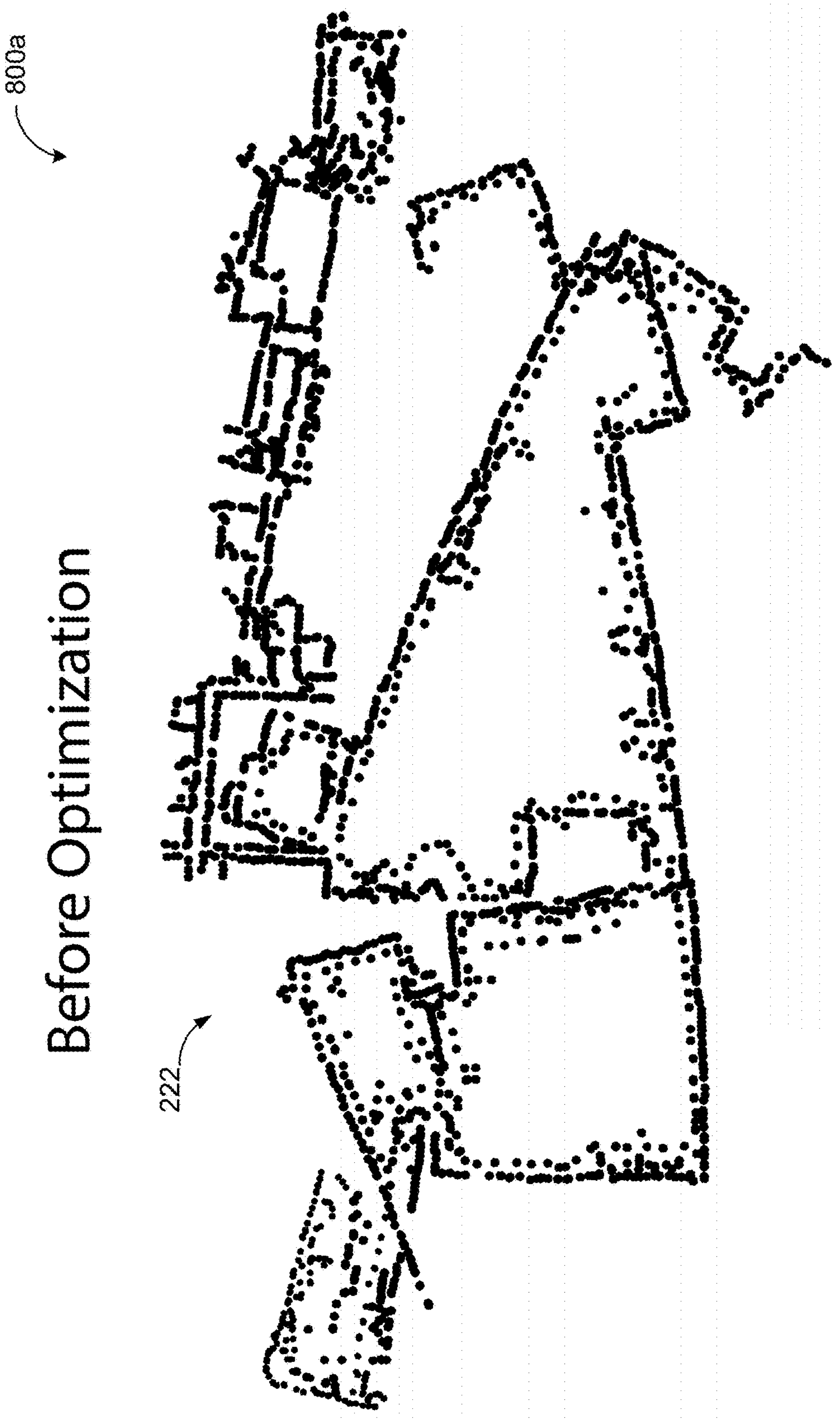
FIG. 8A is a schematic view of a metrically inconsistent topological map.
Figure 8B:
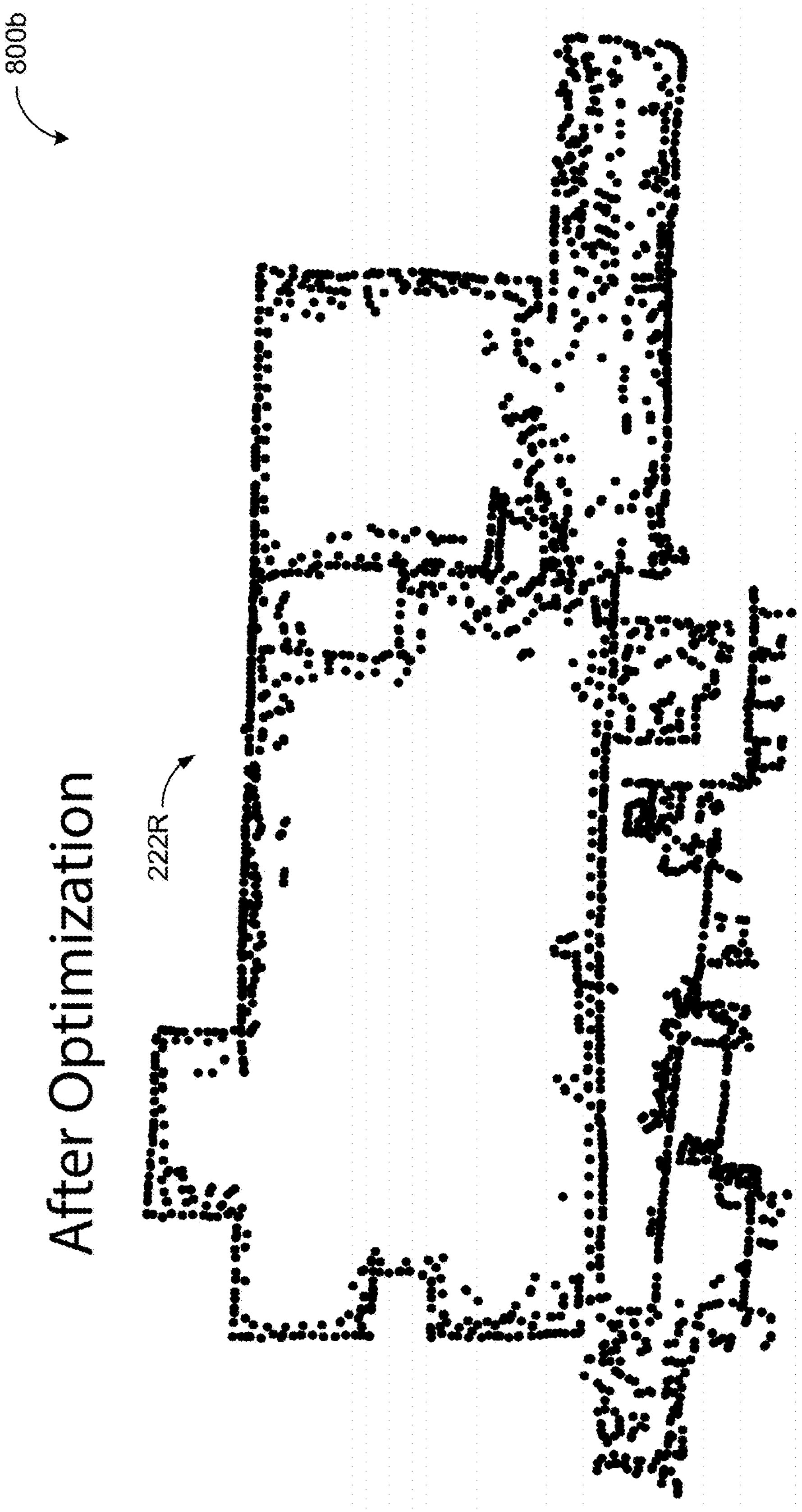
FIG. 8B is a schematic view of a metrically consistent topological map.

Referring now to FIG. 7B, in some implementations, a topology component refines the graph map 222 to obtain a refined graph map 222R that is metrically consistent. For example, a schematic view 700*b* includes a refined graph map 222R where the topological component has averaged together the contributions from all or a portion of the route edges 320 in the embedding. Averaging together the contributions from all or a portion of the route edges 320 may implicitly optimize the sum of squared error between the embeddings and the implied relative location of the route waypoints 310 from their respective neighboring route waypoints 310. The topology component may merge or average the metrically inconsistent route waypoints 310*a*, 310*b* into a single metrically consistent route waypoint 310*c*. In some implementations, the topology component determines an embedding (e.g., a Euclidean embedding) using sparse nonlinear optimization. For example, the topology component may identify a global metric embedding (e.g., an optimized global metric embedding) for all or a portion of the route waypoints 310 such that a particular set of coordinates are identified for each route waypoint using sparse nonlinear optimization. FIG. 8A includes a schematic view 800*a* of an exemplary graph map 222 prior to optimization. The graph map 222 is metrically inconsistent and may be difficult to understand for a human viewer. In contrast, FIG. 8B includes a schematic view 800*b* of a refined graph map 222R based on the topology component optimizing the graph map 222 of FIG. 8A. The refined graph map 222R may be metrically consistent (e.g., all or a portion of the paths may cross topologically in the embedding) and may appear more accurate to a human viewer.

Figure 9:
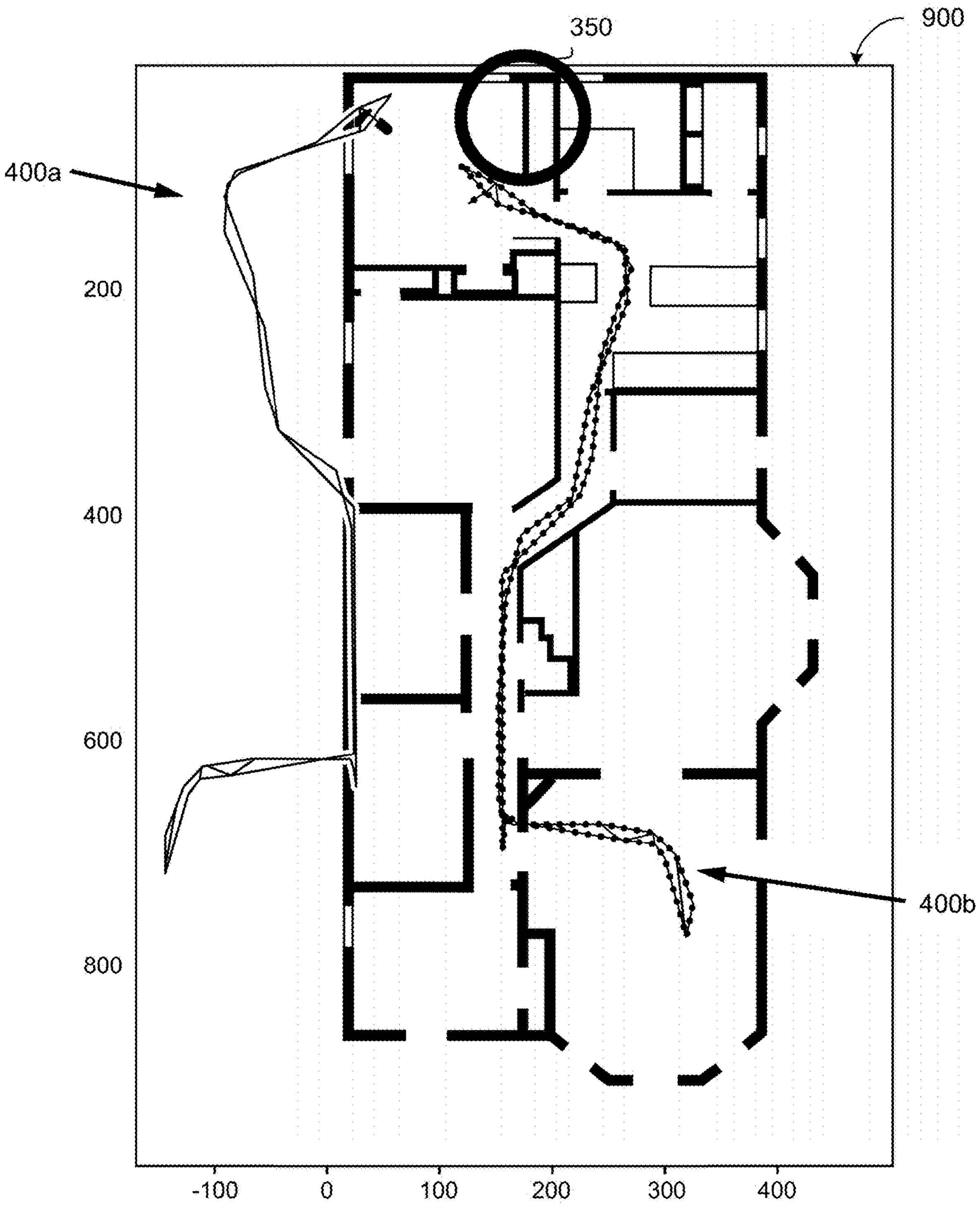
FIG. 9 is a schematic view of an embedding aligned with a blueprint.

Referring now to FIG. 9, in some examples, the topology component updates the graph map 222 using all or a portion of confirmed candidate alternate edge by correlating one or more route waypoints with a specific metric location. In the example of FIG. 9, a user computing device has provided an "embedding" (e.g., an anchoring) of a metric location for the robot by correlating a fiducial marker 350 with a location on a blueprint 900. Without the provided embedding, the default embedding 400*a* may not align with the blueprint 900 (e.g., may not align with a metric or physical space). However, based on the provided embedding, the topology component may generate the optimized embedding 400*b* which aligns with the blueprint 900. The user may embed or anchor or "pin" route waypoints to the embedding by using one or more fiducial markers 350 (or other distinguishable portions of the environment). For example, the user may provide the topology component with data to tie one or more route waypoints to respective specific locations (e.g., metric locations, physical locations, and/or geographical locations) and optimize the remaining route waypoints and route edges. Therefore, the topology component may optimize the remaining route waypoints based on the embedding. The topology component may use costs connecting two route waypoints or embeddings or costs/constraints on individual route waypoints. For example, the topology component 250 may constrain a gravity vector for all or a portion of the route waypoint embeddings to point upward by adding a cost on the dot product between the gravity vector and the "up" vector.

Thus, implementations herein can include a topology component that, in some examples, performs both odometry loop closure (e.g., small loop closure) and fiducial loop closure (e.g., large loop closure) to generated candidate alternate edges. The topology component may verify or confirm all or a portion of the candidate alternate edges by, for example, performing collision checking using signed distance fields and refinement and rejection sampling using visual portions of the environment. The topology component may iteratively refine the topological map based up confirmed alternate edges and optimize the topological map using an embedding of the graph given the confirmed alternate edges (e.g., using sparse nonlinear optimization). By reconciling the topology of the environment, the robot is able to navigate around obstacles and obstructions more efficiently and is able to disambiguate localization between spaces that are supposed to be topologically connected automatically.

Figure 10A:
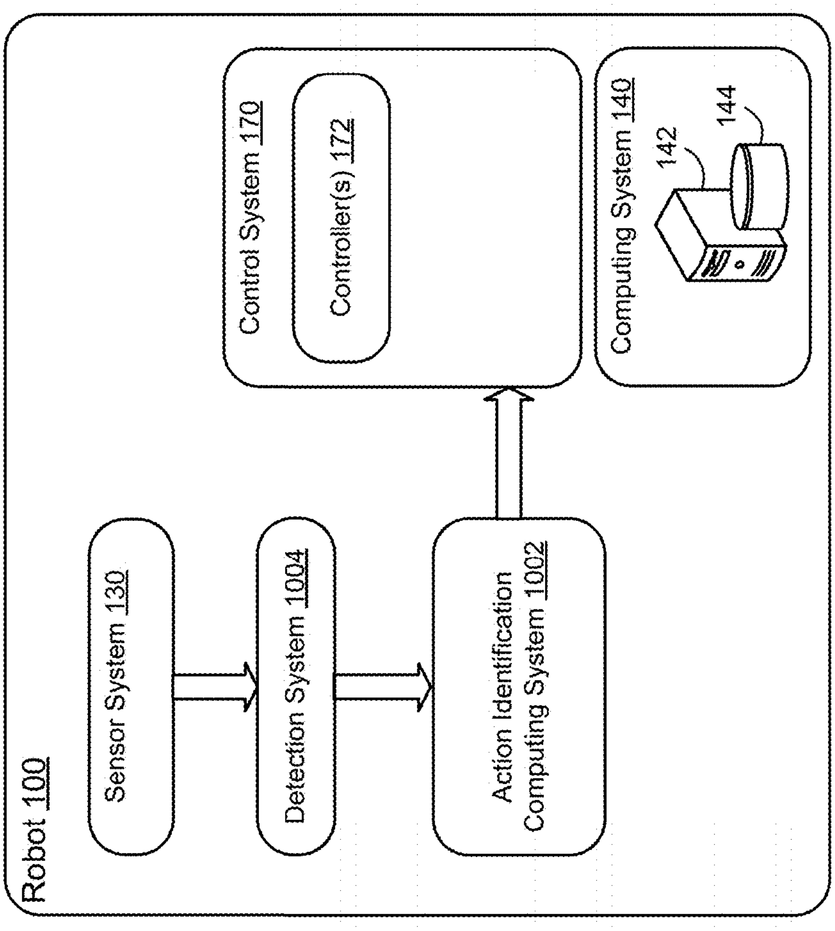
FIG. 10A is a schematic view of a plurality of systems of a robot of FIG. 1A.

Referring now to FIG. 10A, as discussed above with reference to FIG. 1B, the robot 100 can include a sensor system 130, a detection system 1004, a computing system 140, a control system 170, and an action identification computing system 1002. The sensor system 130 can gather sensor data, the action identification computing system 1002 can store, process, and/or communicate the sensor data to various systems of the robot 100 (e.g., the control system 170). The computing system 140 includes data processing hardware 142 and memory hardware 144. The control system 170 includes controller(s) 172.

In the example of FIG. 10A, the sensor system 130 is in communication with the detection system 1004. For example, the detection system 1004 may include a feature detection system and/or a mover detection system. In some cases, the sensor system 130 may include all or a portion of the detection system 1004.

The sensor system 130 may include a plurality of sensors (e.g., five sensors). For example, the sensor system 130 may include a plurality of sensors distributed across the body, one or more legs, arm, etc. of the robot. The sensor system 130 may receive sensor data from each of the plurality of sensors. The sensors may include at least two different types of sensors. For example, the sensor data may include lidar sensor data, image or camera sensor data, ladar sensor data, etc.

In some cases, the sensor data may include three-dimensional point cloud data. The sensor system 130 (or a separate system) may use the three-dimensional point cloud data to detect and track features within a three-dimensional coordinate system. For example, the sensor system 130 may use the three-dimensional point cloud data to detect and track movers within the environment.

The sensor system 130 may provide the sensor data to the detection system 1004 to determine whether the sensor data is associated with a particular feature (e.g., representing or corresponding to an adult human, a child human, a robot, an animal, etc.). The detection system 1004 may be a feature detection system (e.g., an entity detection system) that implements one or more detection algorithms to detect particular features within an environment of the robot and/or a mover detection system that implements one or more detection algorithms to detect a mover within the environment.

In some cases, the detection system 1004 may include one or more machine learning models (e.g., a deep convolutional neural network) trained to provide an output indicating whether a particular input (e.g., particular sensor data) is associated with a particular feature (e.g., includes the particular feature). For example, the detection system 1004 may implement a real-time object detection algorithm (e.g., a You Only Look Once object detection algorithm) to generate the output. Therefore, the detection system 1004 may generate an output indicating whether the sensor data is associated with the particular feature.

The detection system 1004 may output a bounding box identifying one or more features in the sensor data. The detection system 1004 (or a separate system) may localize the detected feature into three-dimensional coordinates. Further, the detection system 1004 (or a separate system) may translate the detected feature from a two-dimensional coordinate system to a three-dimensional coordinate system. For example, the detection system 1004 may perform a depth segmentation to translate the output and generate a detection output. In another example, the detection system 1004 may project a highest disparity pixel within the bounding box of the detected feature into the three-dimensional coordinate system.

Further, the detection system 1004 may output a subset of point cloud data identifying a mover in the environment. For example, the detection system 1004 may provide a subset of point cloud data, in three-dimensional coordinates, that identifies a location of a mover in the environment.

In some cases, the machine learning model may be an instance segmentation-based machine learning model. In other cases, the detection system 1004 may provide the detected feature to an instance segmentation-based machine learning model and the instance segmentation-based machine learning model may perform the depth segmentation (e.g., may perform clustering and foreground segmentation).

In some cases, the detection system 1004 may perform wall plane subtraction and/or ground plane subtraction. For example, the detection system 1004 may project a model (e.g., a voxel-based model) of the environment into the bounding box of the detected feature and subtract depth points that correspond to a wall plane or a ground plane.

The sensor system 130 routes the sensor data and/or the detection output to the action identification computing system 1002. In some cases, the sensor system 130 (or a separate system) can include sensors having different sensor types (e.g., a lidar sensor and a camera) and/or different types of detection systems (e.g., a feature detection system and a mover detection system). The sensor system 130 can include a component to fuse the sensor data associated with each of the multiple sensors and detection systems to generate fused data and may provide the fused data to the action identification computing system 1002.

Figure 10B:
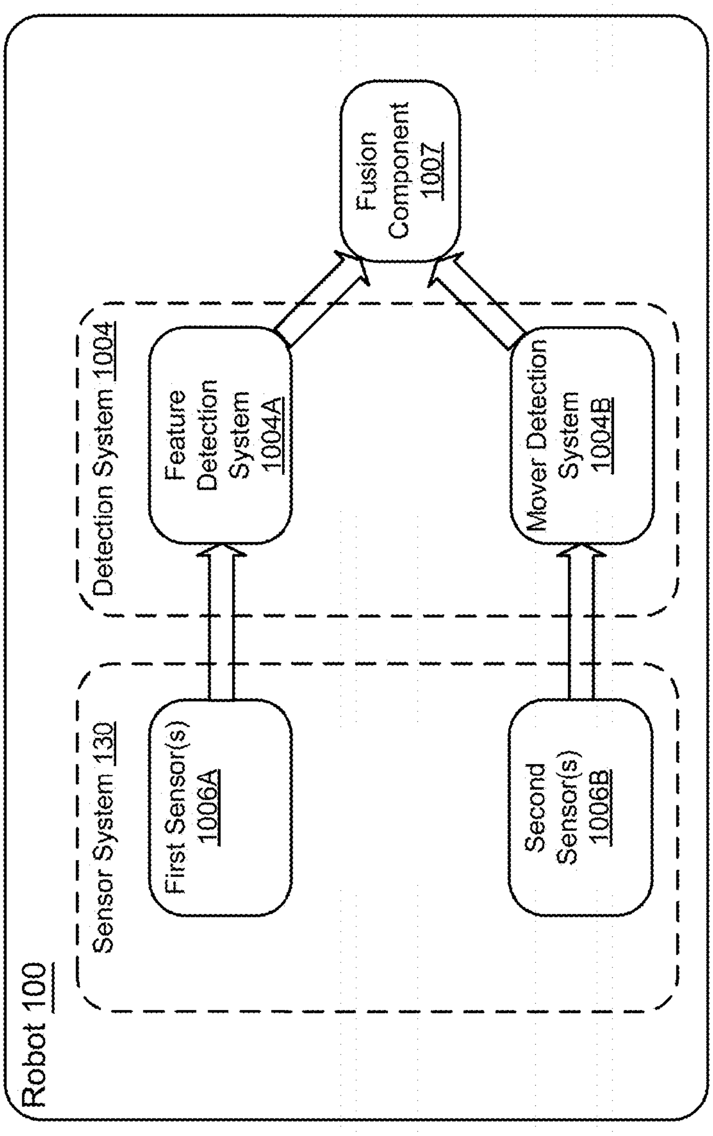
FIG. 10B is a schematic view of a plurality of systems of a robot of FIG. 1A.

Turning to FIG. 10B, the robot includes the sensor system 130, the detection system 1004, and a fusion component 1007. The sensor system 130 includes one or more first sensors 1006A (e.g., one or more cameras) and one or more second sensors 1006B (e.g., one or more lidar sensors). The detection system 1004 includes a feature detection system 1004A and a mover detection system 1004B. The sensor system 130 and/or the detection system 1004 may be in communication with the fusion component 1007. In some cases, one or more of the sensor system 130 and/or the detection system 1004 may include the fusion component 1007.

The one or more first sensors 1006A may provide first sensor data (e.g., camera image data) to the feature detection system 1004A. The feature detection system 1004A may detect one or more features (e.g., identify and classify the one or more features as corresponding to a particular obstacle, object, entity, or structure) in the first sensor data (e.g., using a machine learning model). The one or more second sensors 1006B may provide second sensor data (e.g., lidar data, sonar data, radar data, ladar data, etc.) to the mover detection system 1004B. The mover detection system 1004B may detect one or more movers (e.g., identify and classify one or more features as a mover or non-mover) in the second sensor data (e.g., as a subset of point cloud data). The feature detection system 1004A may provide feature detection data (e.g., a portion of the first sensor data corresponding to the detected features) to the fusion component 1007 and the mover detection system 1004B may provide mover detection data (e.g., a portion of the second sensor data corresponding to the detected movers) to the fusion component 1007. The fusion component 1007 may fuse the feature detection data and the mover detection data to remove duplicative data from the mover detection data and/or the mover detection data and may generate fused data. In some cases, the fused data may correspond to a single data model (e.g., a single persistent data model). The fusion component 1007 may provide the fused data to the action identification computing system 1002 (as shown in FIG. 10A).

Returning to FIG. 10A, based on receiving the fused data from the fusion component 1007 and/or based on receiving unfused data from the detection system 1004, the action identification computing system 1002 may generate and/or implement one or more actions. For example, the fused data may identify a classification of a particular mover within an environment of the robot and the action identification computing system 1002 may identify a particular action associated with the particular classification. The action identification computing system 1002 may identify the particular action associated with the particular classification based on data linking the particular action to the particular classification. For example, the action identification computing system 1002 may include a data store (e.g., a cache) linking each of a plurality of classifications to a particular action.

The particular action may include one or more actions to be performed by the robot 100. The particular reaction may be considered a reaction to the classification produced by the detection system 1004. For example, the particular action may include an adjustment to the navigational behavior of the robot 100, a physical action (e.g., an interaction) to be implemented by the robot 100, an alert to be displayed by the robot 100, engaging specific systems for interacting with the mover (e.g., for recognizing human gestures or negotiating with the humans), and/or a user interface to be displayed by the robot 100. The particular action may also involve larger systems than the robot itself, such as calling for human assistance in robot management or communicating with other robots within a multi-robot system in response to recognition of particular types of movers from the fused data.

The action identification computing system 1002 may route the one or more actions to a particular system of the robot 100. For example, the action identification computing system 1002 may include the navigation system 200 (FIG. 1B). The action identification computing system 1002 may determine that the action includes an adjustment to the navigational behavior of the robot 100 and may route the action to the navigation system 200 to cause an adjustment to the navigational behavior of the robot 100. In some cases, the action identification computing system 1002 may include additional computing systems. For example, the action identification computing system 1002 may include one or more controllers of the robot 100.

In some cases, the action identification computing system 1002 may route the one or more actions to the control system 170. The control system 170 may implement the one or more actions using the controller(s) 172 to control the robot 100. For example, the controller(s) 172 may control movement of the robot 100 to traverse the environment 30 based on input or feedback from the systems of the robot 100 (e.g., the sensor system 130 and/or the control system 170). In another example, the controller(s) 172 may control movement of an arm and/or leg of the robot 100 to cause the arm and/or leg to interact with a mover (e.g., wave to the mover).

In some cases, the action identification computing system 1002 (or another system of the robot 100) may route the one or more actions to a computing system separate from the robot 100 (e.g., located separately and distinctly from the robot 100). For example, the action identification computing system 1002 may route the one or more actions to a user computing device of a user (e.g., a remote controller of an operator, a user computing device of an entity within the environment, etc.), a computing system of another robot, a centralized computing system for coordinating multiple robots within a facility, a computing system of a non-robotic machine, etc. Based on routing the one or more actions to the other computing system, the action identification computing system 1002 may cause the other computing system to provide an alert, display a user interface, etc. For example, the action identification computing system 1002 may cause the other computing system to provide an alert indicating that the robot 100 is within a particular threshold distance of a particular mover. In some cases, the action identification computing system 1002 may cause the other computing system to display an image on a user interface indicating a field of view of one or more sensors of the robot. For example, the action identification computing system 1002 may cause the other computing system to display an image on a user interface indicating a presence of a particular mover within a field of view of one or more sensors of the robot 100 and/or indicating a classification of the particular mover.

Figure 10C:
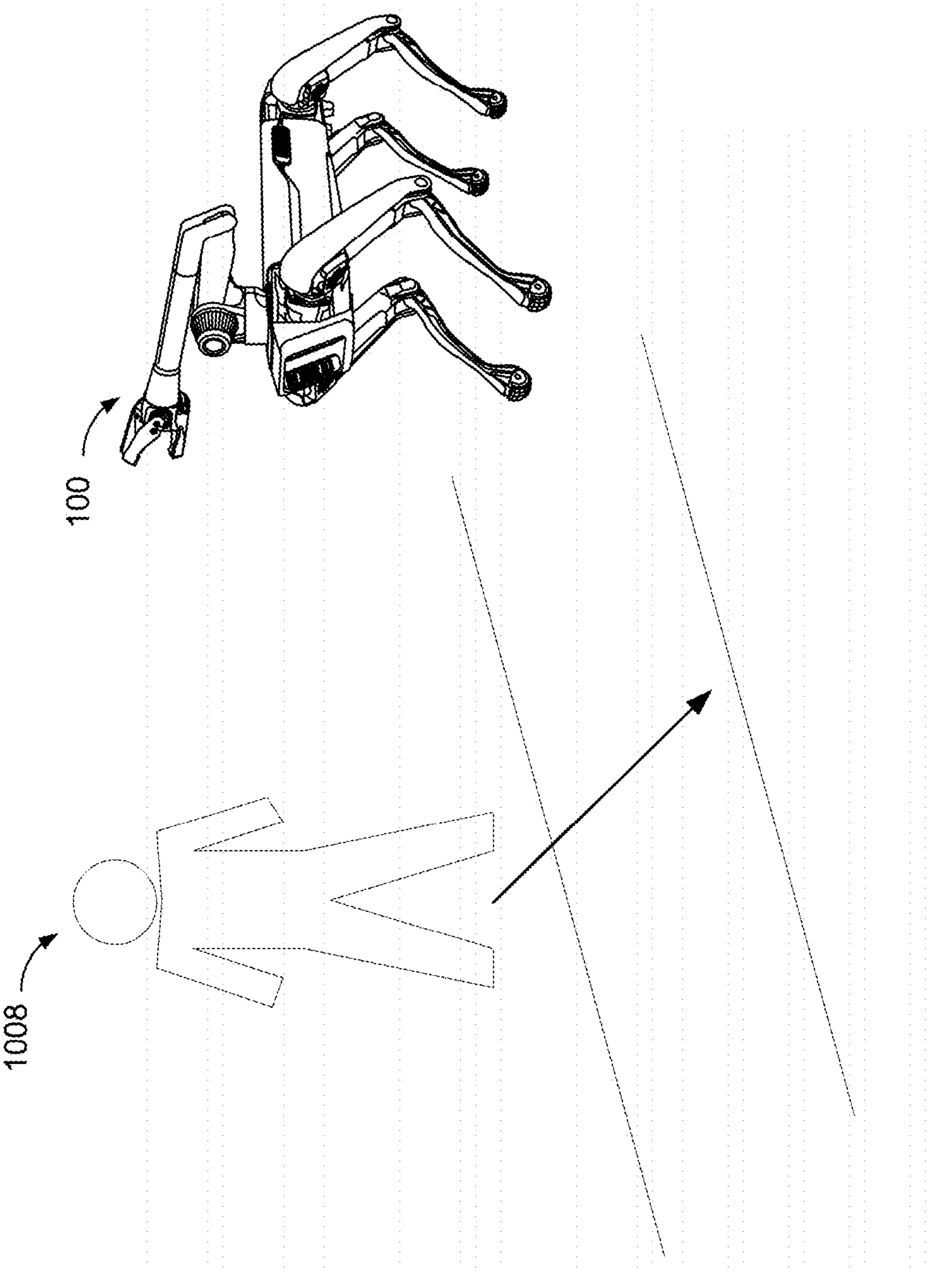
FIG. 10C is a schematic view of a robot of FIG. 1A.

Turning to FIG. 10C, the robot 100 is located within an environment that includes a mover 1008. In the example of FIG. 10C, the mover 1008 is a human (e.g., a human crossing the road). The robot 100 may identify the mover 1008 using the sensor system 130 and the detection system 1004. Further, the robot 100 may identify a particular action using the action identification computing system 1002 and may implement the action. The action may include reacting to the mover 1008. For example, the robot 100 may communicate with the mover 1008 (e.g., display a user interface, display an alert, implement a physical gesture, etc.), communicate with another robot (e.g., route electronic communications indicating the presence of the mover 1008, requesting assistance, requesting instructions, etc.), communicate with another computing device (e.g., communicate with an operator computing device to request assistance, request instructions, etc.), adjust or determine a navigational behavior of the robot 100 (e.g., to stop navigation, to pause navigation for a particular time period, to navigate around the mover 1008, etc.), etc.

Figure 11A:
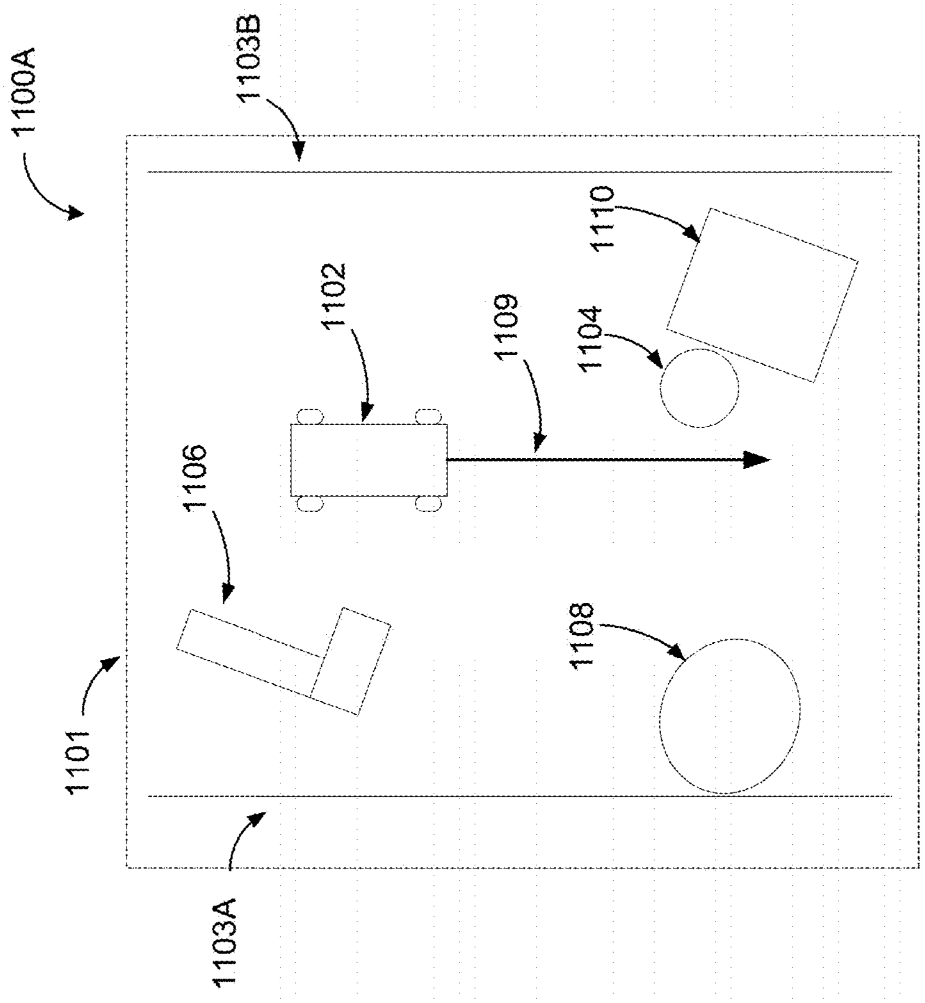
FIG. 11A is a schematic view of a robot navigating in an environment with a stationary feature.

FIG. 11A depicts a schematic view 1100A of sensor data. The sensor data may include robot route data 1109 identifying a route of a legged robot 1102 like that of FIG. 1A within an environment 1101. The schematic view 1100A includes a virtual representation of the environment 1101 and features within the virtual representation of the environment 1101. The virtual representation includes a first feature 1104, a second feature 1106, a third feature 1108, a fourth feature 1110, a fifth feature 1103A, and a sixth feature 1103B. It will be understood that all or a portion of the first feature 1104, the second feature 1106, the third feature 1108, the fourth feature 1110, the fifth feature 1103A, and the sixth feature 1103B may include a collection (e.g., plurality) of features. For example, the first feature 1104 may include a collection of features that a system groups as the first feature 1104. In the example of FIG. 11A, the fifth feature 1103A and the sixth feature 1103B represent walls of the environment 1101 and the environment 1101 may be bounded by the fifth feature 1103A and the sixth feature 1103B. It will be understood that the virtual representation and the environment 1101 are illustrative only, and the virtual representation of the environment 1101 may include any features. Additionally, the features within the data may be considerably more detailed than the schematic illustration of FIG. 11A.

As discussed above, a topology component (e.g., a topology component of the robot 1102) can obtain sensor data from one or more sensors of a robot (e.g., the robot 1102 or a different robot). The one or more sensors can generate the sensor data as the robot 1102 traverses the site.

The topology component can generate the robot route data 1109, or refine pre-instructed robot route data 1109, based on the sensor data, generation of the sensor data, and/or traversal of the site by the robot 1102. The robot route data 1109 can include a plurality of route waypoints and a plurality of route edges as described with respect to FIGS. 3A-9. In the example of FIG. 11A, the robot route data 1109 includes a single route edge. It will be understood that the robot route data 1109 may include more, less, or different route waypoints and/or route edges. All or a portion of the plurality of route waypoints may be linked to a portion of sensor data.

As discussed above, the robot route data 1109 may represent a traversable route for the robot 1102 through the environment 1101. For example, the traversable route may identify a route for the robot 1102 such that the robot 1102 can traverse the route without interacting with (e.g., running into, being within a particular threshold distance of, etc.) an object, obstacle, entity, or structure corresponding to some or all of the example features discussed herein. In some cases, the traversable route may identify a route for the robot 1102 such that robot 1102 can traverse the route and interact with all or a portion of the example features discussed herein (e.g., by climbing a stair).

Prior to, during, or subsequent to traversal of the environment 1101 by the robot 1102, the robot 1102 may collect sensor data (e.g., additional sensor data) identifying features within the environment 1101. For example, the robot 1102 may collect sensor data identifying the first feature 1104, the second feature 1106, the third feature 1108, the fourth feature 1110, the fifth feature 1103A, and the sixth feature 1103B. The robot 1102 may route the sensor data to a detection system.

In some cases, the a detection system (e.g., a feature detection system and/or a mover detection system) may identify and classify each of the first feature 1104, the second feature 1106, the third feature 1108, the fourth feature 1110, the fifth feature 1103A, and the sixth feature 1103B the detection system may include a feature detection system to identify and classify all or a portion of the first feature 1104, the second feature 1106, the third feature 1108, the fourth feature 1110, the fifth feature 1103A, and the sixth feature 1103B as corresponding to particular objects, obstacles, entities, structures, etc. (e.g., humans, animals, robots, etc.) and/or a mover detection system to identify and classify all or a portion of the first feature 1104, the second feature 1106, the third feature 1108, the fourth feature 1110, the fifth feature 1103A, and the sixth feature 1103B as a mover. In some cases, the detection system may be a single detection system that receives sensor data and a set of identified features (e.g., sensor data having a single type of sensor data) and classifies the set of identified features (e.g., as a mover and/or as corresponding to a particular object, obstacle, entity, structure, etc.).

The mover detection system may identify and classify which of the first feature 1104, the second feature 1106, the third feature 1108, the fourth feature 1110, the fifth feature 1103A, and the sixth feature 1103B are movers (e.g., at least a portion of the corresponding feature is moved, has moved, and/or a manner in which the feature is predicted to move based on a prior movement within the environment 1101). For example, the mover detection system may obtain a set of identified features and classify all or a portion of the set of identified features as movers or non-movers.

Further, the feature detection system may identify and classify each of the first feature 1104, the second feature 1106, the third feature 1108, the fourth feature 1110, the fifth feature 1103A, and the sixth feature 1103B as corresponding to a specific object, obstacle, entity, structure, etc. (e.g., adult human, child human, robot, stair, wall, general obstacle, ramp, etc.). For example, the feature detection system may classify the first feature 1104 as a human, the second feature 1106 as a ramp, the third feature 1108 as a general obstacle, the fourth feature 1110 as a stair, the fifth feature 1103A as a first wall, and the sixth feature 1103B as a second wall.

In some cases (e.g., where the detection system includes a mover detection system and a feature detection system), the detection system may fuse the output of multiple sub-detection systems. In other cases, the detection system may include a single detection system and the output of the detection system may not be fused.

Based on the output of the detection system classifying each of the first feature 1104, the second feature 1106, the third feature 1108, the fourth feature 1110, the fifth feature 1103A, and the sixth feature 1103B, the robot 1102 can identify one or more actions for the robot 1102. In the example of FIG. 11A, based on the output of the detection system identifying and classifying each of the first feature 1104, the second feature 1106, the third feature 1108, the fourth feature 1110, the fifth feature 1103A, and the sixth feature 1103B (e.g., the output not classifying a particular feature as a human), the robot 1102 may determine that an action should not performed (e.g., that a navigational behavior of the robot 1102 should not be adjusted).

Figure 11B:
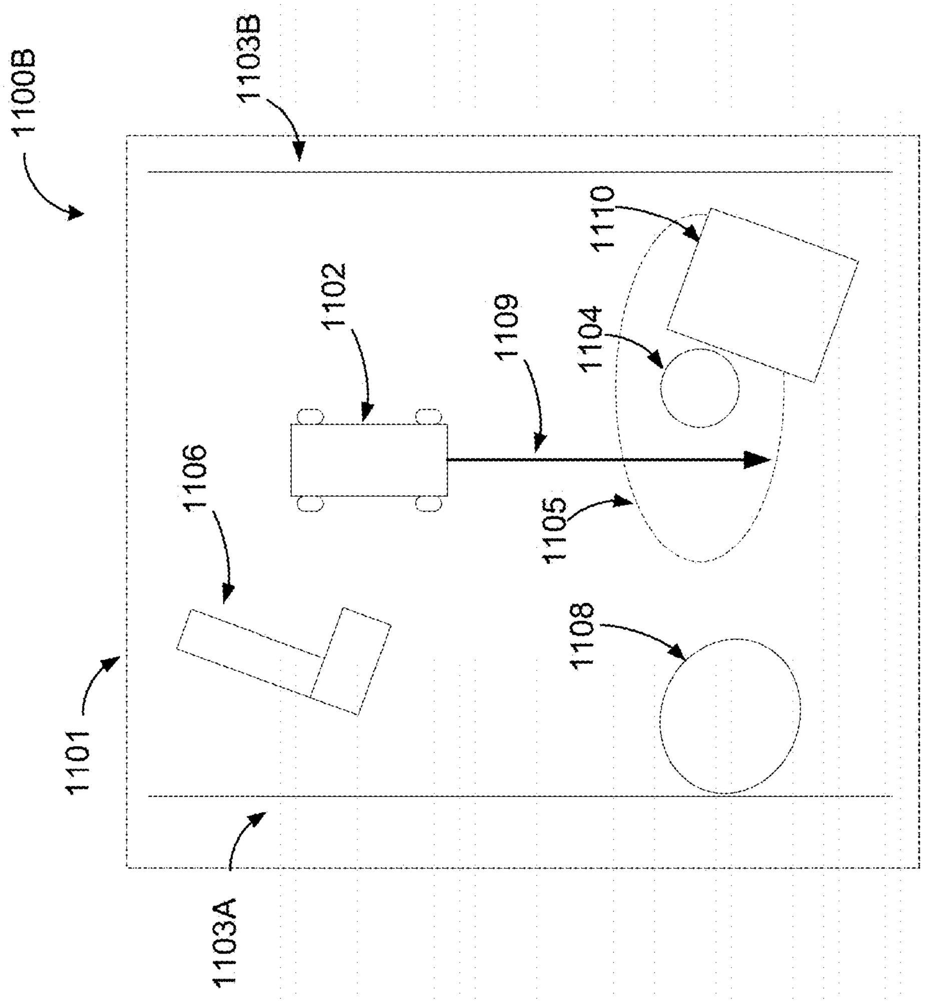
FIG. 11B is a schematic view of a robot navigating in an environment with a stationary feature with a corresponding threshold.

FIG. 11B depicts a schematic view 1100B of sensor data. The sensor data may include robot route data 1109 identifying a route of a legged robot 1102, like that of FIG. 1A, within an environment 1101, as discussed above. The schematic view 1100B includes a virtual representation of the environment 1101 and features within the environment 1101. The virtual representation includes a first feature 1104, a second feature 1106, a third feature 1108, a fourth feature 1110, a fifth feature 1103A, and a sixth feature 1103B. It will be understood that the virtual representation and the environment 1101 are illustrative only, and the virtual representation of the environment 1101 may include any features.

As discussed above, a topology component (e.g., a topology component of the robot 1102) can generate robot route data 1109 for traversal of the environment 1101 by the robot 1102. Prior to, during, or subsequent to traversal of the environment 1101 by the robot 1102, the robot 1102 may collect sensor data identifying features within the environment 1101. A detection system of the robot 1102 may identify and classify each of the first feature 1104, the second feature 1106, the third feature 1108, the fourth feature 1110, the fifth feature 1103A, and the sixth feature 1103B within the sensor data.

Based on the identification and classification of each of the first feature 1104, the second feature 1106, the third feature 1108, the fourth feature 1110, the fifth feature 1103A, and the sixth feature 1103B, the robot 1102 may identify a corresponding threshold distance (e.g., a caution zone) associated with each of the first feature 1104, the second feature 1106, the third feature 1108, the fourth feature 1110, the fifth feature 1103A, and the sixth feature 1103B. In some cases, the threshold distance may be a threshold distance may be a threshold distance from a particular feature (e.g., representing a corner of an object, an edge of a staircase, etc.), a threshold distance from an object, obstacle, entity, or structure (e.g., a center of an object, a perimeter or exterior of the object, etc.), or any other threshold distance. For example, the threshold distance may identify a particular threshold distance from an object, obstacle, entity, or structure corresponding to the particular feature.

The robot 1102 can identify, using the robot route data 1109 and/or location data associated with the robot 1102, whether the robot 1102 is within or is predicted to be within the particular threshold distance of the object, obstacle, entity, or structure corresponding to the particular feature. Based on identifying whether the robot 1102 is within or is predicted to be within the particular threshold distance, the robot 1102 can implement one or more particular actions associated with the feature. In some cases, the robot 1102 may identify the corresponding threshold distance for all or a portion of the first feature 1104, the second feature 1106, the third feature 1108, the fourth feature 1110, the fifth feature 1103A, and/or the sixth feature 1103B by parsing data within a data store that links one or more classifications of a feature to one or more threshold distances.

In the example of FIG. 11B, the classified first feature 1104 is associated in the computing system with a first threshold distance 1105. While the schematic view 1100B depicts a single threshold distance (e.g., the first threshold distance 1105), it will be understood that all or a portion of the features may be associated with one or more threshold distances. Further, it will be understood that the first threshold distance 1105 may be a different threshold distance than what is shown in FIG. 11B (e.g., may be smaller, larger, a different shape, etc.).

As discussed above, based on classifying each of the first feature 1104, the second feature 1106, the third feature 1108, the fourth feature 1110, the fifth feature 1103A, and the sixth feature 1103B, the robot 1102 can identify one or more actions for the robot 1102. In the example of FIG. 11B, based on identifying and classifying each of the second feature 1106, the third feature 1108, the fourth feature 1110, the fifth feature 1103A, and the sixth feature 1103B are as non-movers and/or the robot 1102 is not located within or predicted to be located within a corresponding threshold distance of each object, obstacle, entity, or structure corresponding to the second feature 1106, the third feature 1108, the fourth feature 1110, the fifth feature 1103A, and the sixth feature 1103B, the robot 1102 may determine that an action should not performed (e.g., that a navigational behavior of the robot 1102 should not be adjusted) with respect to the second feature 1106, the third feature 1108, the fourth feature 1110, the fifth feature 1103A, and the sixth feature 1103B. Based on identifying that the robot 1102 (e.g., a central location relative to the body of the robot 1102) is located within and/or predicted to be located within the first threshold distance 1105, the robot 1102 may identify an action associated with the first feature 1104 and cause implementation of the action.

In some cases, the robot 1102 may not cause implementation of the action based on determining that the first feature 1104 is not a mover. For example, the robot 1102 may determine that the first feature 1104 is not moving and/or is not predicted to move within the environment 1101 and may not implement the action.

Figure 11C:
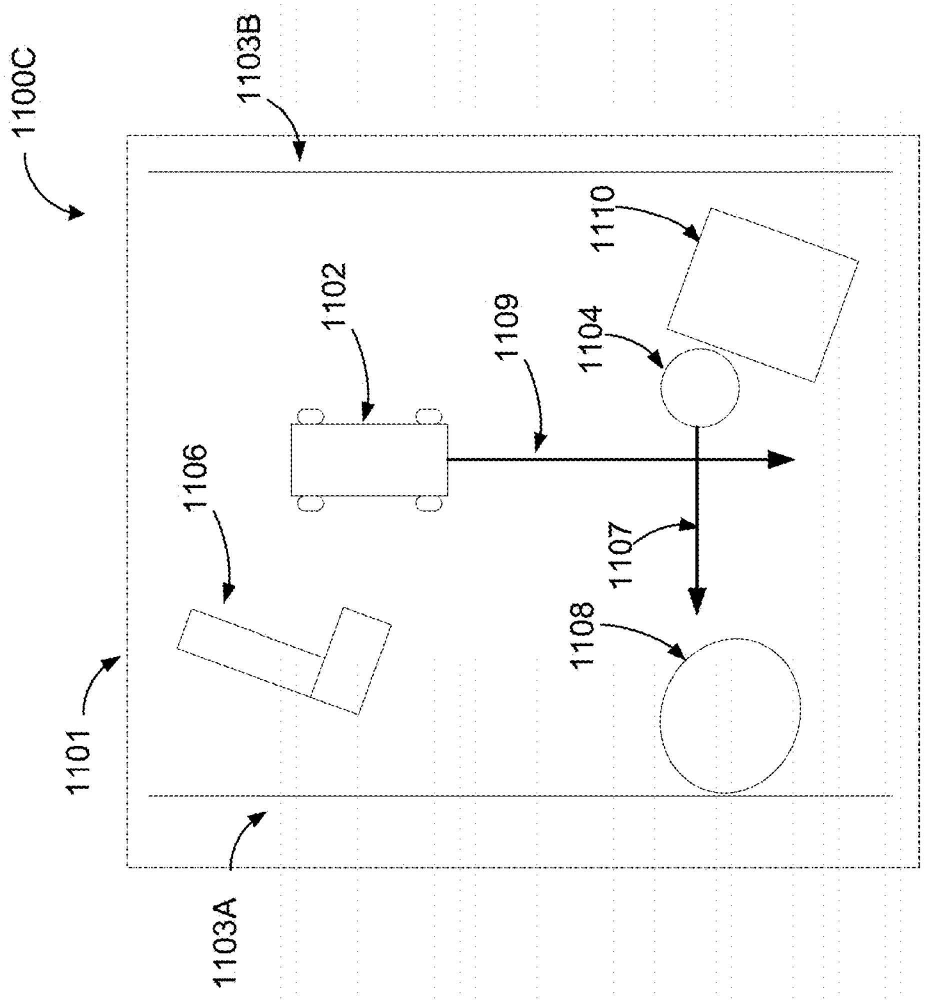
FIG. 11C is a schematic view of a robot navigating in an environment with a mover.

FIG. 11C depicts a schematic view 1100C of sensor data. The sensor data may include robot route data 1109 identifying a route of a legged robot 1102, like that of FIG. 1A, within an environment 1101, as discussed above. The schematic view 1100C includes a virtual representation of the environment 1101 and features within the environment 1101. The virtual representation includes a first feature 1104, a second feature 1106, a third feature 1108, a fourth feature 1110, a fifth feature 1103A, and a sixth feature 1103B. It will be understood that the virtual representation and the environment 1101 are illustrative only, and the virtual representation of the environment 1101 may include any features.

As discussed above, a topology component (e.g., a topology component of the robot 1102) can generate robot route data 1109 for traversal of the environment 1101 by the robot 1102. Prior to, during, or subsequent to traversal of the environment 1101 by the robot 1102, the robot 1102 may collect sensor data identifying features within the environment 1101. A detection system of the robot 1102 may identify and classify each of the first feature 1104, the second feature 1106, the third feature 1108, the fourth feature 1110, the fifth feature 1103A, and the sixth feature 1103B within the sensor data.

As discussed above, the detection system may identify and classify all or a portion of the first feature 1104, the second feature 1106, the third feature 1108, the fourth feature 1110, the fifth feature 1103A, and the sixth feature 1103B as corresponding to different obstacles, objects, entities, structures, etc. For example, the detection system may identify and classify all or a portion of the first feature 1104, the second feature 1106, the third feature 1108, the fourth feature 1110, the fifth feature 1103A, and the sixth feature 1103B as representing different types of obstacles, objects, entities, structures, etc. Based on the identification and classification of each feature, the robot 1102 can identify one or more actions for the robot 1102. In the example of FIG. 11C, based on identifying and classifying each of the second feature 1106, the third feature 1108, the fourth feature 1110, the fifth feature 1103A, and the sixth feature 1103B, the robot 1102 may determine that an action should not performed (e.g., that a navigational behavior of the robot 1102 should not be adjusted) with respect to those features. Further, based on identifying that the first feature 1104 and classifying the first feature 1104 as representing a human, the robot 1102 can determine an action and cause performance of the action with respect to the first feature 1104 (e.g., as the robot 1102 approaches an object, obstacle, entity, or structure corresponding to the first feature 1104).

As discussed above, in some cases, the detection system may identify and classify whether each of the first feature 1104, the second feature 1106, the third feature 1108, the fourth feature 1110, the fifth feature 1103A, and the sixth feature 1103B is a mover (e.g., is moving within the environment 1101). The sensor data may include three-dimensional point cloud data and the detection system may use the three-dimensional point cloud data to determine whether each of the first feature 1104, the second feature 1106, the third feature 1108, the fourth feature 1110, the fifth feature 1103A, and the sixth feature 1103B is a mover.

In the example of FIG. 11C, the detection system may use the sensor data to identify and classify each of the second feature 1106, the third feature 1108, the fourth feature 1110, the fifth feature 1103A, and the sixth feature 1103B as not a mover and the first feature 1104 as a first mover. Based on the identification and classification of each feature as a mover or a non-mover, the robot 1102 can further identify the one or more actions for the robot 1102. In the example of FIG. 11C, based on identifying and classifying each of the second feature 1106, the third feature 1108, the fourth feature 1110, the fifth feature 1103A, and the sixth feature 1103B are not movers, the robot 1102 may determine that an action should not performed (e.g., that a navigational behavior of the robot 1102 should not be adjusted) with respect to those features. Further, based on identifying that the first feature 1104 and classifying the first feature 1104 as a mover, the robot 1102 can determine an action and cause performance of the action with respect to the first feature 1104 (e.g., as the robot 1102 approaches the first feature 1104).

Figure 11D:
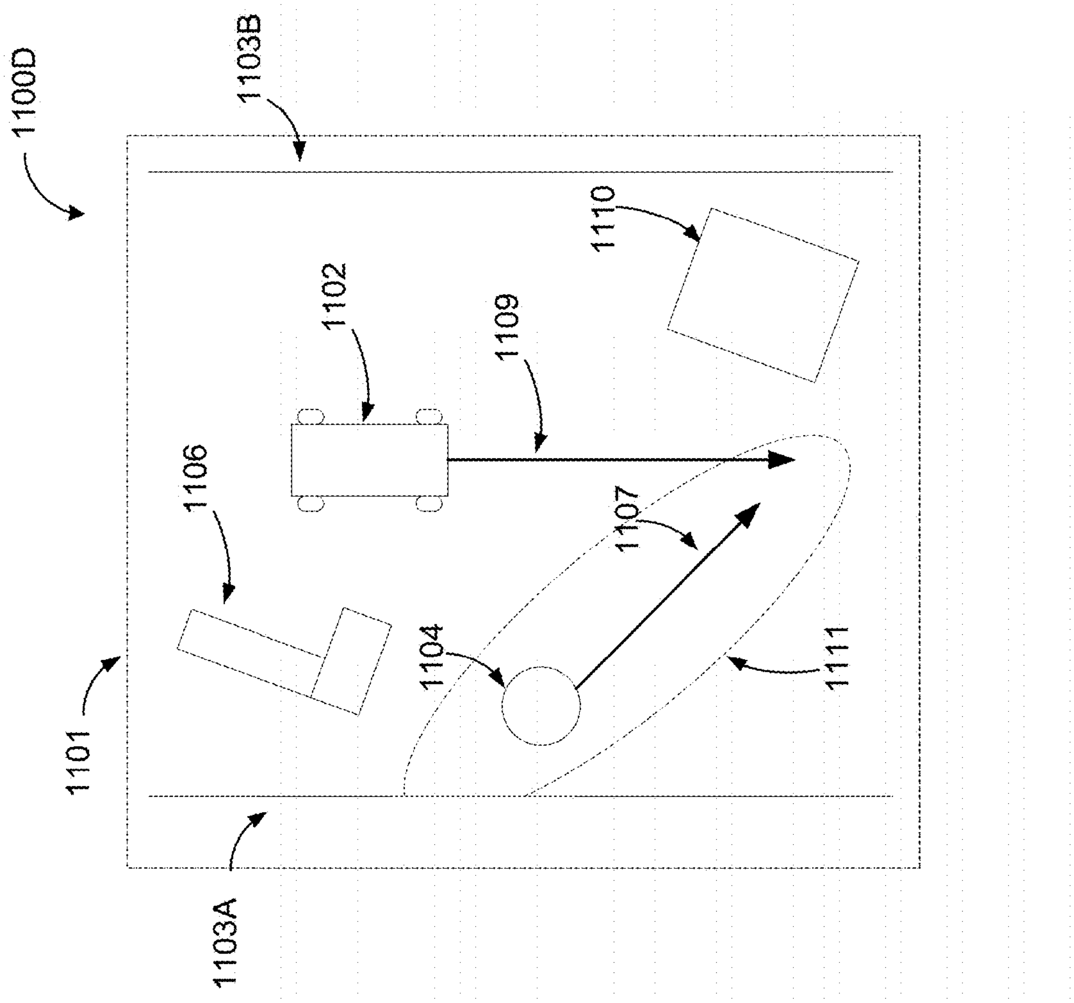
FIG. 11D is a schematic view of a robot navigating in an environment with a mover with a corresponding threshold.

FIG. 11D depicts a schematic view 1100D of sensor data. The sensor data may include robot route data 1109 identifying a route of a legged robot 1102, like that of FIG. 1A, within an environment 1101, as discussed above. The schematic view 1100D includes a virtual representation of the environment 1101 and features within the virtual representation of the environment 1101. The virtual representation includes a first feature 1104, a second feature 1106, a fourth feature 1110, a fifth feature 1103A, and a sixth feature 1103B. It will be understood that the virtual representation and the environment 1101 are illustrative only, and the virtual representation of the environment 1101 may include any features.

As discussed above, a topology component (e.g., a topology component of the robot 1102) can generate robot route data 1109 for traversal of the environment 1101 by the robot 1102. Prior to, during, or subsequent to traversal of the environment 1101 by the robot 1102, the robot 1102 may collect sensor data identifying features within the virtual representation of the environment 1101. A detection system of the robot 1102 may identify and classify each of the first feature 1104, the second feature 1106, the fourth feature 1110, the fifth feature 1103A, and the sixth feature 1103B within the sensor data.

As discussed above, the robot 1102 may use the sensor data to identify whether each of the first feature 1104, the second feature 1106, the fourth feature 1110, the fifth feature 1103A, and the sixth feature 1103B is a mover (e.g., is moving or is predicted to move within the environment 1101). In the example of FIG. 11D, the robot 1102 may use the sensor data to identify that each of the second feature 1106, the fourth feature 1110, the fifth feature 1103A, and the sixth feature 1103B is not a mover and that the first feature 1104 is a first mover. Based on identifying that the first feature 1104 is a mover, the robot 1102 may use the sensor to identify (e.g., predict) a route of an object, obstacle, entity, or structure corresponding to the first feature 1104 within the environment 1101. The robot 1102 can generate feature route data 1107 based on identifying the route of the object, obstacle, entity, or structure corresponding to the first feature 1104. In some embodiments, the robot 1102 can receive the feature route data 1107 from the object, obstacle, entity, or structure corresponding to the first feature 1104 (e.g., via an electronic communication from the object, obstacle, entity, or structure corresponding to the first feature 1104 to the robot 1102).

As discussed above, the robot 1102 may classify all or a portion of the first feature 1104, the second feature 1106, the fourth feature 1110, the fifth feature 1103A, and the sixth feature 1103B. Further, the robot 1102 may identify a corresponding threshold distance associated with each of the first feature 1104, the second feature 1106, the fourth feature 1110, the fifth feature 1103A, and the sixth feature 1103B.

In the example of FIG. 11D, the first feature 1104 includes a first threshold distance 1111 corresponding to the feature route data 1107. For example, the first threshold distance 1111 may indicate a threshold distance from a route of the first feature 1104 identified by the feature route data 1107.

Based on the identification and classification of each feature as corresponding to a particular object, obstacle, entity, or structure, the identification and classification of each feature as a mover or non-mover, and the determination of a threshold distance for each feature, the robot 1102 can determine whether the robot 1102 is within and/or is predicted to be within the threshold distance of the object, obstacle, entity, or structure corresponding to each feature. In the example of FIG. 11D, the robot 1102 may determine that, based on the robot route data 1109, the feature route data 1107, and the first threshold distance 1111, the robot 1102 is predicted to be within the first threshold distance 1111. The robot 1102 may identify one or more actions for the robot 1102 and cause performance of the one or more actions with respect to the first feature 1104 (e.g., as the robot 1102 approaches first threshold distance 1111 of the first feature 1104 or the robot 1102 is within the first threshold distance 1111 of the first feature 1104).

Figure 12:
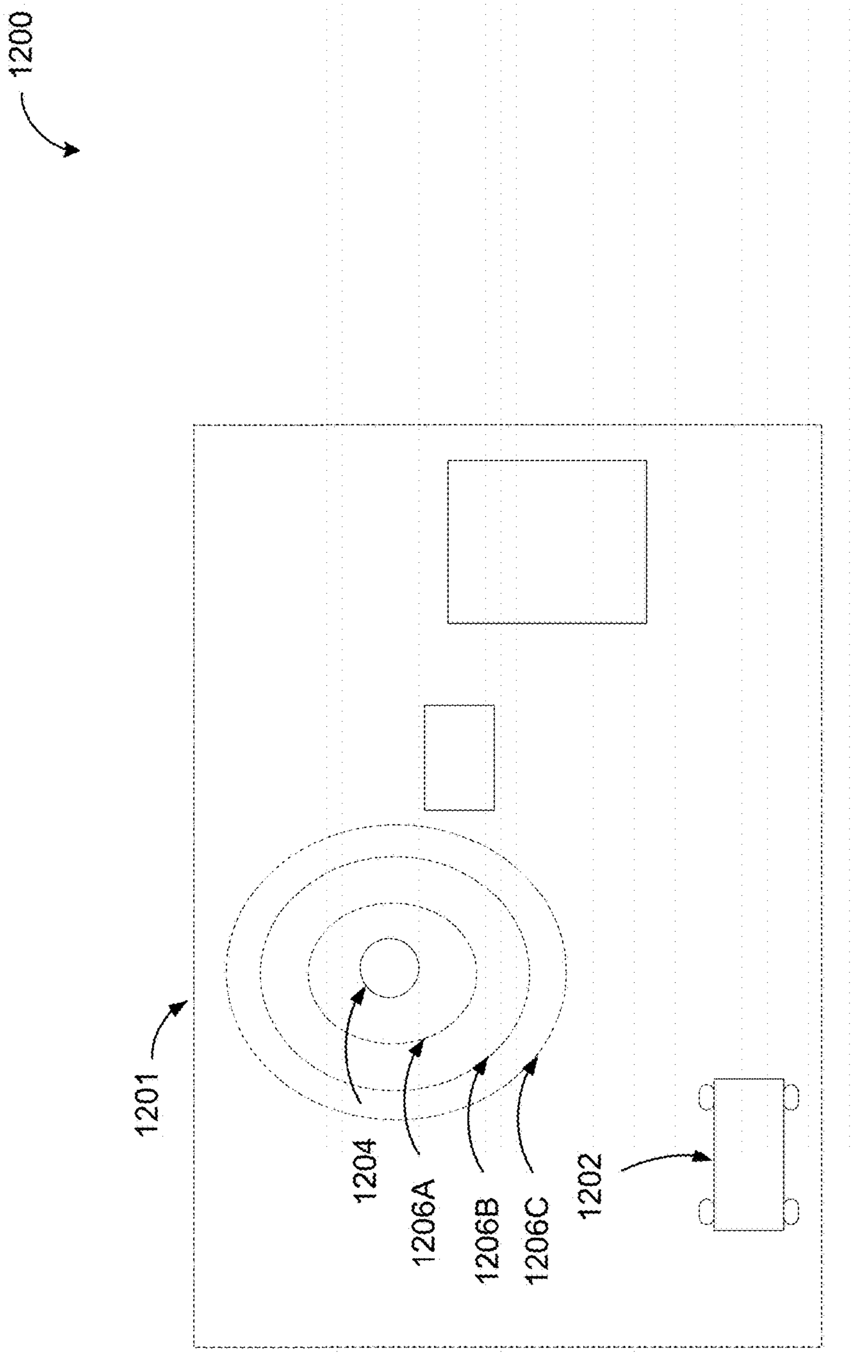
FIG. 12 is a schematic view of a robot in an environment with a feature with a plurality of thresholds.

FIG. 12 depicts a schematic view 1200 of a virtual representation of an environment including a threshold distance map (e.g., an influence map) associated with a feature 1204 within a virtual representation of the environment 1201. The environment 1201 includes a legged robot 1202, like that of FIG. 1A, within the environment 1201. The schematic view 1200 includes a virtual representation of the environment 1201 and features within the virtual representation of the environment 1201. The virtual representation includes the feature 1204. It will be understood that the virtual representation and the environment 1201 are illustrative only, and the virtual representation of the environment 1201 may include any features.

As discussed above, the robot 1202 may obtain sensor data associated with the environment 1201. Based on obtaining the sensor data, the robot 1202 may identify one or more features representing objects, entities, structures, and/or obstacles within the environment 1201. For example, the robot 1202 can identify the feature 1204.

The robot 1202 may process the sensor data associated with the feature 1204 to classify the feature. For example, the robot 1202 may utilize a detection system to identify and classify the feature as a human. Based on identifying and classifying the feature, the robot 1202 can identify one or more actions and a threshold distance map associated with the feature 1204. The threshold distance map may be associated with the particular classification. For example, a human classification may be associated with a particular threshold distance map. A threshold distance map associated with a human classification may have a greater number of threshold distances, larger threshold distances (e.g., larger diameters, larger areas, etc.), etc. as compared to a threshold distance map associated with a non-human classification such that the robot 1202 can avoid scaring humans (e.g., by performing particular actions such as stopping navigation, waving, alerting the human to a presence of the robot 1202, etc.). As other objects, obstacles, entities, or structures corresponding to features may not be scared by the robot, the threshold distance map associated with a non-human classification may have a lesser number of threshold distances, smaller threshold distances, etc. as compared to the threshold distance map associated with a human classification.

In some cases, a threshold distance map may be associated with a user-specific classification. For example, a specific user may have a greater fear of robots and may implement a greater number of threshold distances, larger threshold distances, etc. as compared to a threshold distance map associated with a human-generic classification.

The threshold distance map may indicate different actions that the robot 1202 is to perform based on the distance between the robot 1202 and the object, obstacle, entity, or structure corresponding to the feature 1204. For example, the threshold distance map may indicate a first action for the robot 1202 at a first distance from the object, obstacle, entity, or structure corresponding to the feature 1204 and a second action for the robot 1202 at a second distance from the object, obstacle, entity, or structure corresponding to the feature 1204.

The robot 1202 may identify the threshold distance map (e.g., based on input received via a user computing device). Further, the topology component may identify different portions (e.g., levels) of the threshold distance map and a particular action associated with all or a portion of the portions of the threshold distance map.

The action associated with a threshold of the threshold distance map may be an action to maintain a comfort, safety, and/or predictability of the robot 1202. For example, a first threshold distance of the threshold distance map (e.g., a furthest threshold distance from the object, obstacle, entity, or structure corresponding to the feature 1204) may be associated with a first action (e.g., displaying a colored light), a second threshold distance of the threshold distance map (e.g., a second furthest threshold distance from the object, obstacle, entity, or structure corresponding to the feature 1204) that is outside of a third threshold distance but within the first threshold distance may be associated with a second action (e.g., outputting an audible alert), and a third threshold distance of the threshold distance map (e.g., a closest threshold distance to the object, obstacle, entity, or structure corresponding to the feature 1204) that is within the first and second threshold distances may be associated with a third action (e.g., causing the robot 1202 to stop movement and/or navigation). Therefore, the severity (e.g., seriousness, effect, etc.) of the action may increase as the distance between the robot 1202 and the object, obstacle, entity, or structure corresponding to the feature 1204 decreases. For example, the number of systems affected by the action, the criticality of the systems affected by the action, the disruption to the operation of the robot 1202, etc. may increase as the distance between the robot 1202 and the object, obstacle, entity, or structure corresponding to the feature 1204 decreases.

In the example of FIG. 12, the feature 1204 is associated with a threshold distance map. The threshold distance map includes a first threshold 1206A, a second threshold 1206B, and a third threshold 1206C. All or a portion of the first threshold 1206A, the second threshold 1206B, and the third threshold 1206C may be associated with a corresponding action. For example, the first threshold 1206A may be associated with a first action, the second threshold 1206B may be associated with a second action, and the third threshold may be associated with a third action. In some cases, the robot 1202 may iteratively perform all or a portion of the first action, the second action, and the third action as the distance between the object, obstacle, entity, or structure corresponding to the feature 1204 and the robot 1202 changes (e.g., as the distance between the object, obstacle, entity, or structure corresponding to the feature 1204 and the robot 1202 crosses a threshold distance of the threshold distance map, the robot 1202 may perform a corresponding action). It will be understood that the threshold distance map may include more, less, or different portions and/or thresholds. It will be understood that more, less, or different features may be associated with threshold distance maps.

In some cases, the robot 1202 may be associated with a threshold distance. Further, the robot 1202 may be associated with a threshold distance map identifying a plurality of threshold distances of the robot 1202.

Figure 13A:
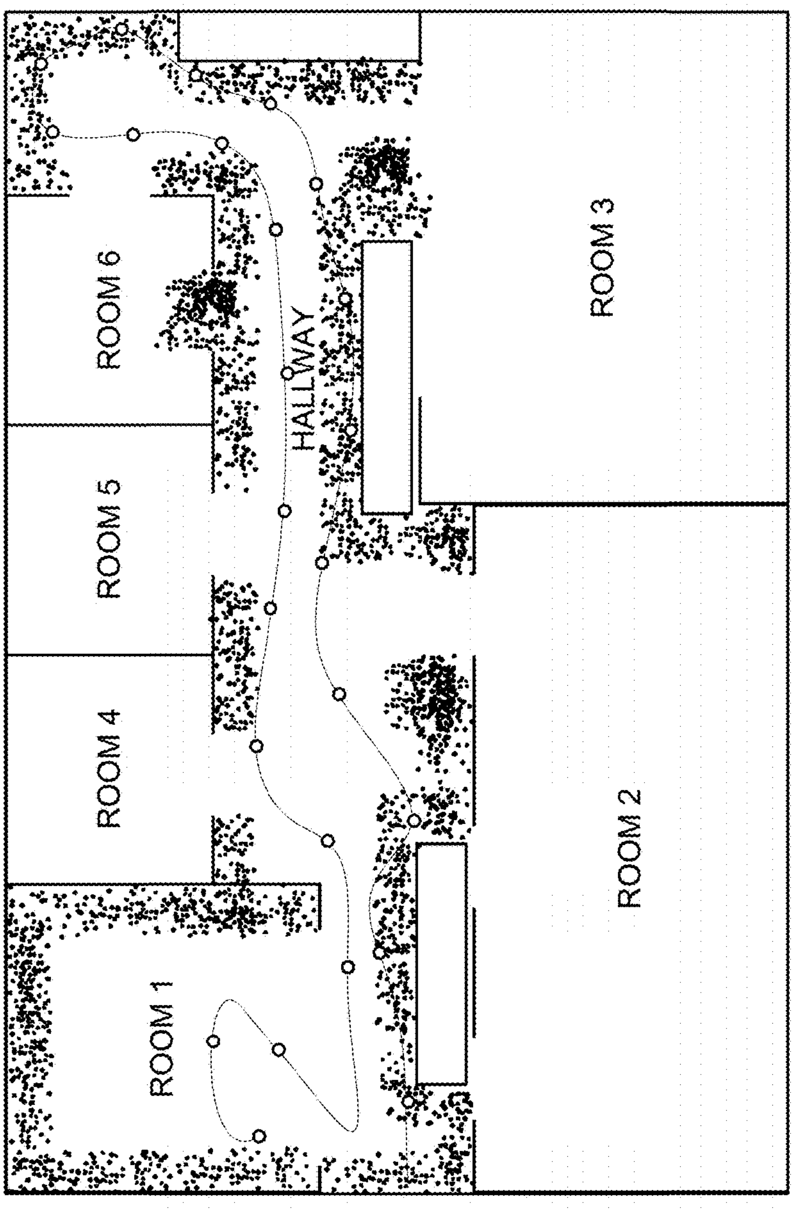
FIG. 13A is a schematic view of a route of a robot and corresponding point cloud data.

FIG. 13A depicts a schematic view 1300A identifying sensor data (e.g., route data and point cloud data) of a legged robot within an environment. The schematic view 1300A reflects route data (e.g., a virtual representation of the route data) relative to a site map of an environment. For example, the schematic view 1300A may reflect a route of the robot through an environment. The route data may include particular route waypoints and/or route edges.

The sensor data includes point cloud data associated with all or a portion of the route waypoints and/or the route edges. For example, each of the route edges and/or route waypoints may be associated with a portion of point cloud data. The point cloud data may include features associated with or corresponding to entities, obstacles, objects, structures, etc. within the environment.

Figure 13B:
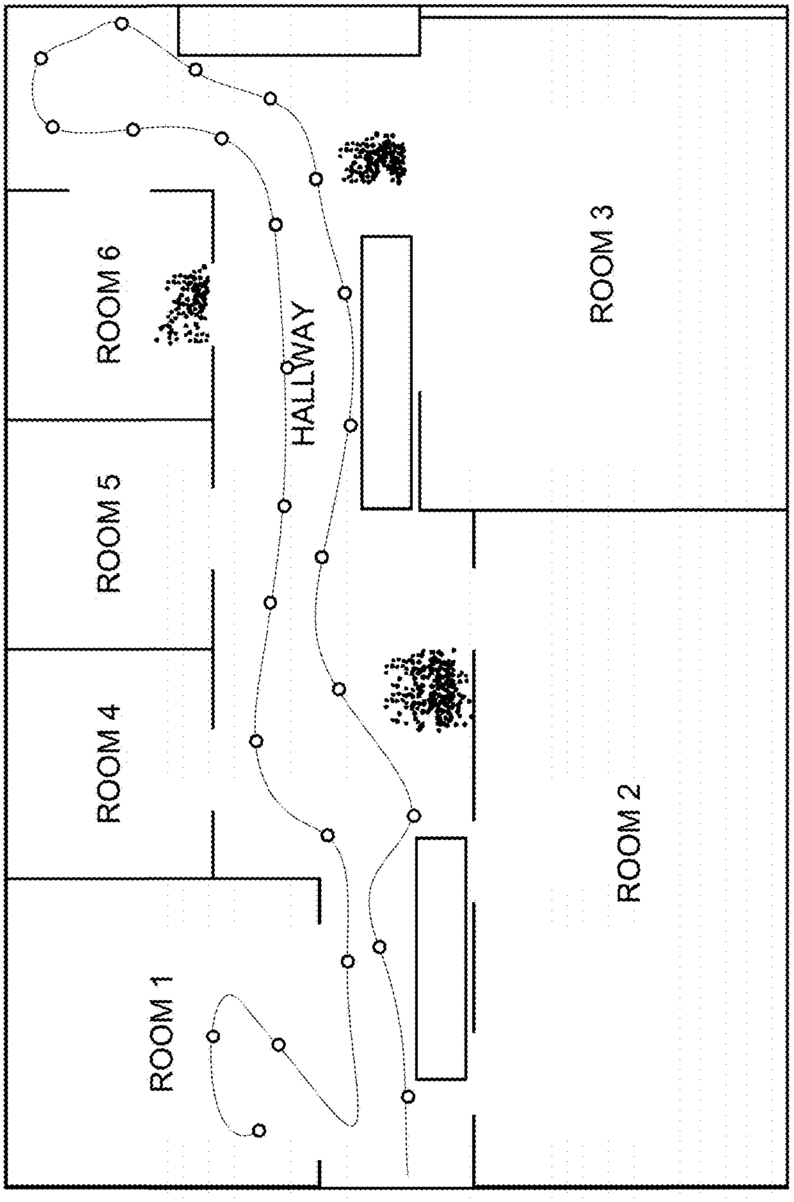
FIG. 13B is a schematic view of a route of a robot and point cloud data associated with identified features.

FIG. 13B depicts a schematic view 1300B identifying sensor data (e.g., route data and point cloud data) of a legged robot within an environment. The schematic view 1300B reflects route data (e.g., a virtual representation of the route data) relative to a site map of an environment. The route data may include particular route waypoints and/or route edges.

The sensor data includes point cloud data associated with one or more features representing entities, obstacles, objects, structures, etc. within the environment. To identify the point cloud data associated with the one or more features, a system can segment the point cloud data (e.g., a single point cloud) into distinct subsets or clusters of point cloud data within the environment. For example, the system can cluster (e.g., point cluster) the point cloud data into a plurality of clusters of point cloud data.

In some cases, the system can filter out subsets of point cloud data that correspond to particular features (e.g., representing ground surface, walls, desks, chairs, etc.). For example, a user, an operator, etc. may provide data to the system identifying features to filter out of the subsets of point cloud data (e.g., features that are not of interest) and features to maintain (e.g., features that are of interest).

The system can monitor (e.g., track) all or a portion of the distinct subsets of point cloud data to identify a feature. For example, the system can determine a particular subset of point cloud data is associated with (e.g., identifies) a particular feature. The system can store data associating the particular subset of point cloud data with the particular feature and monitor the particular feature. The system can monitor a feature over a period of time by identifying a first subset of point cloud data obtained during a first time period that corresponds to the feature and a second subset of point cloud data obtained during a second time period that corresponds to the feature. Therefore, the system can track the feature over time.

Figure 13C:
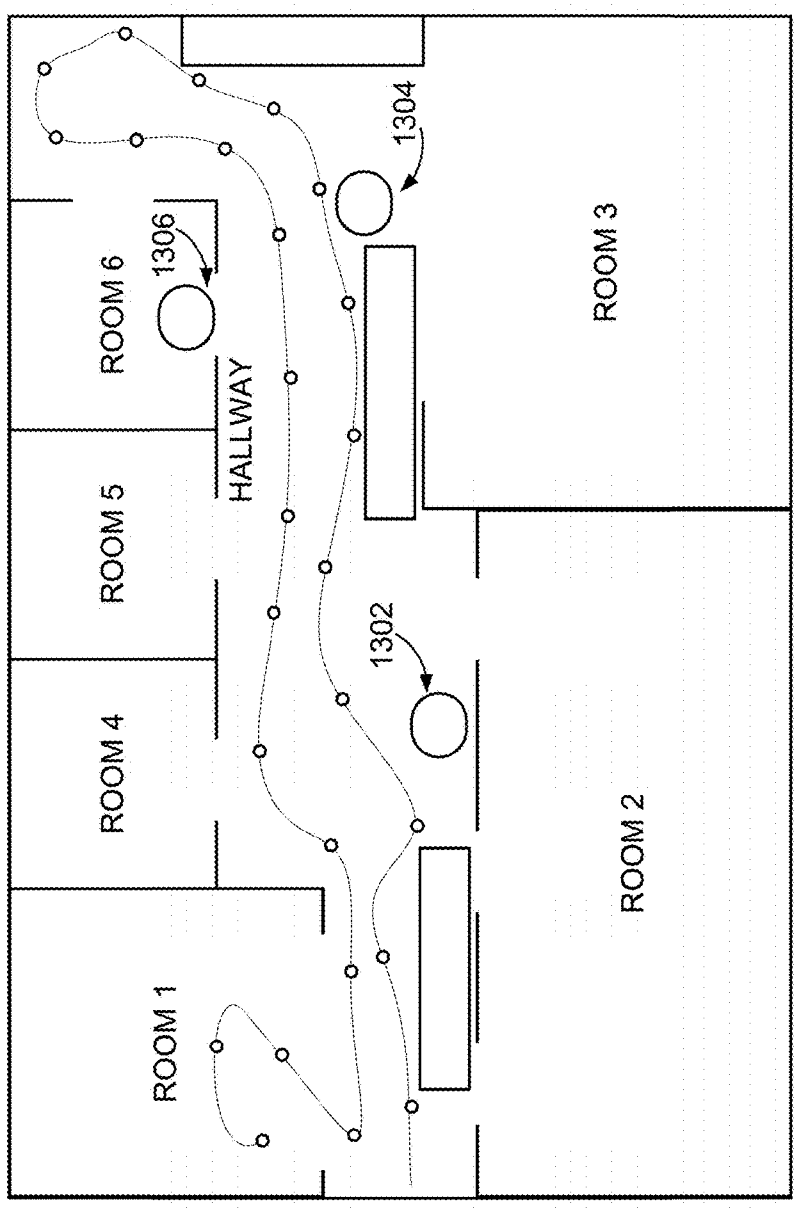
FIG. 13C is a schematic view of a route of a robot and identified features.

FIG. 13C depicts a schematic view 1300C identifying sensor data (e.g., route data and point cloud data) of a legged robot within an environment. The schematic view 1300C reflects route data (e.g., a virtual representation of the route data) relative to a site map of an environment. The route data may include particular route waypoints and/or route edges.

The sensor data includes point cloud data associated with one or more features representing entities, obstacles, objects, structures, etc. within the environment. To identify the point cloud data associated with the one or more features, a system can segment the point cloud data (e.g., a single point cloud) into distinct subsets of point cloud data within the environment.

The system can monitor (e.g., track) all or a portion of the distinct subsets of point cloud data to identify a feature and classify the feature. The system can store data associating the particular subset of point cloud data with the particular feature and monitor the particular feature. Further, the system can implement a detection system to identify and classify a feature. For example, the detection system can identify and classify a feature as corresponding to a particular obstacle, object, entity, structure, etc. and/or as a mover or a non-mover.

To identify the feature, the system can identify feature characteristics of the feature. For example, the feature characteristics of the feature may include a size (e.g., a height, a weight, etc.), a shape, a pose, a position, etc. of the entities, obstacles, objects, structures, etc. corresponding to the feature.

In the example of FIG. 13C, the system identifies a first feature 1302 (e.g., associated with a first set of feature characteristics), a second feature 1304 (e.g., associated with a second set of feature characteristics), and a third feature 1306 (e.g., associated with a third set of feature characteristics).

Figure 13D:
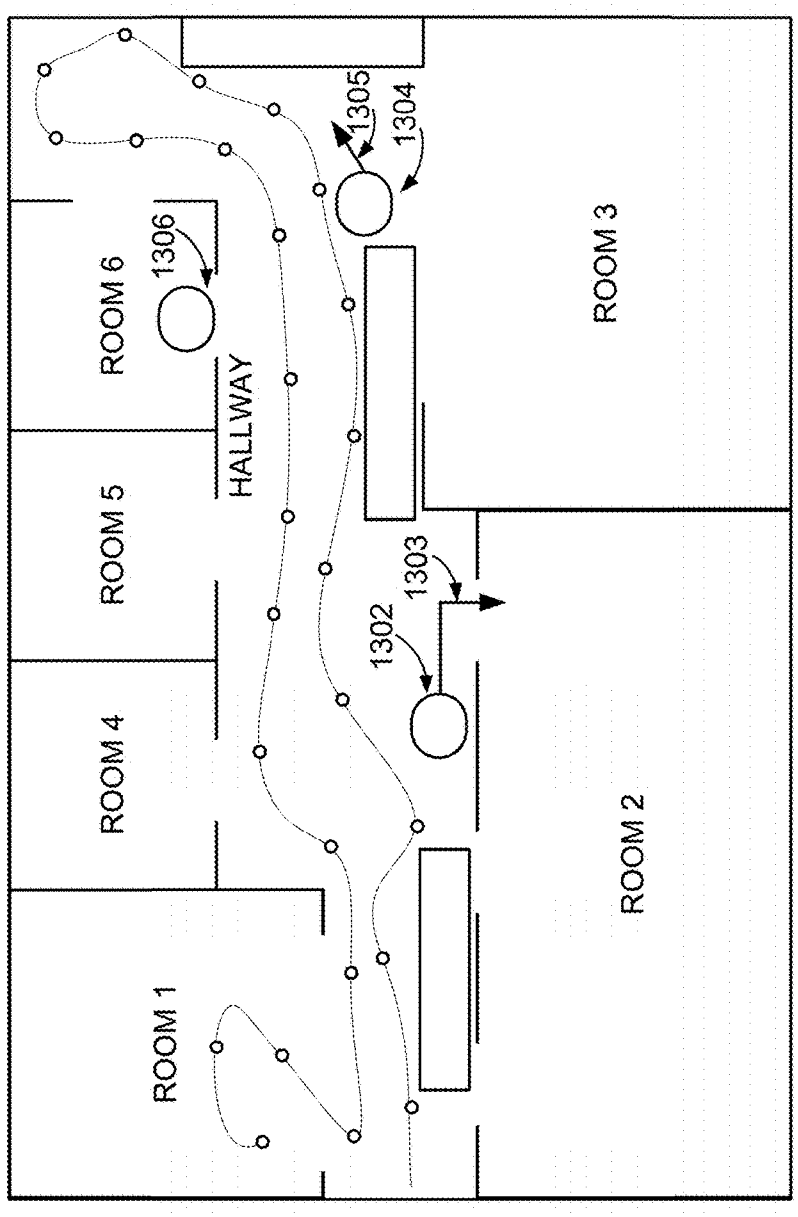
FIG. 13D is a schematic view of a route of a robot and identified features with corresponding movements.

FIG. 13D depicts a schematic view 1300D identifying sensor data (e.g., route data and point cloud data) of a legged robot within an environment. The schematic view 1300D reflects route data (e.g., a virtual representation of the route data) relative to a site map of an environment. The route data may include particular route waypoints and/or route edges.

The sensor data includes point cloud data associated with one or more features representing entities, obstacles, objects, structures, etc. within the environment. To identify the point cloud data associated with the one or more features, a system can segment the point cloud data (e.g., a single point cloud) into distinct subsets of point cloud data within the environment.

The system can monitor (e.g., track) all or a portion of the distinct subsets of point cloud data to identify and classify a feature. The system can store data associating the particular subset of point cloud data with the particular feature and monitor the particular feature. Further, the system can implement a detection system to identify and classify a feature. For example, the detection system can identify and classify a feature as corresponding to a particular obstacle, object, entity, structure, etc. and/or as a mover or a non-mover.

Further, the system can monitor a particular subset of point cloud data to determine a route associated with the corresponding feature. In some cases, the system can predict a route (e.g., a future route) associated with the corresponding feature based on the monitored subset of point cloud data.

Based on monitoring the particular subset of point cloud data, the system can identify route characteristics of the route of the feature. For example, the route characteristics of the route of the feature may include a motion (e.g., a speed, an acceleration, a determination of stationary or moving, etc.), a location, a direction, etc. of the feature. Further, the system can predict future route characteristics of the route of the feature (e.g., a predicted motion, location, direction, etc.) during a subsequent time period.

In the example of FIG. 13D, the system identifies and classifies the first feature 1302, the second feature 1304, and the third feature 1306. Further, the system identifies that the first feature 1302 is associated with a first route 1303 (e.g., is moving or is predicted to move according to the first route 1303), the second feature 1304 is associated with a second route 1305 (e.g., is moving or is predicted to move according to the second route 1305), and the third feature 1306 is stationary and is not associated with a route.

Figure 13E:
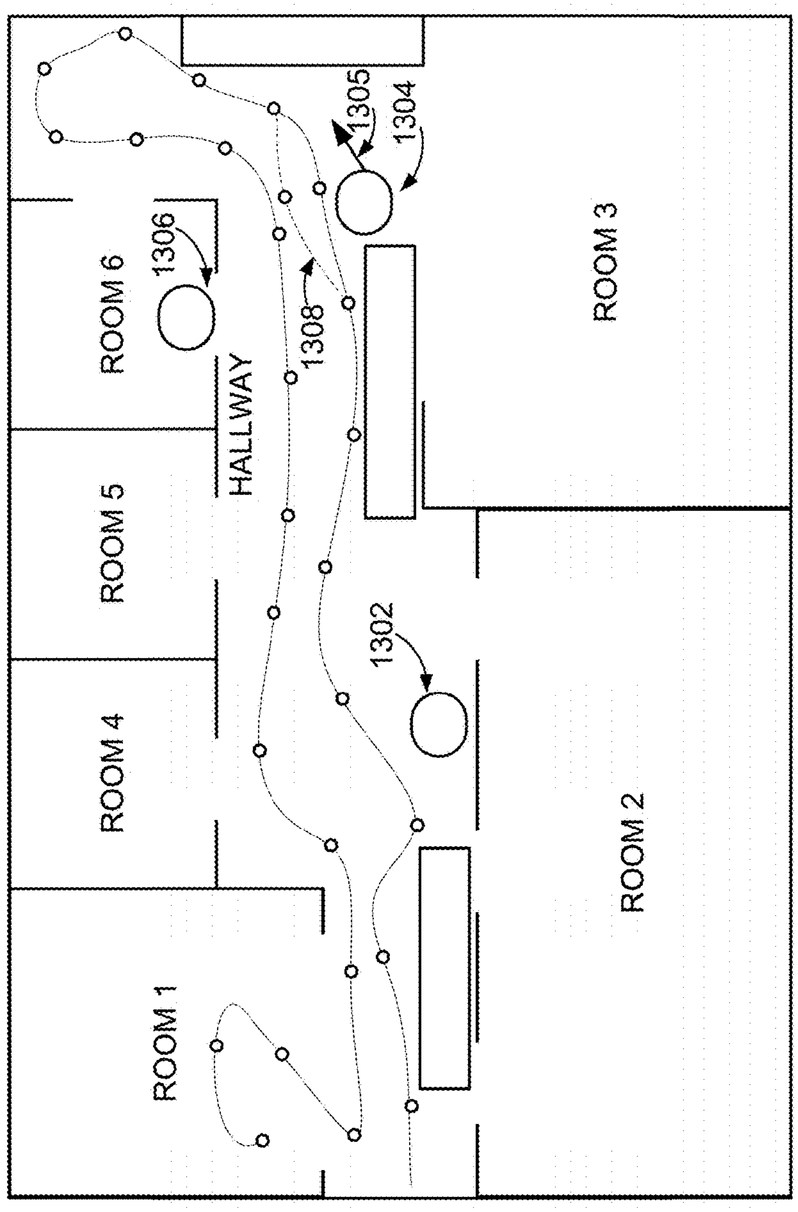
FIG. 13E is a schematic view of an altered route of a robot based on an identified feature.

FIG. 13E depicts a schematic view 1300E identifying sensor data (e.g., route data and point cloud data) of a robot within an environment. The schematic view 1300E reflects route data (e.g., a virtual representation of the route data) relative to a site map of an environment. The route data may include particular route waypoints and/or route edges.

The sensor data includes point cloud data associated with one or more features representing entities, obstacles, objects, structures, etc. within the environment. To identify the point cloud data associated with the one or more features, a system can segment the point cloud data (e.g., a single point cloud) into distinct subsets of point cloud data within the environment.

The system can monitor (e.g., track) all or a portion of the distinct subsets of point cloud data to identify and classify a feature. The system can store data associating the particular subset of point cloud data with the particular feature and monitor the particular feature. Further, the system can implement a detection system to identify and classify a feature. For example, the detection system can identify and classify a feature as corresponding to a particular obstacle, object, entity, structure, etc. and/or as a mover or a non-mover.

The system can monitor a particular subset of point cloud data to determine a route associated with the corresponding feature. Further, the system can identify route characteristics of the route and/or feature characteristics of the feature based on monitoring the particular subset of point cloud data.

Based on identifying and classifying the feature, identifying the route of the feature, identifying the feature characteristics, and identifying the route characteristics, the system can identify one or more actions to implement based on determining that the robot is within a threshold distance or is predicted to be within a threshold distance of the object, obstacle, entity, or structure corresponding to the feature. The one or more actions may include adjusting a navigational behavior of the robot. For example, adjusting a navigational behavior of the robot may include restricting a speed or acceleration of the robot when the robot is within a threshold distance of the object, obstacle, entity, or structure corresponding to the feature, generating a synthetic feature corresponding to the feature and adding the synthetic feature to an obstacle map of the robot, generating a feature characteristic identifying a cost associated with being located within threshold distance of the feature (e.g., the robot can compare costs associated with multiple features and determine which threshold distance of which object, obstacle, entity, or structure to encroach based on the cost comparison), etc. The system may generate a synthetic feature that has a similar shape, size, etc. of the object, obstacle, entity, or structure corresponding to the feature. In some cases, the system may generate a synthetic feature that is bigger than the object, obstacle, entity, or structure corresponding to the feature to account for a threshold distance of the object, obstacle, entity, or structure corresponding to the feature and/or the robot.

In the example of FIG. 13E, the system identifies and classifies that the second feature 1304 corresponds to a particular obstacle, object, entity, structure, etc. (e.g., a human) and as a mover. In some cases, the system may identify and classify the second feature 1304 as corresponding to a particular obstacle, object, entity, structure, etc. and not whether the second feature 1304 is a mover. Further, the system identifies that the second feature 1304 is associated with the second route 1305 and the route of the robot is predicted to be within a threshold distance of the second route 1305.

Based on identifying and classifying the second feature 1304 (e.g., as a human) and determining that the route of the robot is predicted to be within a threshold distance of the second route 1305, the system implements an action to adjust the navigational behavior of the robot, the implementation of the action adjusting the route of the robot to include a modified route portion 1308. For example, the system may implement a specific action based on classifying the second feature 1304 as a human to avoid approaching within a particular distance of the human (based on data linking the distance to the second feature 1304) that is greater than a distance that the system would use to avoid approaching a ball, another robot, etc. represented by another feature (e.g., as the human may be scared, nervous, etc. in view of the robot and the other robot may not be scared, nervous, etc.). In some cases, the system may provide a human with a wider berth as compared to a non-human. Further, the system may provide a moving human with a wider berth as compared to a non-moving human. The system may generate the modified route portion 1308 based on generating a synthetic feature corresponding to the feature and adding the synthetic feature to the map such that the robot provides a comparatively wider berth (e.g., as compared to a safety buffer for navigating around a non-moving human, a ball, another robot, etc.) when navigating around the object, obstacle, entity, or structure corresponding to the second feature 1304. In some cases, the system may identify the action to implement based on a classification of the second feature 1304.

Figure 13F:
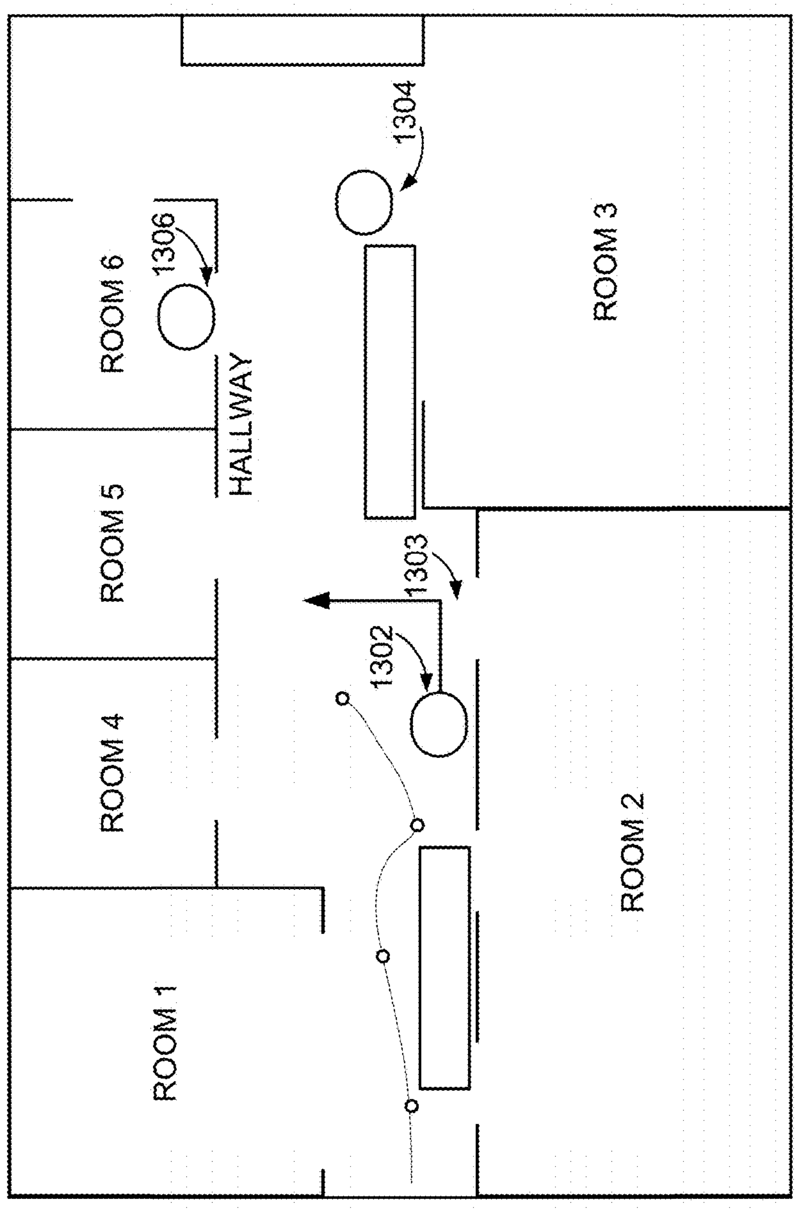
FIG. 13F is a schematic view of an altered route of a robot based on an identified feature.

FIG. 13F depicts a schematic view 1300F identifying sensor data (e.g., route data and point cloud data) of a robot within an environment. The schematic view 1300F reflects route data (e.g., a virtual representation of the route data) relative to a site map of an environment. The route data may include particular route waypoints and/or route edges.

The sensor data includes point cloud data associated with one or more features representing entities, obstacles, objects, structures, etc. within the environment. To identify the point cloud data associated with the one or more features, a system can segment the point cloud data (e.g., a single point cloud) into distinct subsets of point cloud data within the environment.

The system can monitor (e.g., track) all or a portion of the distinct subsets of point cloud data to identify and classify a feature. The system can store data associating the particular subset of point cloud data with the particular feature and monitor the particular feature. Further, the system can implement a detection system to identify and classify a feature. For example, the detection system can identify and classify a feature as corresponding to a particular obstacle, object, entity, structure, etc. and/or as a mover or a non-mover.

The system can monitor a particular subset of point cloud data to determine a route associated with the corresponding feature. Further, the system can identify route characteristics of the route and/or feature characteristics of the feature based on monitoring the particular subset of point cloud data.

Based on identifying and classifying the feature, identifying the route of the object, obstacle, entity, or structure corresponding to the feature, identifying the feature characteristics, and identifying the route characteristics, the system can identify one or more actions to implement based on determining that the robot is within a threshold distance or is predicted to be within a threshold distance of the object, obstacle, entity, or structure corresponding to the feature. The one or more actions may include adjusting a navigational behavior of the robot. For example, adjusting a navigational behavior of the robot may include causing the robot to stop navigation (e.g., until (or a period time after) the robot is no longer located within a threshold distance of the object, obstacle, entity, or structure corresponding to the feature).

In the example of FIG. 13F, the system identifies and classifies that the first feature 1302 represents a particular obstacle, object, entity, structure, etc. (e.g., a human) and as a mover. In some cases, the system may identify and classify the first feature 1302 as corresponding to a particular obstacle, object, entity, structure, etc. and not whether the first feature 1302 is a mover. Further, the system identifies that the first feature 1302 is associated with the first route 1303 and the route of the robot is predicted to be within a threshold distance of the first route 1303.

Based on identifying and classifying the first feature 1302 (e.g., as a human) and determining that the route of the robot is predicted to be within a threshold distance of the first route 1303, the system implements an action to adjust the navigational behavior of the robot, the implementation of the action causing the robot to stop navigation and/or movement. The action may cause the robot stop navigation and/or movement until the system determines that the robot is not located within the threshold distance of the first route 1303. In some cases, the system may identify the action to implement based on a classification of the first feature 1302. For example, the system may implement a specific action based on classifying the first feature 1302 as a human to avoid approaching within a particular distance of the human (e.g., a particular distance as indicated by a zone, a space, a radius, etc. around the human). In another example, the system may implement a specific action based on classifying the first feature 1302 as a human to instruct the robot to navigate away from the human (e.g., back up). In some cases, the system may stop navigation based on determining that the robot cannot avoid approaching within a particular distance of the human. Further, the system may stop navigation based on classification of a feature as a moving human and may not stop navigation based on classification of a feature as a non-moving human (e.g., may not stop navigation, but may provide a wider berth as compared to features not classified as humans).

Figure 14:
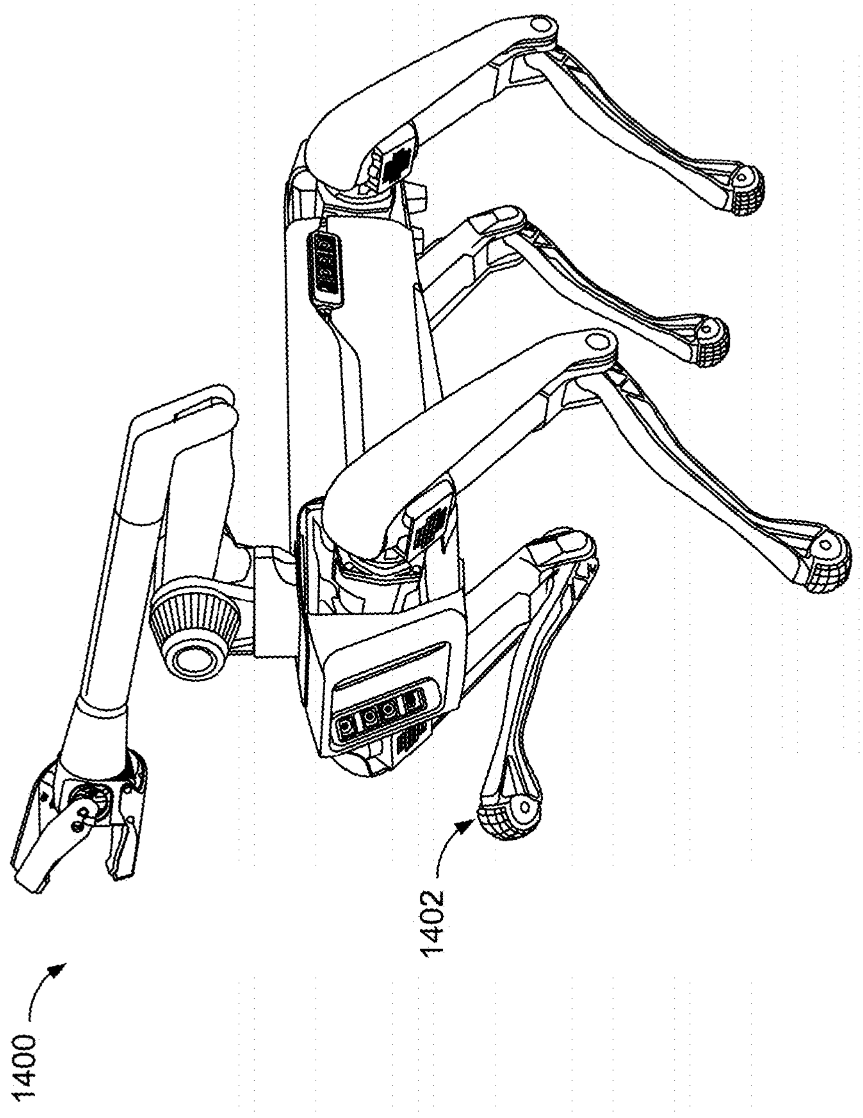
FIG. 14 is a schematic view of an example robot implementing an example communication action based on an identified entity.

FIG. 14 depicts a legged robot 1400. The robot 1400 may include and/or may be similar to the robot 100 discussed above with reference to FIGS. 1A and 1B. The robot 1400 may include a body, one or more legs coupled to the body, and an arm coupled to the body. In the example of FIG. 14, the robot 1400 is a quadruped robot with four legs.

As discussed above, a system of the robot 1400 may identify a feature representing entities, obstacles, objects, structures, etc. within an environment (e.g., using fused data from feature detection sensors and mover detection sensors) and identify an action to implement based on identifying and classifying the feature. For example, the action may be to communicate with the object, obstacle, entity, or structure corresponding to the feature of the environment (e.g., by outputting an alert, causing display of a user interface, implementing a physical gesture, etc.) when the feature is classified as a mover that is capable of interpreting the communications (e.g., another robot, a smart vehicle, an animal, a human, etc.). In the example of FIG. 14, in response to a system, using the fused data, identifying and classifying a feature as corresponding to a particular object, obstacle, entity, or structure that is capable of interpreting robot reactions (e.g., an animal, and more specifically a human), the action includes a physical gesture of waving, shaking, contorting, etc. a distal end 1402 of a leg of the robot 1400. The action may include one or more actions based on identified human gestures (e.g., gestures produced by humans). For example, the action may include nodding a distal end 1402 of an arm of the robot 1400 (e.g., as an acknowledgement or recognition) to simulate a nodding of a human head which the robot 1400 may identify based on parsing image data. In some cases, the action may include physically interacting with the object, obstacle, entity, or structure corresponding to the feature (e.g., tapping an object). In other cases, the action may include contorting the distal end 1402 of the leg and/or the leg in a manner interpretable by the feature. For example, the action may include providing an alert by contorting the distal end 1402 of the leg and/or the leg to generate physical gestures and/or signs (e.g., signs interpretable using sign language, morse code, or any other language).

Figure 15:
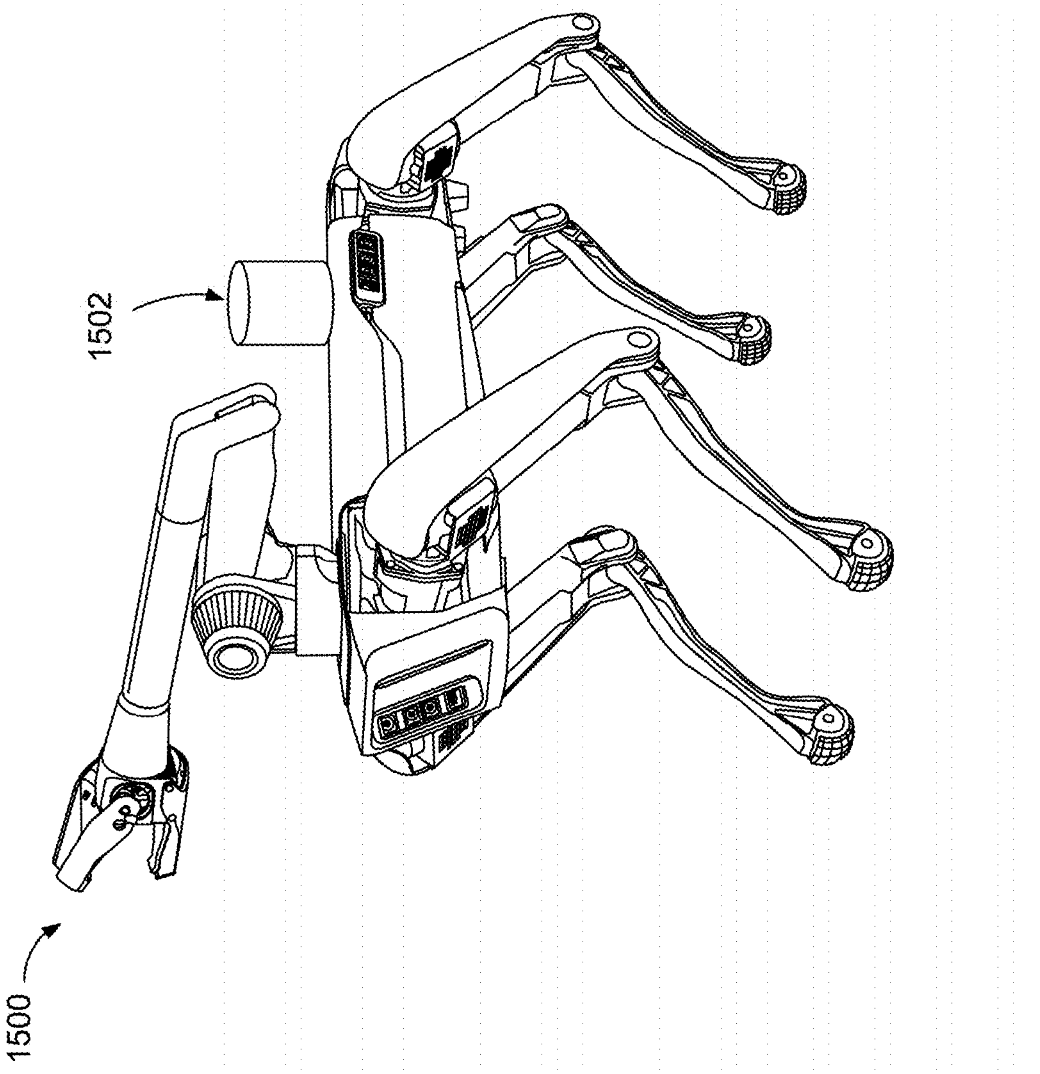
FIG. 15 is a schematic view of an example robot implementing an example communication action based on an identified entity.

FIG. 15 depicts a legged robot 1500. The robot 1500 may include and/or may be similar to the robot 100 discussed above with reference to FIGS. 1A and 1B. The robot 1500 may include a body, one or more legs coupled to the body, an arm coupled to the body, and an interface 1502. The interface 1502 may include a display (e.g., a graphical user interface, a speaker, etc.). In the example of FIG. 15, the robot 1500 is a quadruped robot with four legs.

As discussed above, a system of the robot 1500 may identify a feature representing entities, obstacles, objects, structures, etc. within an environment (e.g., using fused data from feature detection sensors and mover detection sensors) and identify an action to implement based on identifying the feature. For example, the action may be to communicate with the object, obstacle, entity, or structure corresponding to the feature of the environment (e.g., by outputting an alert, causing display of a user interface, implementing a physical gesture, etc.) when the feature is classified as a mover that is capable of interpreting the communications (e.g., another robot, a smart vehicle, an animal, a human, etc.). In the example of FIG. 15, in response to a system, using the fused data, identifying and classifying a feature as corresponding to a particular object, obstacle, entity, or structure that is capable of interpreting robot reactions (e.g., an animal, and more specifically a human), the action includes an alert to be output via the interface 1502. For example, the alert may include text data (e.g., text data including "Hello," "Excuse Me," "I am Navigating to Destination X," "I am performing Task X," etc.), image data (e.g., image data including a video providing background on the robot 1500, an image of an organization associated with the robot 1500, etc.), audio data (e.g., a horn sound, an alarm sound, etc.), etc. The system may identify the alert based on the identification and classification of the feature and the distance between the robot 1500 and the object, obstacle, entity, or structure corresponding to the feature. Based on identifying the alert, the system can cause display of the alert via the interface 1502.

Figure 16:
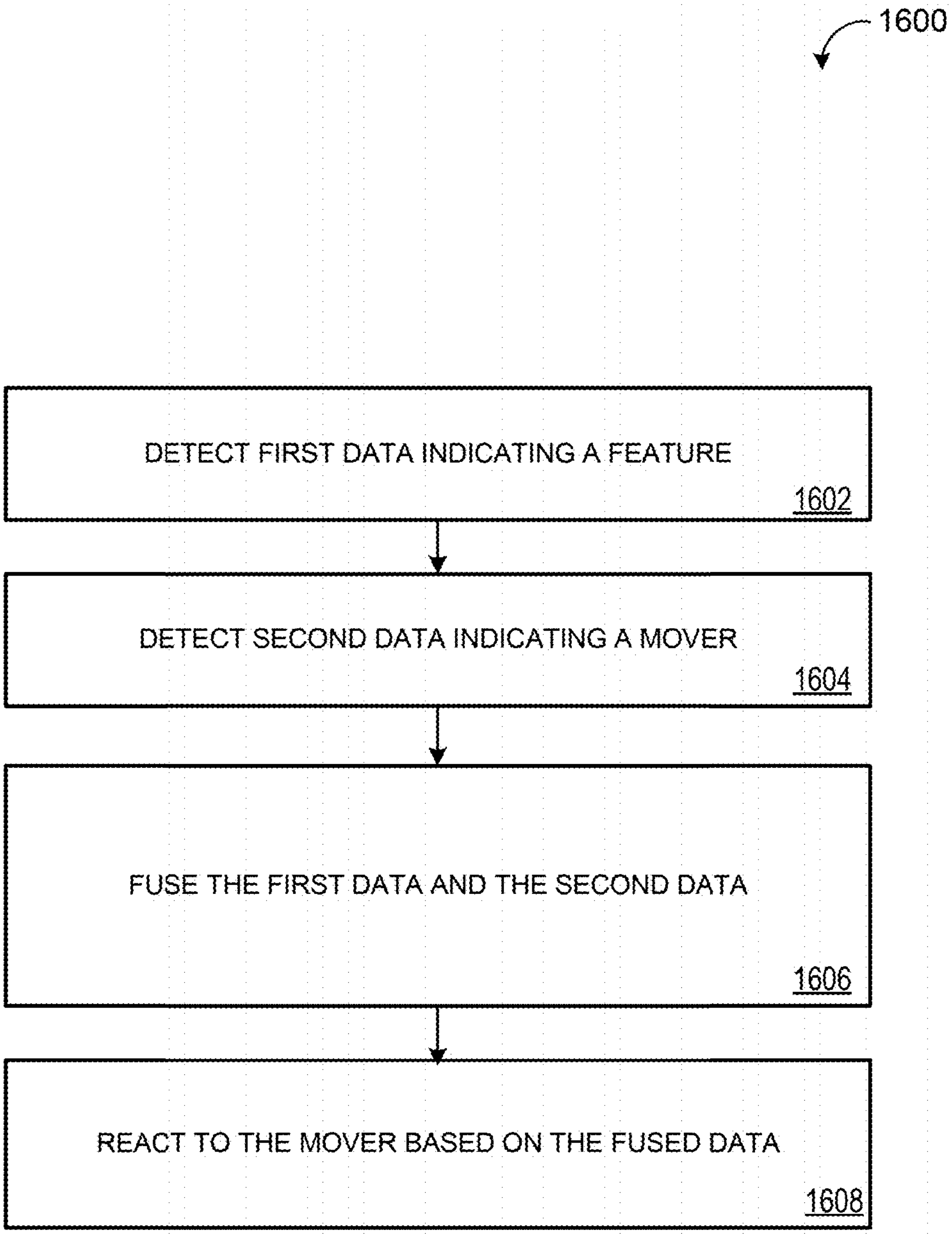
FIG. 16 is a flowchart of an example arrangement of operations for a method of communicating with an entity.

FIG. 16 shows a method 1600 executed by a computing system to operate a robot (e.g., by implementing an action for the robot) based on sensor data indicating a presence of a feature within an environment of the robot, according to some examples of the disclosed technologies. For example, the robot may be a legged robot with a plurality of legs (e.g., two or more legs, four or more legs, etc.), memory, and a processor. Further, the computing system may be a computing system of the robot. In some cases, the computing system of the robot may be located on and/or part of the robot. In some cases, the computing system of the robot may be distinct from and located remotely from the robot. For example, the computing system of the robot may communicate, via a local network, with the robot. The computing system may be similar, for example, to the sensor system 130, the computing system 140, the control system 170, and/or the action identification computing system 1002 as discussed above, and may include memory and/or data processing hardware.

At block 1602, the computing system detects first data indicating a feature (e.g., a feature corresponding to an object, an obstacle, a structure, an entity). In some cases, the first data may be data from detecting the feature. For example, the computing system may detect the feature and generate, obtain, identify, etc. first data indicating the feature. The computing system may detect the feature as representing entities, obstacles, objects, structures, etc. in an environment about (e.g., of) the robot. To detect the feature, the computing system may identify and classify the feature (e.g., classify the feature as corresponding to a particular object, obstacle, structure, or entity, classify the feature as a mover, etc.). In some embodiments, the computing system may detect a plurality of features. For example, the computing system may identify and classify a first subset of the plurality of features as corresponding to a particular object (e.g., a football) and a second subset of the plurality of features as corresponding to a particular entity (e.g., an adult human).

To detect the feature, the computing system may obtain sensor data from one or more sensors (e.g., one or more first sensors) and detect the feature using the sensor data. For example, the one or more sensors may include a camera (e.g., a stereo camera), a lidar sensor, a ladar sensor, a radar sensor, a sonar sensor, etc. The sensor data may include one or more of point cloud data, image data, etc. For example, the sensor data may include three-dimensional point cloud data received from a three-dimensional volumetric image sensor.

In some embodiments, the one or more sensors may include a sensor of a robot. Further, the computing system may obtain the sensor data captured by one or more sensors of the robot. The sensor may capture the sensor data based on movement of the robot along a route through the site. The route may include a plurality of route waypoints and at least one route edge.

In some embodiments, the sensor data may be captured by a plurality of sensors from two or more robots. For example, the sensor data may include a first portion (e.g., set) of sensor data captured by one or more first sensors of a first robot (e.g., first sensor data obtained by the first robot) and a second portion (e.g., set) of sensor data captured by one or more second sensors of a second robot (e.g., second sensor data obtained by the second robot). Further, the computing system may merge the first portion of sensor data and the second portion of sensor data to obtain the sensor data.

The computing system may determine route data (e.g., route data associated with the site) based at least in part on the sensor data. The route data may include a plurality of route waypoints and at least one route edge. The at least one route edge may connect a first route waypoint of the plurality of route waypoints to a second route waypoint of the plurality of route waypoints. Further, the at least one route edge may represent a route for the robot through the environment.

A feature detection system (e.g., implementing a machine learning model) may obtain the sensor data from the one or more sensors and detect (e.g., identify and classify) the feature. For example, the computing system may provide the sensor data to the feature detection system and the feature detection system may implement a machine learning model. The feature detection system may be trained to detect features based on sensor data. In some cases, the feature detection system may be a vision-based detection system. For example, the feature detection system may be a vision-based animal detection system and, to detect the feature, the feature detection system may determine whether the feature is an animal using the vision-based animal detection system. In some embodiments, the feature detection system may identify a plurality of features and classify a subset of the plurality of features as corresponding to a particular object, obstacle, entity, or structure.

In some embodiments, the feature detection system may identify and classify the feature into one or more classes (e.g., identify a classification, from a plurality of classifications for the feature). For example, the feature detection system may identify and classify the feature as an animal. In other embodiments, the feature detection system may identify the presence of a feature and based on detection of the feature, the computing system may classify the feature. For example, the computing system or the feature detection system may classify the feature as a human (e.g., a human classification) or a non-human (e.g., a non-human classification). In some cases, the human classification may include a classification as an adult human or a child human and/or the non-human classification may include a classification as a robot, an animal, a non-robotic machine, etc.

In some cases, the computing system may train and/or retrain the detection system (e.g., the machine learning model of the detection system). For example, the computing system may obtain training data (e.g., periodically or aperiodically) and train (or retrain) the machine learning model using the training data.

At block 1604, the computing system detects second data indicating a mover (e.g., an entity). The mover may correspond to the feature. In some cases, the second data may be data from detecting the mover. For example, the computing system may detect the mover and generate, obtain, identify, etc. second data indicating the mover. In some cases the first data and the second data may have different data types and/or may be based on data having different data types (e.g., a first data type and a second data type). In some cases, the computing system may obtain the first data and the second data from different data sources (e.g., a first data source and a second data source).

The computing system may detect the mover in the environment about the robot. The computing system may obtain sensor data from one or more sensors (e.g., one or more second sensors) and detect the mover using the sensor data. For example, the one or more sensors may include a lidar sensor, a sonar sensor, a radar sensor, a ladar sensor, etc. The sensor data may include point cloud data (e.g., three-dimensional point cloud data received from a three-dimensional volumetric image sensor). Based on the sensor data, the computing system can detect the mover.

A mover detection system (e.g., implementing a machine learning model) may obtain the sensor data from the one or more sensors and detect (e.g., identify and classify) the mover. For example, the computing system may provide the sensor data to the mover detection system and the mover detection system may implement a machine learning model. The mover detection system may be trained to identify and classify features as a mover or a non-mover based on sensor data. The feature detection system may output a first classification of the feature (as corresponding to a particular object, entity, structure, or obstacle) and the mover detection system may output a second classification of the feature (as a mover or a non-mover). In some embodiments, the mover detection system may identify a plurality of features and classify a subset of the plurality of features as a particular mover.

Further, to detect the mover, the computing system may identify a route (and one or more route characteristics) of the mover. The route characteristics may include a direction of the mover, a speed (e.g., velocity) of the mover, a predicted location of the mover, etc. Further, the computing system may identify mover characteristics of the mover (e.g., a shape of the mover, a location of the mover, etc.). Based on the route of the mover (and the route characteristics and the mover characteristics), the computing system can detect a mover that is located within a route of the robot, is located within a threshold distance of a route of the robot, and/or is projected (e.g., predicted) to be located in a route of the robot within a threshold period of time.

At block 1606, the computing system fuses the first data (e.g., data from detecting the feature) and the second data (e.g., data from detecting the mover). Based on fusing the first data (e.g., an output of the detection system) and the second data (e.g., a portion of point cloud data), the computing system can generate fused data (e.g., composite data). To generate the fused data, the computing system can combine the mover characteristics, the route characteristics, and the classification of the feature (e.g., as corresponding to a particular object, entity, obstacle, or structure and/or as a mover or non-mover). In some embodiments, in generating the fused data, the computing system may remove duplicated data, or deduplicate the first data and/or the second data.

The computing system may utilize the fused data to track the feature (e.g., to perform fused entity tracking). For example, the computing system may utilize the fused data to identify, classify, and track the feature over a period of time.

In some cases, the computing system may classify the feature into a classification based on at least a portion of the fused data. For example, if the fused data identifies that the feature is classified as a human and as a mover, the computing system (or a detection system) may classify the feature as representing a human (or as a moving human) based on the fused data. Further, if the fused data identifies that the feature is classified as a human and as a non-mover, the computing system (or a detection system) may classify the feature as a non-human or indicate that the feature cannot be classified based on the fused data. In some embodiments, the computing system may classify the mover into the classification. In other embodiments, a separate computing system may classify the mover into the classification.

At block 1608, the computing system reacts to the mover based on the fused data (e.g., based on the classification). The computing system may react to the detection and classification of the mover by implementing one or more actions. For example, the computing system may react to the detection and classification of the mover by communicating with the mover (or a computing device associated with the mover), communicating with a user (or a computing device associated with the user), determining a route of the robot, or adjusting the route of the robot.

The computing system may react to the mover by communicating with the mover. For example, the computing system may communicate an alert (e.g., an audible, visual, physical, etc. alert) to the mover. In some cases, the computing system may determine how to communicate with the mover based on the classification of the corresponding feature (e.g., the classification of the feature identifying communications that the mover can understand). For example, a human may understand physical gestures, sounds (including words), displayed text, visual indicators such as lights, etc.; a robot may understand the forgoing as well as electronic communications; a child human may understand different types of the foregoing, such as a dance, particular sounds, but may not understand displayed text (as the child human may not be able to read); etc.

The system may generate an association between the particular classification and the particular robot action or reaction to the classification. Further, the system can store the association (e.g., in a cache of the system) such that, based on identification of the classification, the system can obtain the association and identify the action. In some cases, a user (e.g., an operator) may provide input data identifying the association between a feature classification and a robot action responsive to the classification. Therefore, a user may customize the action for a particular classification (and a particular feature).

In some cases, the computing system may communicate with the mover by communicating an electronic communication to the mover (e.g., communicating an electronic communication to the mover where the mover is another robot) and/or a computing system associated with the mover.

In other cases, the computing system may communicate with the mover by implementing one or more physical gestures by the robot towards the mover (e.g., based on determining the mover is a human). For example, the one or more physical gestures may include a wave of an end of a leg of the robot, a dance, a tilt of a front portion of the robot, a nod of a robot head or arm, etc.

In other cases, the computing system may communicate with the mover by instructing display of a user interface (e.g., a user interface that includes information based on classifying the feature). For example, the computing system may display different user interfaces based on the classification of the feature. In some cases, the computing system may orient a user interface of the robot (or a user interface separate from the robot) and causing display of an alert via the user interface.

Further, the computing system may react to the mover by communicating with an operator of the robot and/or a computing system associated with the operator. For example, the computing system may communicate with the operator and/or the computing system by communicating an electronic communication via a network, by instructing display of a user interface, by implementing one or more physical gestures, by communicating an alert, etc.

Further, the computing system may react to the mover by determining and/or adjusting a navigational behavior (e.g., a route planning behavior) of the robot or another robot, as disclosed above with respect to FIGS. 2-9. For example, the computing system may determine or adjust a route of the robot in the environment (e.g., to avoid a threshold distance or space relative to the mover), a speed, and/or a speed limit of the robot based on the fused data.

In one example, determining and/or adjusting a navigational behavior may include determining whether the mover is within a particular proximity of entities, obstacles, objects, structures, etc. of the environment (e.g., a stair, a road) corresponding to a feature and determining whether to delay execution of a traversal of a portion of the environment corresponding to the feature or implement execution of the traversal of the portion of the environment corresponding to the feature based on determining whether the mover is within the particular proximity of the feature. For example, the computing system may determine whether the mover is traversing the road and/or is predicted to traverse the road within a particular time period and may delay traversal of the road by the robot until the computing system determines that the mover has traversed the road. In another example, the computing system may determine whether the mover is traversing the stairs and/or is predicted to traverse the stairs within a particular time period and may delay traversal of the stairs by the robot until the computing system determines that the mover has traversed the stairs. Such reactions may be suitable after detecting a human with fused data, to avoid making the human anxious, whereas other objects, entities, obstacles, or structures corresponding to features (including other movers) may be able to tolerate sharing the stairs or road with the robot, and the robot need only allow a buffer sufficient to account for sensor resolution or other error margins and safely avoid collisions.

In some embodiments, the computing system may react to the mover by instructing display of a user interface, interacting with the mover, etc. without communicating with the mover. For example, the robot may not directly communicate with the mover.

Further, the computing system may react to the mover by monitoring for interactions (e.g., gestures, acknowledgement, etc.) by the mover (e.g., analyzing image data, electronic communications, audio data, etc. for one or more interactions of the mover). For example, the computing system may react to the mover by monitoring for an interaction by the mover (e.g., a thumbs up, a nod, a phrase, a word, a physical input to the robot, an electronic communication to the robot, or other interaction by the mover) indicating that the computing system can authorize the robot to proceed with navigation. Based on identifying the interactions, the computing system may instruct the robot to proceed with navigation.

To react to the mover, the computing system may determine an action and, based on determining the action, the computing system may instruct performance of the action by the robot. For example, the computing system may route a command (e.g., instructions) to a control system of the robot.

In some embodiments, different classifications of features may be associated with different actions (e.g., navigational behaviors). For example, a plurality of classifications of features may be associated with a corresponding plurality of navigational behaviors. As discussed above, the computing system may react in a first manner to a first feature classified as representing a first obstacle, object, entity, structure, etc. and/or as a mover or non-mover and may react in a second manner to a second feature classified as representing a second obstacle, object, entity, structure, etc. and/or as a mover or non-mover. For example, the computing system may react to a feature classified as a moving human in a first manner and may react to a feature classified as a non-robotic machine in a second manner based on a goal to avoid scaring humans, for example in a manner to acknowledge perception and recognition of a human. By reacting to entities, objects, obstacles, or structures represented by features based on the classification of features, the computing system can implement feature classification specific actions that are based on the specific classification of the feature. For example, a first classification of a feature may be associated with no action (e.g., the computing system may instruct the robot to continue navigational behavior) and a second classification of a feature may be associated with an action (e.g., the computing system may instruct the robot to stop navigation). In another example, the first classification may be associated with a first action that includes a first navigational behavior (e.g., an action to maintain a speed at or below a first speed or a first speed limit) and the second classification may be associated with a second action that includes a second navigational behavior (e.g., an action to maintain a speed at or below a second speed or a second speed limit). In some cases, one or more of the actions may include a lack of an adjustment to a navigational behavior (e.g., a lack of a speed limit).

The first and second navigational behaviors may be qualitatively different. In one example, a first classification (e.g., a robot classification) may be associated with a first action that identifies instructions to maintain a first threshold distance from the mover and a second classification (e.g., a human classification) may be associated with a second action that identifies instructions to maintain a second threshold distance from the mover that is different from the first threshold distance. For example, if the robot identifies non-human features, even if they are movers, the robot reacts primarily to avoid collision with a first threshold distance selected to maintain safety due to error margins for the sensors or the robot mechanical controls. By way of contrast, the second threshold distance may be greater for human features identified through fused data, as humans may desire a greater safety margin to avoid anxiety over coming too close to a moving robot.

In some cases, the computing system may determine and instruct performance of the action (e.g., an action to communicate with the mover) based on detecting the mover and/or detecting the feature. For example, the computing system may determine the action without fusing the data (or without utilizing the fused data).

In some cases, the computing system may associate a location of the robot with the action. Association of the location with the action may cause the robot to perform the action based on a location of the robot matching the location. For example, association of the location with the action may cause the robot to periodically or aperiodically perform the action based on a location of the robot matching the location. In one example, the computing system may generate a waypoint and associate the action with the waypoint.

In other cases, the computing system may associate a location (e.g., based on performing the action at the location) with a second action. The second action may cause the robot to provide sensor data to the computing system when the robot determines that the robot is at the location to determine if the environment includes any movers. For example, the computing system may associate a crosswalk with an action that causes the robot to delay traversal of the crosswalk until the computing system determines that there are no movers within the crosswalk, and particularly that there are no humans (as identified by fused data) within the crosswalk.

The computing system may associate the location of the robot with a particular identification and classification of a feature. For example, the computing system may identify and classify a feature as a mover at a particular location. Based on the identification and classification of the feature as representing a particular obstacle, object, entity, structure, etc., the system can associate the location with the particular obstacle, object, entity, structure, etc. For example, the system can associate the location with one or more moving adult humans to indicate that the location may include, is likely to include, or has historically included moving adult humans.

The system can provide the association of the location with the particular obstacle, object, entity, structure, etc. to a computing device (e.g., to indicate the presence of a particular obstacle, object, entity, structure, etc. at the location). Further, the system can provide the association of the location with the particular obstacle, object, entity, structure, etc. to a system of a robot (e.g., the system of another robot). For example, the system can provide the association of the location with the particular obstacle, object, entity, structure, etc. to a system of another robot to alert the system of the another robot that the location may include (e.g., previously included or historically included) a particular obstacle, object, entity, structure, etc. In some cases, the system can store the association and, based on navigating to the location (e.g., at a subsequent time period), access the association, and determine how to navigate an environment based on the association.

Based on the system (or a system of a different robot) obtaining sensor data (e.g., to perform a mission), the system can identify and classify a feature. Based on identifying and classifying the feature, the system can remove the feature (e.g., based on classifying the feature as representing a human) from data (e.g., from localization data for localizing the robot, from data recorded and associated with the location, etc.). For example, the system can remove the feature from data recorded and associated with the location based on identifying and classifying the feature as representing a moving human as a moving human may move and may not be identified in subsequent sensor data associated with the location. By removing the feature, the system can filter the sensor data to include specific features (e.g., features classified as walls, doors, etc.) and remove other features (e.g., features classified as humans).

Figure 17:
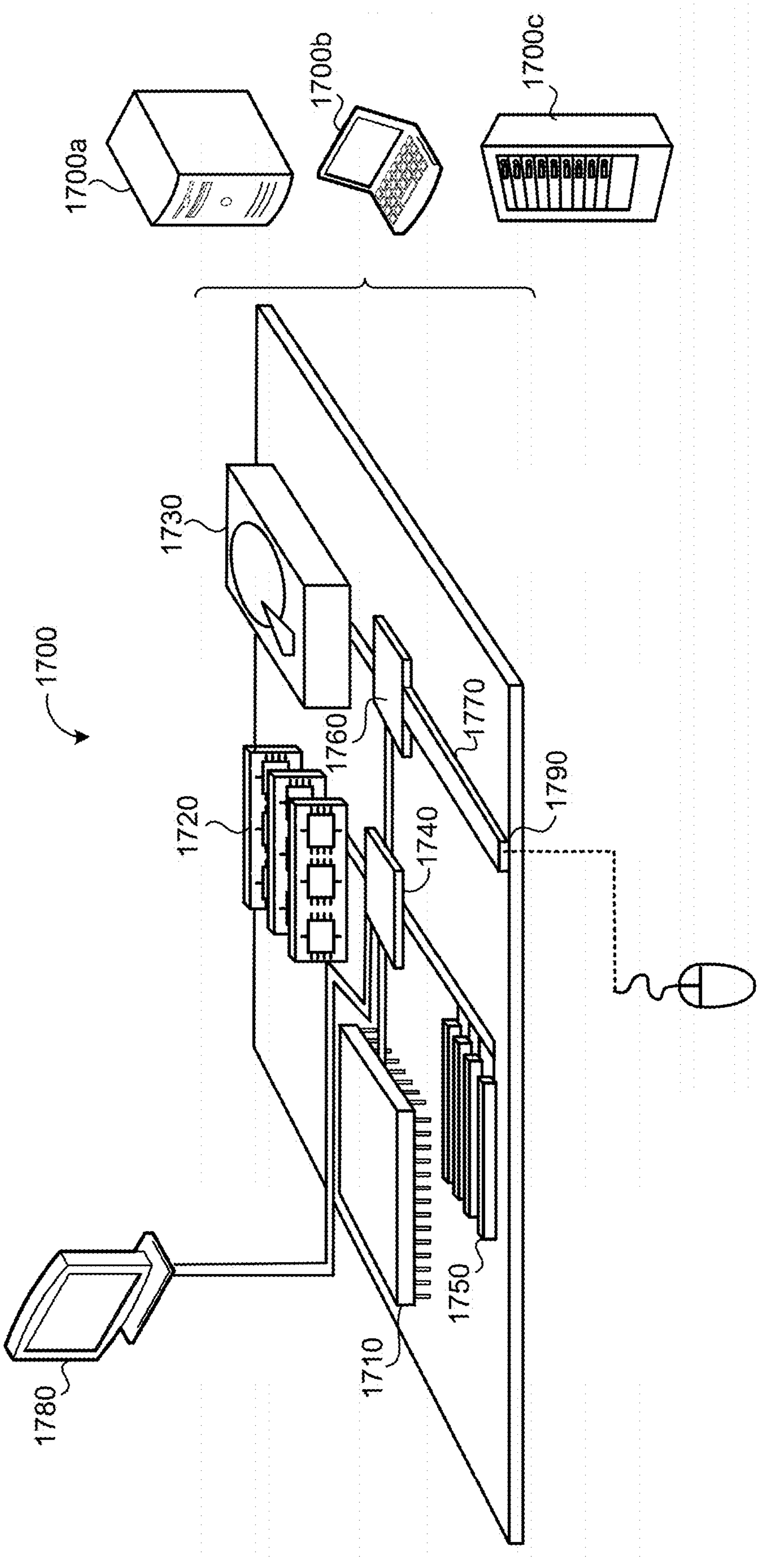
FIG. 17 is a schematic view of an example computing device that may be used to implement the systems and methods described herein.

FIG. 17 is a schematic view of an example computing device 1700 that may be used to implement the systems and methods described in this document. The computing device 1700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1700 includes a processor 1710, memory 1720, a storage device 1730, a high-speed interface/controller 1740 connecting to the memory 1720 and high-speed expansion ports 1750, and a low-speed interface/controller 1760 connecting to a low-speed bus 1770 and a storage device 1730. Each of the components 1710, 1720, 1730, 1740, 1750, and 1760, are interconnected using various busses, and may be mounted on a common motherboard or in other manners as appropriate. The processor 1710 can process instructions for execution within the computing device 1700, including instructions stored in the memory 1720 or on the storage device 1730 to display graphical information for a graphical user interface (GUI) on an external input/output device, such as display 1780 coupled to high-speed interface 1740. In other implementations, multiple processors and/or multiple buses may be used, as appropriate, along with multiple memories and types of memory. Also, multiple computing devices 1700 may be connected, with each device providing portions of the necessary operations (e.g., as a server bank, a group of blade servers, or a multi-processor system).

The memory 1720 stores information non-transitorily within the computing device 1700. The memory 1720 may be a computer-readable medium, a volatile memory unit(s), or non-volatile memory unit(s). The non-transitory memory 1720 may be physical devices used to store programs (e.g., sequences of instructions) or data (e.g., program state information) on a temporary or permanent basis for use by the computing device 1700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random-access memory (DRAM), static random-access memory (SRAM), phase change memory (PCM) as well as disks or tapes.

The storage device 1730 is capable of providing mass storage for the computing device 1700. In some implementations, the storage device 1730 is a computer-readable medium. In various different implementations, the storage device 1730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1720, the storage device 1730, or memory on processor 1710.

The high-speed controller 1740 manages bandwidth-intensive operations for the computing device 1700, while the low-speed controller 1760 manages lower bandwidth-intensive operations. Such allocation of duties is exemplary only. In some implementations, the high-speed controller 1740 is coupled to the memory 1720, the display 1780 (e.g., through a graphics processor or accelerator), and to the high-speed expansion ports 1750, which may accept various expansion cards (not shown). In some implementations, the low-speed controller 1760 is coupled to the storage device 1730 and a low-speed expansion port 1790. The low-speed expansion port 1790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1700 may be implemented in a number of different forms, as shown in the figure. For example, it may be implemented as a standard server 1700*a* or multiple times in a group of such servers 1700*a*, as a laptop computer 1700*b*, or as part of a rack server system 1700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. A processor can receive instructions and data from a read only memory or a random-access memory or both. The essential elements of a computer are a processor for performing instructions and one or more memory devices for storing instructions and data. A computer can include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for operating a robot, comprising:

detecting, by a feature detector of the robot, using image sensor data obtained from a first sensor on the robot, a feature in an environment about the robot;

detecting, by a mover detector of the robot, using lidar sensor data obtained from a second sensor on the robot, a mover in the environment about the robot;

fusing, by a computing system of the robot, first data associated with the feature and second data associated with the mover to produce fused data based on an output generated by the feature detector and an output generated by the mover detector, wherein a portion of the environment is classified into a classification of a set of moving feature classifications and non-moving feature classifications based on at least a portion of the fused data; and based on the classification, reacting to the portion of the environment.

2. The method of claim 1, wherein reacting to the portion of the environment comprises communicating with one or more of:

the mover;

a computing device; or another robot.

3. The method of claim 1, wherein reacting to the portion of the environment comprises communicating an electronic communication to one or more of the mover or a computing system associated with the mover.

4. The method of claim 1, wherein reacting to the portion of the environment comprises implementing one or more physical gestures by the robot towards the mover.

5. The method of claim 1, wherein reacting to the portion of the environment comprises instructing display of a user interface oriented towards the mover.

6. The method of claim 1, wherein reacting to the portion of the environment comprises communicating an alert to the mover.

7. The method of claim 6, wherein the alert comprises an audible alert, a visual alert, or a physical alert.

8. The method of claim 1, wherein the set of moving feature classifications and non-moving feature classifications comprises a human classification and one or more non-human classifications.

9. The method of claim 1, wherein the portion of the environment comprises:

a mover located in a route of the robot;

a mover located within a threshold distance of a route of the robot; or a mover projected to be located in a route of the robot within a threshold period of time.

10. The method of claim 1, wherein detecting the feature comprises determining whether the feature is an animal using a vision-based animal detection system.

11. The method of claim 1, wherein reacting to the portion of the environment comprises determining a route of the robot in the environment.

12. The method of claim 1, wherein reacting to the portion of the environment comprises adjusting a route of the robot in the environment.

13. The method of claim 1, wherein reacting to the portion of the environment comprises adjusting a navigational behavior of the robot.

14. The method of claim 13, wherein adjusting the navigational behavior comprises:

adjusting a speed of the robot based on one or more of a location, velocity, or direction of the mover; or avoiding a space relative to the mover.

15. The method of claim 1, wherein the portion of the environment is classified based on output of a machine learning model, wherein the machine learning model is trained to classify the portion of the environment into one or more classifications.

16. The method of claim 15, further comprising:

obtaining training data; and retraining the machine learning model using the training data.

17. The method of claim 15, further comprising:

implementing the machine learning model; and obtaining the output of the machine learning model based on implementing the machine learning model.

18. The method of claim 1, further comprising causing display of a user interface via a user computing device, wherein the user interface comprises information based on the classification.

19. The method of claim 1, further comprising causing display of a user interface via a user computing device, wherein the user interface indicates the classification.

20. The method of claim 1, wherein the first data and the second data have different data types.

21. A legged robot comprising:

a plurality of legs;

memory storing computer-executable instructions; and a processor in communication with the memory, wherein the processor is configured to execute the computer-executable instructions, wherein execution of the computer-executable instructions causes the processor to:

detect, by a feature detector of the legged robot, using image sensor data obtained from a first sensor on the legged robot, a feature in an environment about the legged robot;

detect, by a mover detector of the legged robot, using lidar sensor data obtained from a second sensor on the legged robot, a mover in the environment about the legged robot;

fuse first data associated with the feature and second data associated with the mover to produce fused data based on an output generated by the feature detector and an output generated by the mover detector, wherein a portion of the environment is classified into a classification of a set of moving feature classifications and non-moving feature classifications based on at least a portion of the fused data; and based on the classification, react to the portion of the environment.

22. The legged robot of claim 21, wherein the processor and computer-executable instructions are configured to react to the portion of the environment by performing an action.

23. The legged robot of claim 22, wherein the processor and computer-executable instructions are configured to determine the action based on the classification.

24. The legged robot of claim 21, wherein the classification is a human classification.

25. The legged robot of claim 21, wherein the output generated by the feature detector is different from the image sensor data, and wherein the output generated by the mover detector is different from the lidar sensor data.

26. A computing system comprising:

data processing hardware; and memory hardware in communication with the data processing hardware, the memory hardware storing instructions, wherein execution of the instructions by the data processing hardware causes the data processing hardware to:

detect, by a feature detector of a legged robot, using image sensor data obtained from a first sensor on the legged robot, a feature in an environment about the legged robot;

detect, by a mover detector of the legged robot, using lidar sensor data obtained from a second sensor on the legged robot, a mover in the environment about the legged robot;

fuse first data associated with the feature and second data associated with the mover to produce fused data based on an output generated by the feature detector and an output generated by the mover detector, wherein portion of the environment is classified into a classification of a set of moving feature classifications and non-moving feature classifications based on at least a portion of the fused data; and based on the classification, react to the portion of the environment.

27. The computing system of claim 26, wherein the classification identifies the feature as a human, wherein the data processing hardware and the instructions are configured to react to the portion of the environment by physically interacting with the human based on the classification identifying the feature as the human.

28. The computing system of claim 26, wherein the classification identifies the feature as a human, wherein the data processing hardware and the instructions are configured to react to the portion of the environment by instructing the legged robot to navigate away from the human based on the classification identifying the feature as the human.

29. The computing system of claim 26, wherein the set of moving feature classifications and non-moving feature classifications are associated with a set of navigational behaviors.

30. The computing system of claim 29, wherein a first classification of the set of moving feature classifications and non-moving feature classifications is associated with a first navigational behavior, wherein a second classification of the set of moving feature classifications and non-moving feature classifications is associated with a second navigational behavior, wherein the second navigational behavior is qualitatively different from the first navigational behavior.

* * * * *